United States Patent
el Kaliouby et al.

(10) Patent No.: US 11,393,133 B2
(45) Date of Patent: Jul. 19, 2022

(54) EMOJI MANIPULATION USING MACHINE LEARNING

(71) Applicant: Affectiva, Inc., Boston, MA (US)

(72) Inventors: Rana el Kaliouby, Milton, MA (US); May Amr Fouad, New Cairo (EG); Abdelrahman N. Mahmoud, Somerville, MA (US); Seyedmohammad Mavadati, Watertown, MA (US); Daniel McDuff, Cambridge, MA (US)

(73) Assignee: Affectiva, Inc., Boston, MA (US)

( * ) Notice: Subject to any disclaimer, the term of this patent is extended or adjusted under 35 U.S.C. 154(b) by 0 days.

(21) Appl. No.: 16/823,404

(22) Filed: Mar. 19, 2020

(65) Prior Publication Data

US 2020/0219295 A1    Jul. 9, 2020

Related U.S. Application Data

(63) Continuation-in-part of application No. 16/206,051, filed on Nov. 30, 2018, now Pat. No. 10,628,985, and
(Continued)

(51) Int. Cl.
*G06T 11/00*    (2006.01)
*G06F 3/04817*    (2022.01)
(Continued)

(52) U.S. Cl.
CPC .......... *G06T 11/00* (2013.01); *G06F 3/04817* (2013.01); *G06T 7/20* (2013.01);
(Continued)

(58) Field of Classification Search
CPC .......... G06T 11/00; G06T 7/20; G06T 13/80; G06T 2200/24; G06T 2207/30201;
(Continued)

(56) References Cited

U.S. PATENT DOCUMENTS 3,034,500 A    5/1962 Backster, Jr.
3,548,806 A    12/1970 Fisher
(Continued)

FOREIGN PATENT DOCUMENTS

EP    3252566 A1 * 12/2017    ............. G06F 3/012
JP    08115367    7/1996
(Continued)

OTHER PUBLICATIONS

Scherer, Dominik, "Evaluation of Pooling Operations in Convolutional Architectures for Object Recognition", Jan. 2010, ResearchGate, pp. 1-11 (Year: 2010).*
(Continued)

*Primary Examiner* — Terrell M Robinson
(74) *Attorney, Agent, or Firm* — Adams Intellex, PLC

(57) ABSTRACT

A machine learning system is accessed. The machine learning system is used to translate content into a representative icon. The machine learning system is used to manipulate emoji. The machine learning system is used to process an image of an individual. The machine learning processing includes identifying a face of the individual. The machine learning processing includes classifying the face to determine facial content using a plurality of image classifiers. The classifying includes generating confidence values for a plurality of action units for the face. The facial content is translated into a representative icon. The translating the facial content includes summing the confidence values for the plurality of action units. The representative icon comprises an emoji. A set of emoji can be imported. The representative icon is selected from the set of emoji. The emoji selection is based on emotion content analysis of the face.

32 Claims, 27 Drawing Sheets

Related U.S. Application Data a continuation-in-part of application No. 15/374,447, filed on Dec. 9, 2016, now abandoned, which is a continuation-in-part of application No. 15/262,197, filed on Sep. 12, 2016, now abandoned, and a continuation-in-part of application No. 14/796,419, filed on Jul. 10, 2015, now abandoned, and a continuation-in-part of application No. 14/460,915, filed on Aug. 15, 2014, now abandoned, and a continuation-in-part of application No. 13/153,745, filed on Jun. 6, 2011, now abandoned.

(60) Provisional application No. 62/955,493, filed on Dec. 31, 2019, provisional application No. 62/954,819, filed on Dec. 30, 2019, provisional application No. 62/954,833, filed on Dec. 30, 2019, provisional application No. 62/925,990, filed on Oct. 25, 2019, provisional application No. 62/926,009, filed on Oct. 25, 2019, provisional application No. 62/893,298, filed on Aug. 29, 2019, provisional application No. 62/827,088, filed on Mar. 31, 2019, provisional application No. 62/593,440, filed on Dec. 1, 2017, provisional application No. 62/593,449, filed on Dec. 1, 2017, provisional application No. 62/370,421, filed on Aug. 3, 2016, provisional application No. 62/301,558, filed on Feb. 29, 2016, provisional application No. 62/273,896, filed on Dec. 31, 2015, provisional application No. 62/265,937, filed on Dec. 10, 2015, provisional application No. 62/222,518, filed on Sep. 23, 2015, provisional application No. 62/217,872, filed on Sep. 12, 2015, provisional application No. 62/128,974, filed on Mar. 5, 2015, provisional application No. 62/082,579, filed on Nov. 20, 2014, provisional application No. 62/047,508, filed on Sep. 8, 2014, provisional application No. 62/023,800, filed on Jul. 11, 2014, provisional application No. 61/972,314, filed on Mar. 30, 2014, provisional application No. 61/953,878, filed on Mar. 16, 2014, provisional application No. 61/927,481, filed on Jan. 15, 2014, provisional application No. 61/924,252, filed on Jan. 7, 2014, provisional application No. 61/916,190, filed on Dec. 14, 2013, provisional application No. 61/867,007, filed on Aug. 16, 2013, provisional application No. 61/467,209, filed on Mar. 24, 2011, provisional application No. 61/447,464, filed on Feb. 28, 2011, provisional application No. 61/447,089, filed on Feb. 27, 2011, provisional application No. 61/439,913, filed on Feb. 6, 2011, provisional application No. 61/414,451, filed on Nov. 17, 2010, provisional application No. 61/388,002, filed on Sep. 30, 2010, provisional application No. 61/352,166, filed on Jun. 7, 2010.

(51) Int. Cl.
*G06T 7/20* (2017.01)
*G06T 13/80* (2011.01)
*G06V 40/16* (2022.01)
*G06F 3/0482* (2013.01)

(52) U.S. Cl.
CPC .......... *G06T 13/80* (2013.01); *G06V 40/172* (2022.01); *G06V 40/174* (2022.01); *G06F 3/0482* (2013.01); *G06T 2200/24* (2013.01); *G06T 2207/20081* (2013.01); *G06T 2207/20084* (2013.01); *G06T 2207/30201* (2013.01); *G06V 40/178* (2022.01)

(58) Field of Classification Search
CPC .............. G06F 3/04817; G06F 3/0482; G06K 9/00288; G06K 9/00302; G06K 2009/00322
See application file for complete search history.

(56) References Cited

U.S. PATENT DOCUMENTS

| | | |
|---|---|---|
| 3,870,034 A | 3/1975 | James |
| 4,353,375 A | 10/1982 | Colburn et al. |
| 4,448,203 A | 5/1984 | Williamson et al. |
| 4,794,533 A | 12/1988 | Cohen |
| 4,807,642 A | 2/1989 | Brown |
| 4,817,628 A | 4/1989 | Zealear et al. |
| 4,950,069 A | 8/1990 | Hutchinson |
| 4,964,411 A | 10/1990 | Johnson et al. |
| 5,016,282 A | 5/1991 | Tomono et al. |
| 5,031,228 A | 7/1991 | Lu |
| 5,219,322 A | 6/1993 | Weathers |
| 5,247,938 A | 9/1993 | Silverstein et al. |
| 5,259,390 A | 11/1993 | Maclean |
| 5,507,291 A | 4/1996 | Stirbl et al. |
| 5,572,596 A | 11/1996 | Wildes et al. |
| 5,619,571 A | 4/1997 | Sandstorm et al. |
| 5,647,834 A | 7/1997 | Ron |
| 5,649,061 A | 7/1997 | Smyth |
| 5,663,900 A | 9/1997 | Bhandari et al. |
| 5,666,215 A | 9/1997 | Fredlund et al. |
| 5,725,472 A | 3/1998 | Weathers |
| 5,741,217 A | 4/1998 | Gero |
| 5,760,917 A | 6/1998 | Sheridan |
| 5,762,611 A | 6/1998 | Lewis et al. |
| 5,772,508 A | 6/1998 | Sugita et al. |
| 5,772,591 A | 6/1998 | Cram |
| 5,774,591 A | 6/1998 | Black et al. |
| 5,802,220 A | 9/1998 | Black et al. |
| 5,825,355 A | 10/1998 | Palmer et al. |
| 5,886,683 A | 3/1999 | Tognazzini et al. |
| 5,898,423 A | 4/1999 | Tognazzini et al. |
| 5,920,477 A | 7/1999 | Hoffberg et al. |
| 5,945,988 A | 8/1999 | Williams et al. |
| 5,959,621 A | 9/1999 | Nawaz et al. |
| 5,969,755 A | 10/1999 | Courtney |
| 5,983,129 A | 11/1999 | Cowan et al. |
| 5,987,415 A | 11/1999 | Breese et al. |
| 6,004,061 A | 12/1999 | Manico et al. |
| 6,004,312 A | 12/1999 | Finneran et al. |
| 6,008,817 A | 12/1999 | Gilmore, Jr. |
| 6,026,321 A | 2/2000 | Miyata et al. |
| 6,026,322 A | 2/2000 | Korenman et al. |
| 6,056,781 A | 5/2000 | Wassick et al. |
| 6,067,565 A | 5/2000 | Horvitz |
| 6,088,040 A | 7/2000 | Oda et al. |
| 6,091,334 A | 7/2000 | Galiana et al. |
| 6,099,319 A | 8/2000 | Zaltman et al. |
| 6,134,644 A | 10/2000 | Mayuzumi et al. |
| 6,182,098 B1 | 1/2001 | Selker |
| 6,185,534 B1 | 2/2001 | Breese et al. |
| 6,195,651 B1 | 2/2001 | Handel et al. |
| 6,212,502 B1 | 4/2001 | Ball et al. |
| 6,222,607 B1 | 4/2001 | Szajewski et al. |
| 6,309,342 B1 | 10/2001 | Blazey et al. |
| 6,327,580 B1 | 12/2001 | Pierce et al. |
| 6,349,290 B1 | 2/2002 | Horowitz et al. |
| 6,351,273 B1 | 2/2002 | Lemelson et al. |
| 6,437,758 B1 | 8/2002 | Nielsen et al. |
| 6,443,840 B2 | 9/2002 | Von Kohorn |
| 6,530,082 B1 | 3/2003 | Del Sesto et al. |
| 6,577,329 B1 | 6/2003 | Flickner et al. |
| 6,606,102 B1 | 8/2003 | Odom |
| 6,629,104 B1 | 9/2003 | Parulski et al. |
| 6,792,458 B1 | 9/2004 | Muret et al. |
| 6,847,376 B2 | 1/2005 | Engeldrum et al. |
| 7,003,135 B2 | 2/2006 | Hsieh et al. |
| 7,013,478 B1 | 3/2006 | Hendricks et al. |
| 7,113,916 B1 | 9/2006 | Hill |

(56) References Cited

U.S. PATENT DOCUMENTS

| | | | |
|---|---|---|---|
| 7,120,880 B1 | 10/2006 | Dryer et al. | |
| 7,197,459 B1 | 3/2007 | Harinarayan et al. | |
| 7,233,684 B2 | 6/2007 | Fedorovskaya et al. | |
| 7,246,081 B2 | 7/2007 | Hill | |
| 7,263,474 B2 | 8/2007 | Fables et al. | |
| 7,266,582 B2 | 9/2007 | Stelting | |
| 7,307,636 B2 | 12/2007 | Matraszek et al. | |
| 7,319,779 B1 | 1/2008 | Mummareddy et al. | |
| 7,327,505 B2 | 2/2008 | Fedorovskaya et al. | |
| 7,350,138 B1 | 3/2008 | Swaminathan et al. | |
| 7,353,399 B2 | 4/2008 | Ooi et al. | |
| 7,355,627 B2 | 4/2008 | Yamazaki et al. | |
| 7,428,318 B1 | 9/2008 | Madsen et al. | |
| 7,474,801 B2 | 1/2009 | Teo et al. | |
| 7,496,622 B2 | 2/2009 | Brown et al. | |
| 7,549,161 B2 | 6/2009 | Poo et al. | |
| 7,551,755 B1 | 6/2009 | Steinberg et al. | |
| 7,555,148 B1 | 6/2009 | Steinberg et al. | |
| 7,558,408 B1 | 7/2009 | Steinberg et al. | |
| 7,564,994 B1 | 7/2009 | Steinberg et al. | |
| 7,573,439 B2 | 8/2009 | Lau et al. | |
| 7,580,512 B2 | 8/2009 | Batni et al. | |
| 7,584,435 B2 | 9/2009 | Bailey et al. | |
| 7,587,068 B1 | 9/2009 | Steinberg et al. | |
| 7,610,289 B2 | 10/2009 | Muret et al. | |
| 7,620,934 B2 | 11/2009 | Falter et al. | |
| 7,644,375 B1 | 1/2010 | Anderson et al. | |
| 7,676,574 B2 | 3/2010 | Glommen et al. | |
| 7,757,171 B1 | 7/2010 | Wong et al. | |
| 7,826,657 B2 | 11/2010 | Zhang et al. | |
| 7,830,570 B2 | 11/2010 | Morita et al. | |
| 7,881,493 B1 | 2/2011 | Edwards et al. | |
| 7,921,036 B1 | 4/2011 | Sharma | |
| 8,010,458 B2 | 8/2011 | Galbreath et al. | |
| 8,022,831 B1 | 9/2011 | Wood-Eyre | |
| 8,219,438 B1 | 7/2012 | Moon et al. | |
| 8,401,248 B1 | 3/2013 | Moon et al. | |
| 8,442,638 B2 | 5/2013 | Libbus et al. | |
| 8,522,779 B2 | 9/2013 | Lee et al. | |
| 8,600,120 B2 | 12/2013 | Gonion et al. | |
| 8,640,021 B2 | 1/2014 | Perez et al. | |
| 2001/0033286 A1 | 10/2001 | Stokes et al. | |
| 2001/0041021 A1 | 11/2001 | Boyle et al. | |
| 2002/0007249 A1 | 1/2002 | Cranley | |
| 2002/0030665 A1 | 3/2002 | Ano | |
| 2002/0042557 A1 | 4/2002 | Bensen et al. | |
| 2002/0054174 A1 | 5/2002 | Abbott et al. | |
| 2002/0084902 A1 | 7/2002 | Zadrozny et al. | |
| 2002/0171551 A1 | 11/2002 | Eshelman | |
| 2002/0182574 A1 | 12/2002 | Freer | |
| 2003/0035567 A1 | 2/2003 | Chang et al. | |
| 2003/0037041 A1 | 2/2003 | Hertz | |
| 2003/0055654 A1* | 3/2003 | Oudeyer | G10L 13/033 704/275 |
| 2003/0060728 A1 | 3/2003 | Mandigo | |
| 2003/0093784 A1 | 5/2003 | Dimitrova et al. | |
| 2003/0182123 A1 | 9/2003 | Mitsuyoshi | |
| 2003/0191682 A1 | 10/2003 | Shepard et al. | |
| 2003/0191816 A1 | 10/2003 | Landress et al. | |
| 2004/0181457 A1 | 9/2004 | Biebesheimer | |
| 2005/0069852 A1 | 3/2005 | Janakiraman | |
| 2005/0187437 A1 | 8/2005 | Matsugu | |
| 2005/0283055 A1 | 12/2005 | Shirai et al. | |
| 2005/0289582 A1 | 12/2005 | Tavares et al. | |
| 2006/0019224 A1 | 1/2006 | Behar et al. | |
| 2006/0143647 A1 | 6/2006 | Bill | |
| 2006/0170945 A1 | 8/2006 | Bill | |
| 2006/0235753 A1 | 10/2006 | Kameyama | |
| 2007/0140556 A1 | 6/2007 | Willamowski | |
| 2007/0167689 A1 | 7/2007 | Ramadas et al. | |
| 2007/0173733 A1 | 7/2007 | Le et al. | |
| 2007/0239787 A1 | 10/2007 | Cunningham et al. | |
| 2007/0255831 A1 | 11/2007 | Hayashi et al. | |
| 2007/0265507 A1 | 11/2007 | de Lemos | |
| 2007/0299964 A1 | 12/2007 | Wong et al. | |
| 2008/0037827 A1* | 2/2008 | Corcoran | G06K 9/00 382/103 |
| 2008/0059570 A1 | 3/2008 | Bill | |
| 2008/0091512 A1 | 4/2008 | Marci et al. | |
| 2008/0091515 A1 | 4/2008 | Thieberger et al. | |
| 2008/0101660 A1 | 5/2008 | Seo | |
| 2008/0103784 A1 | 5/2008 | Wong et al. | |
| 2008/0184170 A1 | 7/2008 | Periyalwar | |
| 2008/0201144 A1 | 8/2008 | Song et al. | |
| 2008/0208015 A1 | 8/2008 | Morris et al. | |
| 2008/0221472 A1 | 9/2008 | Lee et al. | |
| 2008/0279425 A1* | 11/2008 | Tang | G06K 9/00221 382/118 |
| 2008/0287821 A1 | 11/2008 | Jung et al. | |
| 2008/0292151 A1 | 11/2008 | Kurtz et al. | |
| 2009/0002178 A1 | 1/2009 | Guday et al. | |
| 2009/0006206 A1 | 1/2009 | Groe | |
| 2009/0083421 A1 | 3/2009 | Glommen et al. | |
| 2009/0094286 A1 | 4/2009 | Lee et al. | |
| 2009/0112694 A1 | 4/2009 | Jung et al. | |
| 2009/0112810 A1 | 4/2009 | Jung et al. | |
| 2009/0133048 A1 | 5/2009 | Gibbs et al. | |
| 2009/0150919 A1 | 6/2009 | Lee et al. | |
| 2009/0156907 A1 | 6/2009 | Jung et al. | |
| 2009/0164132 A1 | 6/2009 | Jung et al. | |
| 2009/0190803 A1* | 7/2009 | Neghina | G06K 9/00228 382/118 |
| 2009/0193344 A1 | 7/2009 | Smyers | |
| 2009/0210290 A1 | 8/2009 | Elliott et al. | |
| 2009/0217315 A1 | 8/2009 | Malik et al. | |
| 2009/0259518 A1 | 10/2009 | Harvey | |
| 2009/0270170 A1 | 10/2009 | Patton | |
| 2009/0271417 A1 | 10/2009 | Toebes et al. | |
| 2009/0285456 A1 | 11/2009 | Moon et al. | |
| 2009/0299840 A1 | 12/2009 | Smith | |
| 2010/0070523 A1 | 3/2010 | Delgo et al. | |
| 2010/0086215 A1 | 4/2010 | Bartlett et al. | |
| 2010/0099955 A1 | 4/2010 | Thomas et al. | |
| 2010/0211397 A1* | 8/2010 | Park | G06K 9/00268 704/276 |
| 2010/0266213 A1 | 10/2010 | Hill | |
| 2010/0274847 A1 | 10/2010 | Anderson et al. | |
| 2010/0278385 A1* | 11/2010 | Song | G06V 40/175 382/199 |
| 2010/0324437 A1 | 12/2010 | Freeman | |
| 2011/0007142 A1* | 1/2011 | Perez | G06F 3/017 348/77 |
| 2011/0007174 A1 | 1/2011 | Bacivarov et al. | |
| 2011/0038547 A1* | 2/2011 | Hill | G06K 9/00335 382/195 |
| 2011/0126226 A1 | 5/2011 | Makhlouf | |
| 2011/0134026 A1 | 6/2011 | Kang et al. | |
| 2011/0143728 A1 | 6/2011 | Holopainen et al. | |
| 2011/0144971 A1 | 6/2011 | Danielson | |
| 2011/0196855 A1 | 8/2011 | Wable et al. | |
| 2011/0231240 A1 | 9/2011 | Schoen et al. | |
| 2011/0251493 A1 | 10/2011 | Poh et al. | |
| 2011/0263946 A1 | 10/2011 | el Kaliouby et al. | |
| 2012/0271484 A1 | 10/2012 | Feit et al. | |
| 2012/0324491 A1 | 12/2012 | Bathiche et al. | |
| 2013/0023337 A1 | 1/2013 | Bowers et al. | |
| 2013/0116587 A1 | 5/2013 | Sommo et al. | |
| 2013/0197409 A1 | 8/2013 | Baxter et al. | |
| 2014/0172910 A1 | 6/2014 | Jung et al. | |
| 2015/0332088 A1* | 11/2015 | Chembula | G06K 9/468 382/203 |
| 2016/0104486 A1 | 4/2016 | Penilla et al. | |
| 2017/0003784 A1 | 1/2017 | Garg et al. | |
| 2018/0050696 A1 | 2/2018 | Misu et al. | |
| 2018/0129870 A1* | 5/2018 | Bacivarov | G06K 9/52 |
| 2020/0171977 A1 | 6/2020 | Jales Costa et al. | |

(56) References Cited

U.S. PATENT DOCUMENTS

2020/0285871 A1 9/2020 Tokizaki et al.
2020/0130528 A1 10/2020 Upmanue et al.

FOREIGN PATENT DOCUMENTS

| KR | 10-2005-0021759 A | 3/2005 |
|---|---|---|
| KR | 10-2008-0016303 A | 2/2008 |
| KR | 1020100048688 A | 5/2010 |
| WO | WO 2011/045422 A1 | 4/2011 |

OTHER PUBLICATIONS

Rana Ayman El Kaliouby, Mind-reading machines: automated inference of complex mental states, Jul. 2005, University of Cambridge, Cambridge, United Kingdom.
International Search Report dated Nov. 14, 2011 for PCT/US2011/39282.
International Search Report dated Apr. 16, 2012 for PCT/US2011/054125.
International Search Report dated May 24, 2012 for PCT/US2011/060900.
Xiaoyu Wang, An HOG-LBP human detector with partial occlusion handling, Sep. 29, 2009, IEEE 12th International Conference on Computer Vision, Kyoto, Japan.
Zhihong Zeng, A Survey of Affect Recognition Methods: Audio, Visual, and Spontaneous Expressions, Jan. 2009, IEEE Transactions on Pattern Analysis and Machine Intelligence, vol. 31, No. 1.
Nicholas R. Howe and Amanda Ricketson, Improving the Boosted Correlogram, 2004, Lecture Notes in Computer Science, ISSN 0302-9743, Springer-Verlag, Germany.
Xuming He, et al, Learning and Incorporating Top-Down Cues in Image Segmentation, 2006, Lecture Notes in Computer Science, ISBN 978-3-540-33832-1, Springer-Verlag, Germany.
Ross Eaton, et al, Rapid Training of Image Classifiers through Adaptive, Multi-frame Sampling Methods, Oct. 2008, IEEE 37th Applied Imagery Pattern Recognition Workshop, Washington DC.
Verkruysse, Wim, Lars O. Svaasand, and J. Stuart Nelson. "Remote plethysmographic imaging using ambient light." Optics express 16.26 (2008): 21434-21445.
Albiol, Alberto, et al. "Face recognition using HOG-EBGM." Pattern Recognition Letters 29.10 (2008): 1537-1543.
Fasel, B. (Aug. 2002). Robust face analysis using convolutional neural networks. In Object recognition supported by user interaction for service robots (vol. 2, pp. 40-43). IEEE.
Matsugu, M., Mori, K., Mitari, Y., & Kaneda, Y. (2003). Subject independent facial expression recognition with robust face detection using a convolutional neural network. Neural Networks, 16(5-6), 555-559.

* cited by examiner

EMOJI MANIPULATION USING MACHINE LEARNING

RELATED APPLICATIONS

This application claims the benefit of U.S. provisional patent applications "Synthetic Data Augmentation for Neural Network Training" Ser. No. 62/954,819, filed Dec. 30, 2019, "Synthetic Data for Neural Network Training Using Vectors" Ser. No. 62/954,833, filed Dec. 30, 2019, "Autonomous Vehicle Control Using Longitudinal Profile Generation" Ser. No. 62/955,493, filed Dec. 31, 2019, "Image Analysis for Human Perception Artificial Intelligence" Ser. No. 62/827,088, filed Mar. 31, 2019, "Vehicle Interior Object Management" Ser. No. 62/893,298, filed Aug. 29, 2019, "Deep Learning In Situ Retraining" Ser. No. 62/925,990, filed Oct. 25, 2019, and "Data Versioning for Neural Network Training" Ser. No. 62/926,009, filed Oct. 25, 2019.

This application is also a continuation-in-part of U.S. patent application "Avatar Image Animation Using Translation Vectors" Ser. No. 16/206,051, filed Nov. 30, 2018, which claims the benefit of U.S. provisional patent applications "Avatar Image Animation Using Translation Vectors" Ser. No. 62/593,440, filed Dec. 1, 2017, and "Speech Analysis for Cross-Language Mental State Identification" Ser. No. 62/593,449, filed Dec. 1, 2017.

This application is also a continuation-in-part of U.S. patent application "Analysis of Image Content with Associated Manipulation of Expression Presentation" Ser. No. 15/374,447, filed Dec. 9, 2016, which claims the benefit of U.S. provisional patent applications "Analysis of Image Content with Associated Manipulation of Expression Presentation" Ser. No. 62/265,937, filed Dec. 10, 2015, "Image Analysis Using Sub-Sectional Component Evaluation To Augment Classifier Usage" Ser. No. 62/273,896, filed Dec. 31, 2015, "Analytics for Live Streaming Based on Image Analysis within a Shared Digital Environment" Ser. No. 62/301,558, filed Feb. 29, 2016, and "Deep Convolutional Neural Network Analysis of Images for Mental States" Ser. No. 62/370,421, filed Aug. 3, 2016.

The U.S. patent application "Analysis of Image Content with Associated Manipulation of Expression Presentation" Ser. No. 15/374,447, filed Dec. 9, 2016 is also a continuation-in-part of U.S. patent application "Mental State Event Signature Usage" Ser. No. 15/262,197, filed Sep. 12, 2016, which claims the benefit of U.S. provisional patent applications "Mental State Event Signature Usage" Ser. No. 62/217,872, filed Sep. 12, 2015, "Image Analysis In Support of Robotic Manipulation" Ser. No. 62/222,518, filed Sep. 23, 2015, "Analysis of Image Content with Associated Manipulation of Expression Presentation" Ser. No. 62/265,937, filed Dec. 10, 2015, "Image Analysis Using Sub-Sectional Component Evaluation To Augment Classifier Usage" Ser. No. 62/273,896, filed Dec. 31, 2015, "Analytics for Live Streaming Based on Image Analysis within a Shared Digital Environment" Ser. No. 62/301,558, filed Feb. 29, 2016, and "Deep Convolutional Neural Network Analysis of Images for Mental States" Ser. No. 62/370,421, filed Aug. 3, 2016.

The patent application "Mental State Event Signature Usage" Ser. No. 15/262,197, filed Sep. 12, 2016, is also a continuation-in-part of U.S. patent application "Mental State Event Definition Generation" Ser. No. 14/796,419, filed Jul. 10, 2015, which claims the benefit of U.S. provisional patent applications "Mental State Event Definition Generation" Ser. No. 62/023,800, filed Jul. 11, 2014, "Facial Tracking with Classifiers" Ser. No. 62/047,508, filed Sep. 8, 2014, "Semiconductor Based Mental State Analysis" Ser. No. 62/082,579, filed Nov. 20, 2014, and "Viewership Analysis Based On Facial Evaluation" Ser. No. 62/128,974, filed Mar. 5, 2015. The patent application "Mental State Event Definition Generation" Ser. No. 14/796,419, filed Jul. 10, 2015 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

The patent application "Mental State Event Definition Generation" Ser. No. 14/796,419, filed Jul. 10, 2015 is also a continuation-in-part of U.S. patent application "Mental State Analysis Using an Application Programming Interface" Ser. No. 14/460,915, Aug. 15, 2014, which claims the benefit of U.S. provisional patent applications "Application Programming Interface for Mental State Analysis" Ser. No. 61/867,007, filed Aug. 16, 2013, "Mental State Analysis Using an Application Programming Interface" Ser. No. 61/924,252, filed Jan. 7, 2014, "Heart Rate Variability Evaluation for Mental State Analysis" Ser. No. 61/916,190, filed Dec. 14, 2013, "Mental State Analysis for Norm Generation" Ser. No. 61/927,481, filed Jan. 15, 2014, "Expression Analysis in Response to Mental State Express Request" Ser. No. 61/953,878, filed Mar. 16, 2014, "Background Analysis of Mental State Expressions" Ser. No. 61/972,314, filed Mar. 30, 2014, and "Mental State Event Definition Generation" Ser. No. 62/023,800, filed Jul. 11, 2014. The patent application "Mental State Analysis Using an Application Programming Interface" Ser. No. 14/460,915, Aug. 15, 2014 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

Each of the foregoing applications is hereby incorporated by reference in its entirety.

FIELD OF ART

This application relates generally to emoji manipulation and more particularly to emoji manipulation using machine learning.

BACKGROUND

People love to enliven otherwise routine email messages and text messages (SMS) by including emoji within the text.

Emoji can represent pictures (pictograms), ideas (ideograms), emotions (emoticons), animals, food, flags, romance, gestures, and much more. One can even choose a skin tone to match their identity or preference. While the "smiley faces" from years past were created by using letters, numbers, and punctuation, such as "=O" to represent surprise or "8-)" to represent a person wearing glasses and smiling, the use of emoji has become so popular and widely used that the emoji are now routinely included within the operating systems for mobile devices such as smartphones, tablets, and personal digital assistants (PDA). Emoji can be used to replace words or phrases within email and texts. The use of the emoji can improve message clarity while reducing numbers of characters send. The use of emoji can indicate that a message has been sent in jest or to tease, thus adding clarity to the meaning or intent of the message. The use of emoji has become so popular that some users try to send entire messages using only emoji. Such messages are usually short and can be understood across multiple languages. Thus, using four emoji, the text of the message, "My flight arrives at 1330 into gate 10" can be replaced with the four emoji that include a plane, a time, a gate, and a number. There is little risk of a confusing message resulting from a poor automatic translation from the English text to another language.

In addition to the use of emoji, deep learning techniques are gaining wide popularity in a variety of application and research areas. Deep learning, or machine learning, is being applied to applications such as speech and audio recognition; natural language processing; computer vision and facial recognition; biometric verification; and many others. Deep learning is being used to develop the widely used "smart assistants" that help to find airline tickets or to answer questions about an interesting item found while shopping online. Deep learning is also being applied to traditionally difficult problems and research areas such as various areas of design, machine translation, medical analysis of injuries and diseases, filtering for spam messages and inappropriate social media content, and games. A deep learning system is trained before it is deployed for its intended application. The system is trained by feeding it data for which correct answers or responses are known. That is, an image that is known to contain a cat is used to train the deep learning system to find cats in other images. Typically, the more training data that is used to train the deep learning system, the better the training results.

SUMMARY

A machine learning system is accessed. The machine learning system is used to translate content into a representative icon. The machine learning system is used to manipulate emoji. The machine learning system is used to process an image of an individual. The machine learning processing includes identifying a face of the individual. The machine learning processing includes classifying the face to determine facial content using a plurality of image classifiers. The classifying includes generating confidence values for a plurality of action units for the face. The facial content is translated into a representative icon. The translating the facial content includes summing the confidence values for the plurality of action units. The representative icon comprises an emoji. A set of emoji can be imported. The representative icon is selected from the set of emoji. The emoji selection is based on emotion content analysis of the face. Selected emoji can be static, animated, or cartoon representations of emotion. Selected emoji can be shared through insertion into email, texts, and social sharing websites. For example, if the emotional state of the individual is detected as a happy state, a smiling emoji may be used as the representative icon. Similarly, if the emotional state of the individual is detected as angry, then an angry emoji may be used as the representative icon. Additionally, the representative icon may include information on gender, age, or ethnicity. For example, if the individual is determined to be female, then a female emoji may be used as the representative icon. The selected emoji can be a static image, an animated image, and a cartoon representation. The representative icon represents an emotional state for the individual. The representative icon can then be used in electronic communication. In embodiments, the representative icon is transmitted within a social media context. The representative icon can portray an individual's emotional state, mental state, or cognitive state, which terms are used interchangeably at a high level herein, because the human mind of an individual is often difficult to understand, even for the individual.

A computer-implemented method for emoji manipulation is disclosed comprising: accessing a machine learning system; processing an image of an individual, using the machine learning system, wherein the processing includes: identifying a face of the individual; and classifying the face to determine facial content using a plurality of image classifiers, wherein the classifying includes generating confidence values for a plurality of action units for the face; and translating the facial content into a representative icon, wherein the translating the facial content includes summing the confidence values for the plurality of action units. In embodiments, the representative icon comprises an emoji. In embodiments, the summing includes a weighted summation of the confidence values. In embodiments, the summing includes negative weights.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
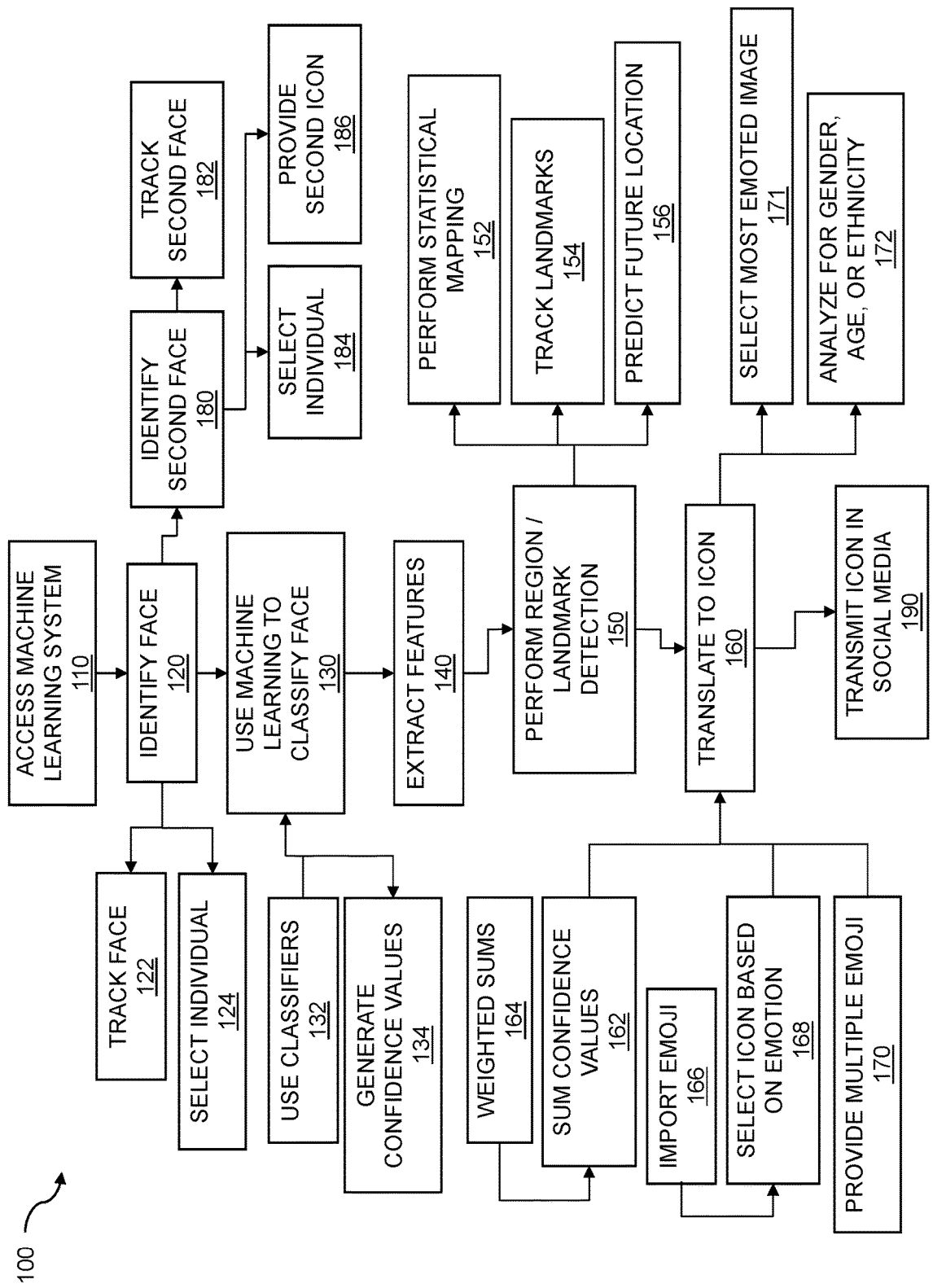
FIG. 1 is a flow diagram for emoji manipulation using machine learning.

Machine learning can mimic human learning in some aspects. Humans are able to observe and process environmental stimuli by continuously experiencing their surroundings using their senses. The sense of sight is unique in its own right, as humans use vision to process the views of their surrounding environment for a variety of purposes. The purposes for processing the views of the surrounding environment are many, including locating objects to pick up or avoid, scanning for potential attractions and dangers, and identifying loved ones and friends, among many other tasks. Much of the processing is instinctual. For example, a sudden movement caught in a person's peripheral vision can cause her or him to shift attention to the source of the moment. The shift of attention can be due to fear, interest, amusement, and so on. Additionally, the shift of attention is used to identify the source of the movement. If, for instance, the movement is a glint of sunlight caught by a wave on a peaceful lake, the source is probably harmless and can be appreciated or ignored. On the other hand, if the source of movement is an oncoming truck near a crosswalk, then immediate, evasive action is required.

Human interaction is largely based on observing other human faces while interacting. Regardless of whether the interactions include sound, smell, touch, or any of the other senses, sight plays a critical role in a social interaction, as the human face is highly expressive. The various facial expressions range widely and can convey a mental state of a person, an emotional state of a person, a cognitive state of a person, and so on. For example, a sultry smile communicates a very different message to the recipient of the smile than an angry frown. In another example, a neutral expression can indicate, boredom, inattention, indifference, and so on. This exchange of social information between or among the participants in the interaction greatly influences how the interaction progresses. A sultry smile may attract people to the interaction and retain them in it, while an angry frown can cause people to leave the interaction, perhaps with some haste. In this sense, facial expressions can control human interaction.

Electronic communications lack much of the sensory information that is critical to human interaction. For instance, an email message or text message can be read for content, but the context in which the message was sent is not necessarily obvious. For example, the phrase, "do what you like" can be read easily enough, but the meaning behind the phrase might not be evident, as the phrase could be an invitation, an accommodation, a final frustrated exclamation, and so on. In this case, providing additional information to help convey the true intentions of the sender would greatly clarify the text. In another example, a person who has received great news might choose to share her or his good fortune with friends and family. Choosing and sharing a picture or icon that typifies the person's emotion or mood can communicate much more information than can a short, simple message.

In this technique, access to a machine learning system can be obtained. The machine learning system can be used to process an image of an individual. The machine learning processing can include identifying a face of the individual. The machine learning processing can include classifying the face to determine facial content using a plurality of image classifiers. The classifying can include generating confidence values for a plurality of action units for the face. The facial content can be translated into a representative icon. The translating the facial content can include summing the confidence values for the plurality of action units. The representative icon can comprise an emoji. The representative icon that results from the translating can be selected from a set of emoji. The representative icon can be selected based on emotion content analysis of the identified face. The selected emoji can include information on gender, age, or ethnicity. The representative icon can be transmitted within a social media context. These techniques enable a wide variety of usage scenarios.

One such usage scenario is instant messaging (IM) chat. In this use case, as two users communicate with each other via IM, a user facing camera on the device of each user collects video of the user's face, and periodically, an emoji is selected based on a detected expression and/or emotional state within the collected video. This emoji is then transmitted to the other user. Each user periodically receives emoji that are indicative of the mental/emotional state and/or expression of the user with whom they are communicating.

Another usage scenario arises when a single user posts to a social media site. A user facing camera on the device of the user collects video of the user's face. Cognitive state analysis is performed to select a representative icon that is transmitted along with the social media post. For example, if the user is happy about getting a new job, and posts it to his/her social media account, a happy emoji can be automatically appended to the end of the post. Many other scenarios and use cases are possible with the techniques presented in this disclosure.

FIG. 1 is a flow diagram for emoji manipulation using machine learning. The flow 100, or portions thereof, can be implemented using a mobile device, a server, a semiconductor chip, and so on. The flow 100 describes machine learning analysis of image content with associated manipulation expression content based on analysis of one or more images of one or more people. The flow 100 includes accessing a machine learning system 110 for processing one or more images of an individual. The machine learning system can be a deep learning system, a neural network system, a convolutional neural network system, and so on. An image of the individual can be captured with a camera, where the camera can be any of a variety of cameras. A camera can include a webcam, a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. The image can be a still image, a frame from a video, a video, and so on. The image can be one image from a series of images of the individual. The series of images can include a video of the individual. The flow 100 includes identifying a face 120 of the individual. A given image that is obtained can include objects, animals, people, etc. When a person is found in the image, the image can be analyzed to locate the face of the person in the image. The face can be identified in the image using a variety of image processing and analysis techniques including edge detection, gradient calculation, machine learning, and so on. The flow 100 includes tracking the face 122 within the video. The tracking the face can include movement of the face within the series of images, the face leaving the series of images, the face returning to the series of images, and so on. The movement of the face can include rotation, scaling, translation, and so on. The flow 100 includes selecting the individual 124 from a plurality of people that can be found in a given image. An individual can be selected and various analyses can be performed on the image of the individual selected. The analysis steps can be repeated for additional individuals who might be found in the image, as will be discussed in more detail in the following paragraphs.

The flow 100 includes using machine learning for classifying the face 130. The classifying of the face can include the use of one or more image classifiers 132. The image classifiers in use may include, but are not limited to, Neural Network, Support Vector Machine (SVM) and/or Bayesian image classifiers. In embodiments, the image classifiers are used to map facial landmarks within the face to emotional content. In embodiments, the emotional content comprises a facial expression. The flow 100 may include generating confidence values 134. The confidence values can be based on an output of the one or more image classifiers. The one or more image classifiers may be trained in a supervised or unsupervised learning process. Once trained, the classifiers can generate a confidence value for the existence of a given facial feature, such as a smile, brow raise, and the like. The confidence values can represent a probability or likelihood of the presence of a particular feature.

The flow 100 includes extracting features 140 within the face of the individual. Features, for example facial features, can include the height of a face, the width of a face, the size of eyes, the distance between eyes, the distance between the nose and mouth, the size of ears, the position of ears, and so on. Any facial features relevant to facial analysis can be extracted. Thus, embodiments include extracting features within the face of the individual. The flow 100 includes performing facial region or landmark detection 150 on the face of the individual. The facial landmark detection can be based on a variety of facial features and can include an eyebrow, an outer eye edge, a nose, a corner of a mouth, and so on. Any number of facial landmarks can be detected from the facial data that is captured. The flow can include determining regions within the face of the individual rather than detecting landmarks. Classifiers can then be used to evaluate the region or regions of the face to detect emotional content, e.g. brow furrows, smiles, etc. The flow can include performing a statistical mapping for the regions within the face into facial content. The statistical mapping can take facial image input and provide probabilities that certain facial action units have occurred. Thus, an image is provided as input, and a probability of the existence of an action unit within a face in that image is provided as an output. The statistical mapping can include evaluation of action units for the facial content. The facial content can include emotional content.

The flow 100 can include performing a statistical mapping 152. The statistical mapping can include sorting and/or ranking the features according to the generated confidence values. Thus, embodiments include performing a statistical mapping for the regions within the face into the facial content. In embodiments, translating the facial content is based on the statistical mapping. For example, when it is detected that there is a high probability (confidence value) that a user is smiling, a happy emoji may be selected for inclusion in a message or other electronic communication of the user.

The flow 100 can include tracking landmarks 154. As an individual moves during the collection of video, the location of the landmarks also moves. The flow 100 may include predicting a future location 156 of one or more landmarks. For example, if an individual is moving from right to left within the field of view of a video camera that is being used for image collection, a landmark may be detected at a first location in frame X. That landmark is then detected at a second location in frame X+1. The difference and direction between the first and second location can be computed, and a predicted location for a future frame (e.g. frame X+2) can be computed (e.g. by extrapolation). Thus, embodiments include predicting a future location for the facial landmarks and using the future location in the translating of the facial content. By using a predicted location, a more efficient identification of landmarks within video can be achieved. Thus, embodiments include tracking facial landmarks that were identified by the facial landmark detection. Furthermore, embodiments include using the future location for tracking the face from frame to frame of a video.

The flow 100 can include translating facial regions or landmarks, detected during the performing of the facial region/landmark detection, into a representative icon 160. The representative icon can be a character, a pictograph, an emoticon, and so on. The representative icon can be a character included in a communication standard. The translating can be based on image classifiers. The image classifiers can be used to analyze the face that can be identified in the one or more images. The classifiers used to process the images can be algorithms, heuristics, short pieces of code, and so on. The classifiers can be implemented using mobile devices, server devices, specially designed integrated circuits, etc. The flow 100 can include summing confidence values 162. The confidence values can be associated with one or more action units that are detected in a face. The flow 100 can include computing weighted sums 164. The weighted sums can be used to give certain action units more importance in identifying a particular expression. For example, for detecting a smile, action unit AU12 (Lip Corner Puller) and an absence of AU16 (Lower Lip Depress) may be important in detecting a smile. AU25 (lip part) may also be present in many smiles, but it may still be possible to smile without the presence of that action unit. Thus, an exemplary expression for a smile may be expressed as:

$$XP_1+Y(\text{NEG}(P_2))+ZP_3$$

Where $P_1$ is a confidence value for AU12, $P_2$ is a confidence value for the absence of AU16, and $P_3$ is a confidence value for AU25. Weights are applied to each confidence value. X is the weight for $P_1$, Y is the weight for the absence of $P_2$, and Z is the weight for $P_3$. In embodiments, Y may be a negative weight to perform the negation operation. Thus, in embodiments, the summing includes negative weights. In this example, Z may be less than both X and Y, since the action unit AU25 is not as important in identifying the example expression. For example, in an embodiment, X=10, Y=10, and Z=5. Thus, in embodiments, the summing includes a weighted summation of the confidence values. As can be seen, some expressions may include confidence values for the presence of an action unit, the absence of an action unit, or a combination of presence and absence of different action units.

The image classifiers can be used to map facial landmarks within the face to emotional content. For example, the positions of various facial landmarks can be analyzed to determine an emotional state, a mood, and so on. The translating can include detection of one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, poignancy, or mirth. The emotional content that can be mapped can include a facial expression. For example, the facial expression can include a smile, a wink, a kiss, a smirk, and so on. The translating can be based on motion of the facial landmarks. The motion of facial landmarks can include movement resulting from the formation of facial expressions such as the formation of a smile, a smirk, a frown, etc. The motion of facial landmarks can include rotation, translation, scaling, etc. of the face within the image. The motion of the facial landmarks can include a face leaving a subsequent image in a series of images, reappearing in a subsequent image in a series of images, and so on. The translating can comprise mapping action units to the representative icon. The mapping can be based on a weighted combination of the action units. The translating can comprise replacement of an emoji keyboard. The translating can augment information from an emoji keyboard. In some embodiments, the translating provides a subset of emoji for selection using an emoji keyboard. Some embodiments include tracking the face in the image and a plurality of additional images. Some embodiments include tracking a second face within the plurality of additional images. Some embodiments include selecting the individual from a plurality of people. And some embodiments include selecting a most emoted image from the image and the plurality of additional images and performing the translating for the most emoted image.

The representative icon can include an emoji. One or more emoji can be used to represent a mental state, a mood, etc. of an individual; to represent food, a geographic location, weather, and so on. The emoji can include a static image. The static image can be a predefined size such as a number of pixels, for example. The emoji can include an animated image. The emoji can be based, for example, on a GIF or another animation standard. The emoji can include a cartoon representation. The cartoon representation can be any cartoon type, format, etc. that can be appropriate for representing an emoji. The flow 100 includes importing a set of emoji 166. The emoji that can be imported can include characters, pictographs, emoticons, and any of a set of standard, official, and custom emoji. The emoji can be imported based on user preferences and/or a user profile. For example, if gender and ethnicity information is available in a user profile, then the imported emoji can be based on the gender and ethnicity contained within the user profile. The emoji can be imported from a source, uploaded by a user, downloaded from the Internet, etc. In embodiments, the emoji includes information on gender, age, or ethnicity. The representative icon can be an emoji from the set of emoji.

The representative icon can be automatically selected, prechosen, selected by the person, and so on. Thus, embodiments include providing a plurality of emoji wherein the representative icon is included within the plurality of emoji. The flow 100 includes selecting the representative icon from the set of emoji based on emotion content analysis 168 of the face. The selecting of the representative icon can be based on the use of the image classifiers as previously discussed. In embodiments, the representative icon includes an emoji. The representative icon can be selected from emoji and can represent one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, poignancy, or mirth. The representative icon can represent other moods, mental states, cognitive states, facial expressions, and so on. In some cases, a plurality of emoji is presented to an individual for selection of an appropriate emoji. The individual can be the person being observed or can be a third party. Thus, in embodiments, the representative icon represents an emotional state for the individual.

The selection of an icon based on emotion can be accomplished in a variety of ways. In embodiments, it can occur as part of translating the facial content into a representative icon. In some embodiments, translating comprises replacement of an emoji keyboard. Thus, instead of needing to switch to a specific emoji keyboard to enter an emoji, embodiments may automatically select an emoji from a list/table of available emoji, and automatically include the emoji in a user's message. In some embodiments, the emoji is appended to the end of the message. However, other embodiments may prepend the emoji at the beginning of the message or include the emoji at some intermediate point within the message.

In yet other embodiments, the translating augments information from an emoji keyboard. In such an embodiment, an emoji keyboard may have one or more emoji highlighted, or otherwise emphasized as the likely emoji to use, based on a detected expression and/or emotional/cognitive state of the user. In some embodiments, the emoji keyboard may be sorted based on the suggested/recommended emoji determined from computed confidence values of one or more emoji. In some embodiments, the translating provides a subset of emoji for selection using an emoji keyboard. Thus, in some embodiments, the emoji keyboard may include a subset of the full emoji set. The subset includes one or more emoji that are deemed to be suitable for inclusion in a user's message, based on the detected facial expressions of the user.

In some embodiments, instead of automatically inserting an emoji, the user may be prompted to select an emoji from a set of one or more emoji that are deemed as appropriate, based on detected facial expressions and/or cognitive state of the user. Thus, in embodiments, the plurality of emoji is presented to the individual for selection of an appropriate emoji. In embodiments, each emoji may be displayed with a corresponding probability score. Thus, in embodiments, the plurality of emoji is presented with a probability score to aid the individual in the selection.

The representative icon can represent an emotional state for the individual. For example, the representative icon can be an emoji and can represent that the individual is happy, sad, angry, confused, etc. The emoji that can be selected to be the representative icon can include information on gender, age, or ethnicity. For example, the emoji selected can include long hair, short hair, no hair, curly hair, and straight hair; a color to represent a skin tone or any random color; facial adornments including glasses, sun glasses, facial jewelry, and tears; and any other figure, pictogram, emoticon, emoji, etc. that can be used to indicate gender, age, or ethnicity. In embodiments, the gender, age, or ethnicity is detected by analyzing the image. The image may be a still image or video frame of the user detected by a user-facing camera. The flow 100 includes analyzing the image 172 by detecting gender, age, or ethnicity. The image can be analyzed for facial features including skin tone, facial shape, skin texture, hair texture, hair color, eye shape, eye placement, etc. The action units can be mapped to the representative icon. The action units can include facial action units from the facial action coding system (FACS). The facial action units can include AU1 inner brow raiser, AU2 outer brow raiser, AU6 cheek raiser, AU12 lip corner puller, etc. Any action units from FACS or other facial action codes can be used. The mapping can be based on a weighted combination of the action units. The weighting can include a coefficient that can be positive (AU can be present) or negative (AU can be absent). Any number of action units can be included in the weighting.

The flow 100 includes providing multiple emoji 170 wherein the representative icon is included within the plurality of emoji. The plurality of emoji can be provided for automatic selection, for selection by the person in the image, for selection by one or more people who might or might not be in the image, and so on. The plurality of emoji can be presented with a probability score to aid the individual in the selection. For example, several emoji that represent a smirk can be presented to the individual. The emoji can be of different size, different colors, and/or can include other features such as open eyes, closed eyes, a winking eye, etc. The probability that can be included with the provided emoji can be based on emoji most likely to represent a cognitive state or mode of the individual. For example, emoji representing kissing could be ranked from a friendly peck, to a passionate kiss, to a kiss as an expression of derision. The flow 100 includes selecting a most emoted image 171 from the series of images and performing the translating for the most emoted image. For example, statistics can be kept regarding which of one or more emoji are likely to be selected to represent a particular facial expression, cognitive state, mood, and so on. The most emoted image can be based on computing the most expressive image in a collection of images. The most emoted image can be based on demographic and other information. The translating can be based on a cognitive state event temporal signature. For example, the translating into a representative icon can be based on the time of a specific event such as a world event, a sporting event, a personal event, etc.

The flow 100 can include identifying a second face 180 within the image. As previously described, one or more images can be analyzed for the presence of one or more individuals. When more than one individual can be found in an image, then the identifying can be repeated for the additional faces. The flow 100 includes tracking a second face 182 within the video. As described above, the tracking can include tracking the face while the face rotates, scales, and translates among images that include the face. The tracking can include the face leaving (e.g. not being found) in a subsequent image, returning (e.g. being found) in a subsequent image, and so on. The flow 100 includes selecting the individual 184 from a plurality of people. The selecting the individual can include selecting the second face identified in the image containing more than one face. When more than two faces can be identified in the image, the selecting can be repeated for any number of the additional faces in the image. The flow 100 includes providing a second representative icon 186 for the second face. A plurality of representative icons can be presented where one or more of the icons that can be provided can include a probability. The probabilities that can be provided can be based on a most emoted image or icon, a most popular image or icon, a temporal signature, and so on.

The flow 100 includes transmitting the representative icon within a social media context 190. The individual whose face can be identified can choose to share the one or more representative icons on social media. The social media can include any social media context including, for example, Facebook™, Twitter™, Instagram™, Tumblr™, and so on. The sharing can be based on the individual choosing a representative icon such as an emoji and sharing that representative icon on the individual's social network. The sharing can be based on automatic posting of the representative icon. The automatic posting can be based on the individual opting in to the automatic sharing. The sharing can be based on social media friends posting representative icons to the social media of the individual. The representative icons can be shared between and among two or more individuals identified in an image, for example. The representative icons can be based on the most emoted images, a temporal signature, and so on. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
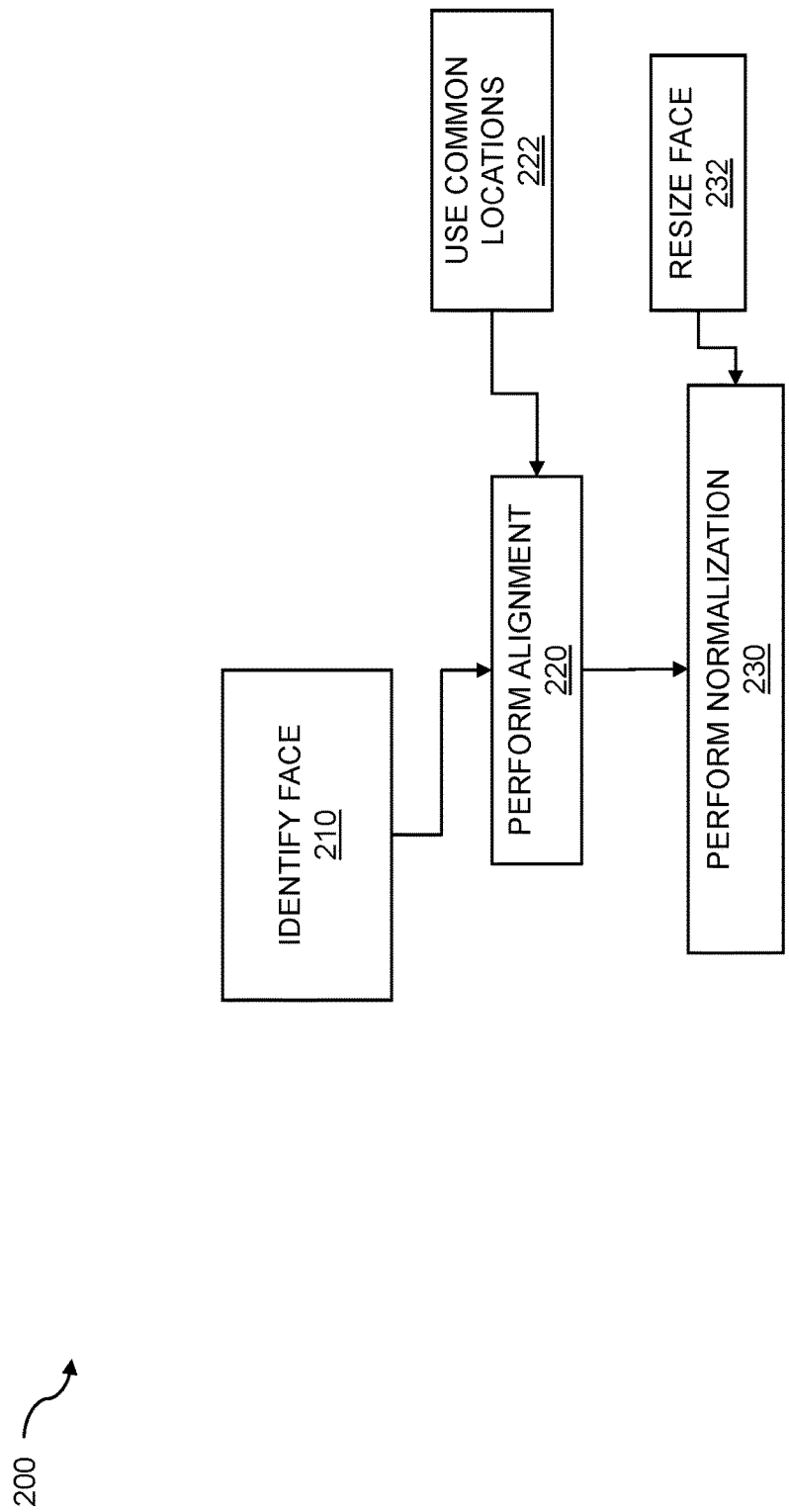
FIG. 2 is a flow diagram for face manipulation.

FIG. 2 is a flow diagram for face manipulation. The flow 200 includes identifying a face 210. This may include, but is not limited to, identifying face boundaries, identifying face landmarks, and/or identifying facial features or elements such as eyes, nose, and mouth. The flow 200 continues with performing alignment 220. The alignment 220 may include rotating the face to a substantially vertical (portrait) orientation. Thus, embodiments include performing alignment on the face that was identified. The flow 200 may include using common locations 222 in the alignment. The common locations 222 can pertain to regions of pixels. For example, the alignment may include moving and/or transforming the image such that the mouth of the face is shown within a given region of pixels within the image. In some embodiments, performing alignment includes using common locations for eye and lip coordinates for the face from frame to frame of a video. The flow 200 continues with performing normalization 230. Thus, embodiments include performing normalization on the face that was identified. In embodiments, performing normalization includes resizing the face 232. Normalization 230 may also include additional processing such as contrast adjustment, brightness adjustment, saturation adjustment, hue adjustment, background removal, color substitution, and/or other techniques for improving downstream process efficiency.

Figure 3:
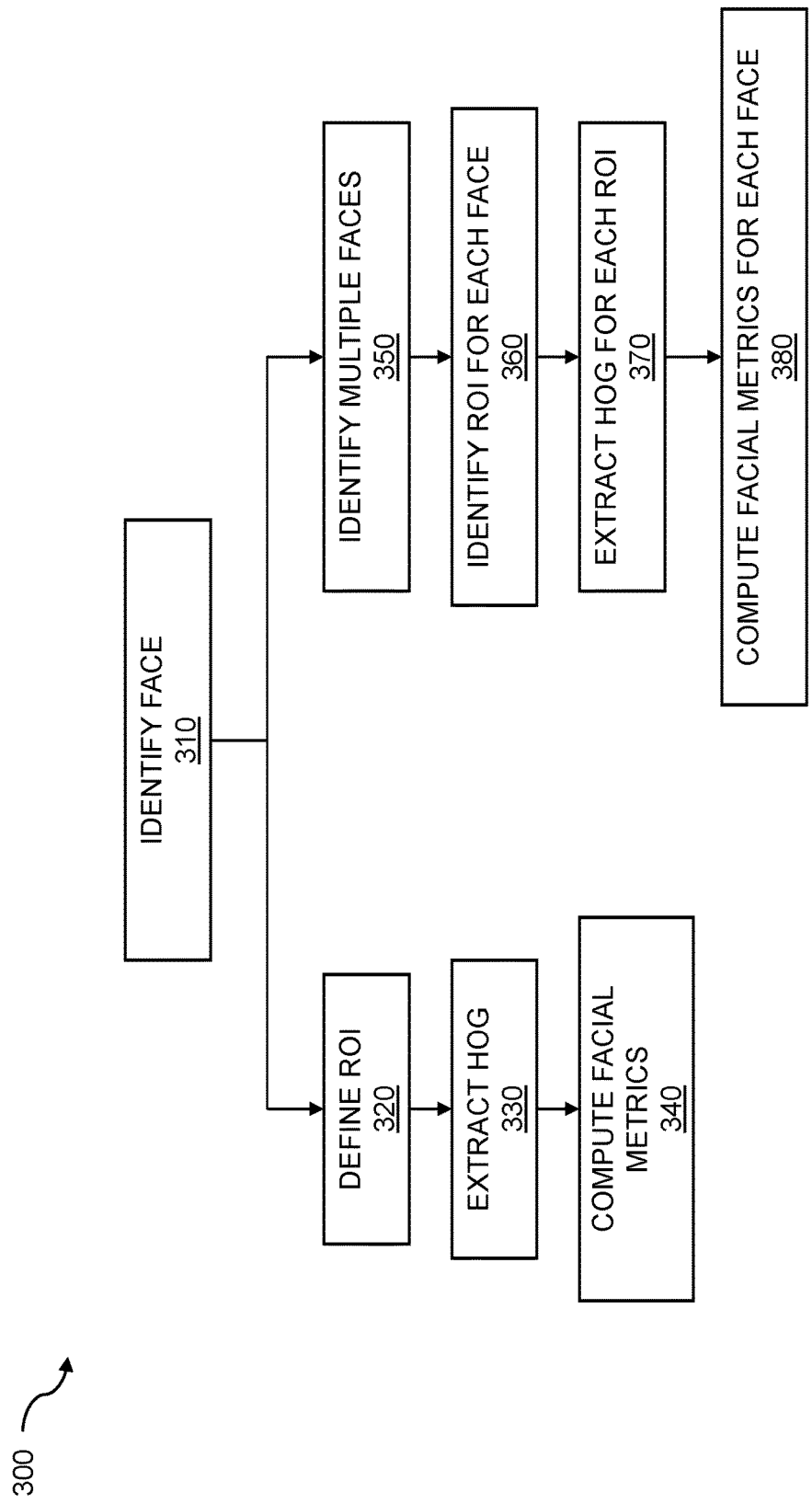
FIG. 3 is a flow diagram for computing facial metrics.

FIG. 3 is a flow diagram for computing facial metrics. The flow 300 can be implemented on a mobile device, on a server, in a semiconductor chip, and so on. The flow 300 describes computing facial metrics for one or more faces identified in images, and the facial metrics can be used in the translation of facial expressions into emoji. The flow 300 includes identifying a face 310 of the individual in an image of an individual. Various techniques can be used to identify the face of the individual in the image, including image analysis techniques. The flow 300 includes defining a region of interest (ROI) 320 in the image that includes the face. The region of interest can be located in a face based on facial landmark points such as edges of nostrils, edges of a mouth, edges of eyes, etc. The flow 300 includes extracting one or more histogram of oriented gradients (HoG) 330 features from the ROI. A HoG can be based on a count of occurrences of gradient orientation, where the gradient orientation can be located within a given section of an image, for example. The gradients can be based on intensity, for example. The flow 300 includes computing a set of facial metrics 340 based on the one or more HoG features. The facial metrics can be used to identify the locations of facial features such as a nose, a mouth, eyes, ears, and so on. Thus, embodiments include defining a region of interest (ROI) in the image that includes the face; extracting one or more histogram-of-oriented-gradients (HoG) features from the ROI; and computing a set of facial metrics based on the one or more HoG features. The flow 300 includes identifying multiple human faces 350 within the image. The captured image that can be analyzed for the presence of one person can be analyzed for the presence of two or more people. The flow 300 includes identifying a region of interest (ROI) in the image for each identified human face 360. The regions of interest for the one or more faces can include facial landmarks. The flow 300 includes extracting one or more HoG features from each ROI 370. The HoG can include facial feature descriptors and can be computed for the regions of interest. The flow 300 includes computing a set of facial metrics based on the one or more HoG features for each of the multiple human faces 380. As mentioned above, the facial metrics can be used to identify the locations of facial features including facial landmarks.

In embodiment, the elements of the flow 300 can be performed using machine learning, as described below. The machine learning can be accomplished using a multilayered convolutional computing system, a convolutional neural network, or other techniques. The machine learning can accomplish image analysis, audio analysis, and other analysis tasks. Various steps in the flow 300 may be changed in order, repeated, omitted, or the like without departing from the disclosed concepts. Various embodiments of the flow 300 can be included in a computer program product embodied in a non-transitory computer readable medium that includes code executable by one or more processors. Various embodiments of the flow 300, or portions thereof, can be included on a semiconductor chip and implemented in special purpose logic, programmable logic, and so on. Thus, embodiments include identifying multiple human faces within the image; defining a region of interest (ROI) in the image for each identified human face; extracting one or more histogram-of-oriented-gradients (HoG) features from each ROI; and computing a set of facial metrics based on the one or more HoG features for each of the multiple human faces.

Figure 4A:
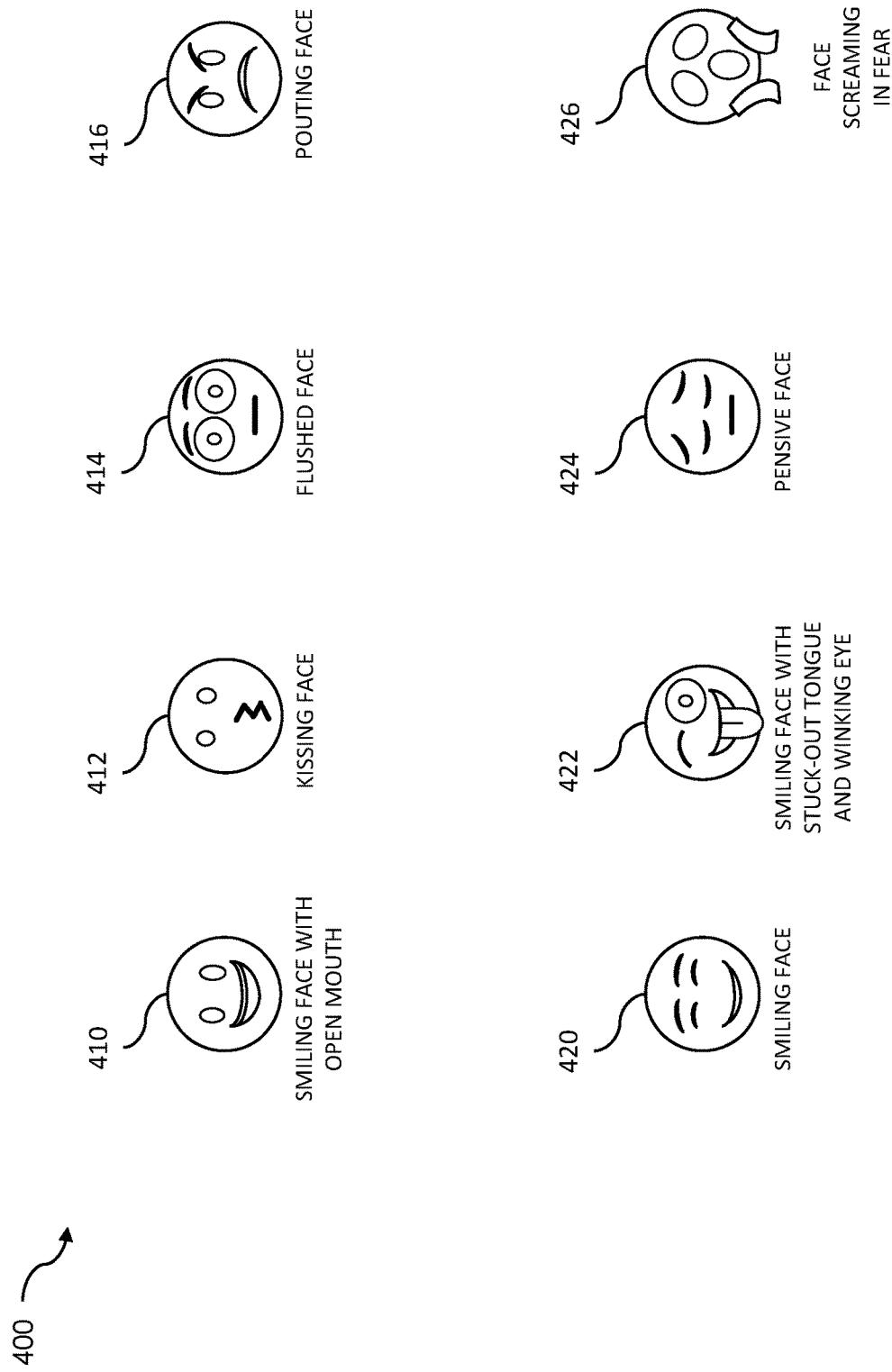
FIG. 4A shows example emoji.

FIG. 4A shows example emoji 400. Emoji such as those seen in the example have come in to widespread use in a variety of electronic and other communications that can include email, text messages (SMS), social networking apps, and so on. Emoji can denote geographic locations, types of weather, pets and other animals, various objects, facial expressions, etc. Emoji can be specific to a variety of activities, applications, business practices, cultural norms, foods, and so on. The example emoji 400 illustrate a variety of facial expressions. The facial expressions can imply one or more cognitive states, one or more moods, etc. The emoji for facial expressions can include a smiling face with open mouth, a white smiling face (sometimes referred to as the generic smiley face), a winking face, a kissing face with closed eyes, a kissing face, a face with stuck-out tongue and winking, a face with stuck-out tongue, a face with stuck out tongue and tightly closed eyes, a flushed face, a pensive face, a disappointed face, an unamused face, a pouting face, a face screaming in fear, an astonished face, a smirking face, and so on. Emoji can be used to express demographic information that can include gender, age, ethnicity, and so on. Emoji 410 represents a smiling face with an open mouth. Emoji 412 represents a kissing face. Emoji 414 represents a flushed face. Emoji 416 represents a pouting face. Emoji 420 represents a smiling face. Emoji 422 represents a smiling face with a stuck-out tongue and winking eye. Emoji 424 represents a pensive face. Emoji 426 represents a face screaming in fear.

Figure 4B:
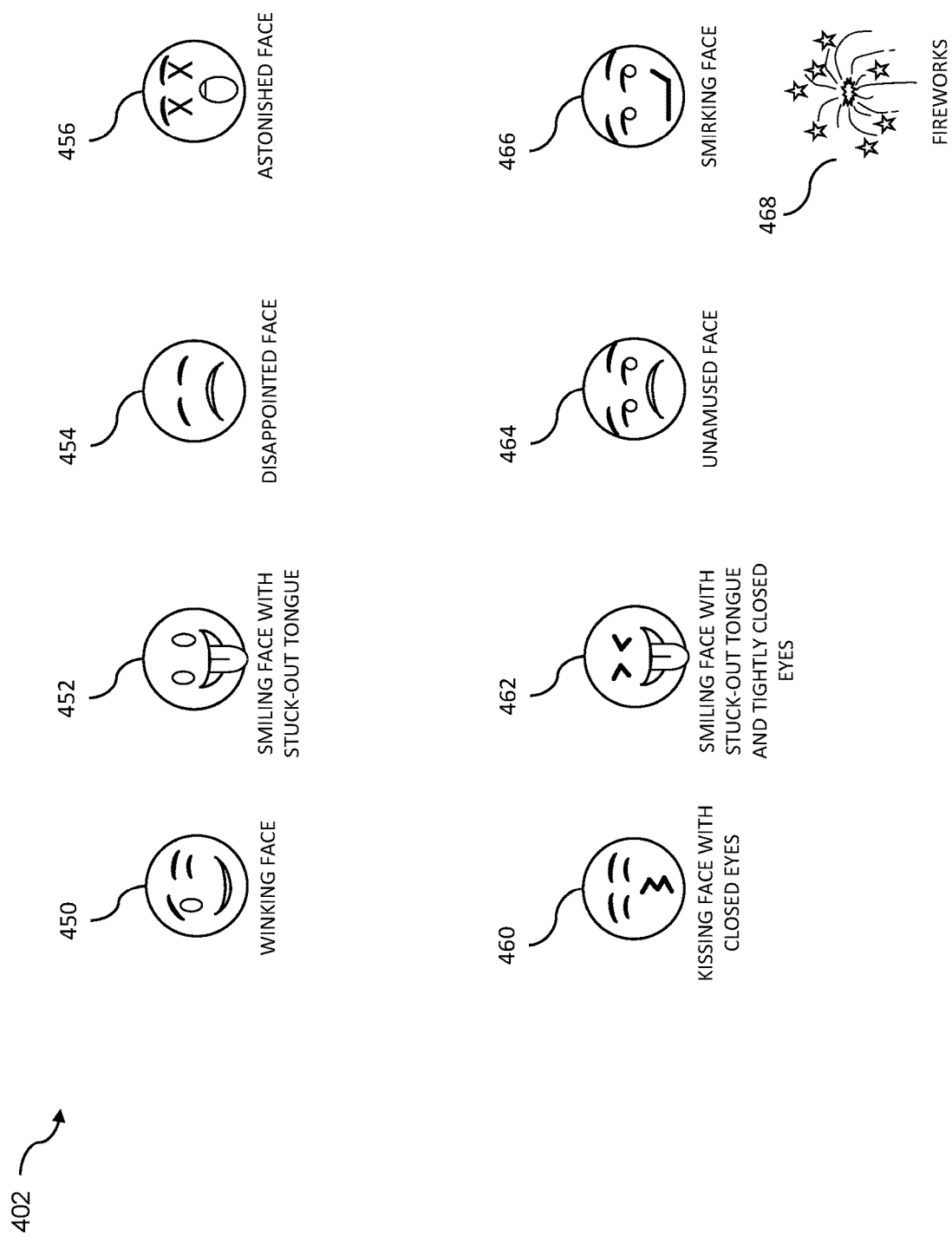
FIG. 4B illustrates additional emoji.

FIG. 4B illustrates additional emoji. The example emoji 402 illustrate a variety of additional facial expressions. Emoji 450 represents a winking face. Emoji 452 represents a smiling face with a stuck-out tongue. Emoji 454 represents a disappointed face. Emoji 456 represents an astonished face. Emoji 460 represents a kissing face with closed eyes. Emoji 462 represents a smiling face with a stuck-out tongue and tightly closed eyes. Emoji 464 represents an unamused face. Emoji 466 represents a smirking face. Emoji 468 represents fireworks.

Each of the emoji shown in FIG. 4A and FIG. 4B can be included in a database. In embodiments, each emoji can be associated with an index. The database may be a relational database such as a Structured Query Language (SQL) database. One or more tables may be associated with each emoji, and may contain various attributes of the emoji. The attributes may include one or more emotions/cognitive states associated with the emoji. For example, emoji 410 and emoji 420 may be associated with happiness. Some emoji may be associated with multiple emotions. For example, emoji 464 may be associated with disappointment, worry, and discontent. Additionally, some emoji may not necessarily resemble a human form. For example, emoji 468 represents fireworks. The fireworks emoji 468 may be associated with a high level of happiness. Thus, when a high level of happiness is detected, a fireworks emoji 468 may be presented. This is merely exemplary, and other non-human-form emoji may also be used in disclosed embodiments.

The database may further include attributes, such as one or more action units that are associated with each emoji, as well as action units whose absence can be associated with the emoji. For example, emoji 450 may be associated with AU46 (wink), AU12 (lip corner puller) and an absence of AU15 (lip corner depressor). The database can also include additional information such as user preferences, and/or user profile information such as gender, age, and/or ethnicity. The user profile and/or user preference information can be used as criteria for determining an emoji to select and/or suggest for insertion into a message and/or post. In some embodiments, more than one emoji may be automatically included in a message. For example, if a user is detected to be very happy, two of emoji 410 and three of emoji 468 can be included in the message.

Figure 5:
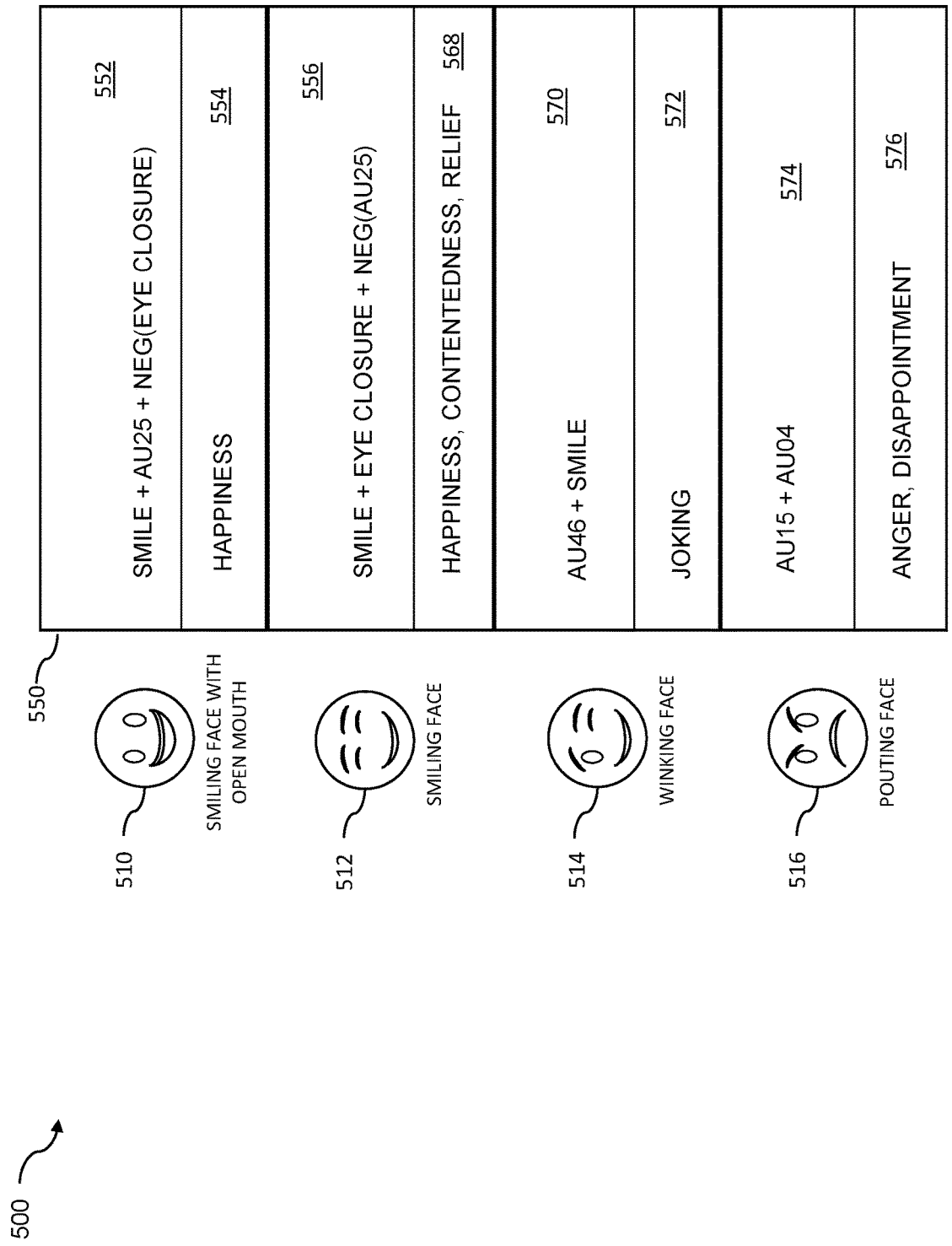
FIG. 5 shows example emoji with action unit (AU) combinations.

FIG. 5 shows example emoji with action unit (AU) combinations. Facial expressions can be displayed by a human face and can be described by the presence and absence of one or more action units. The action units can be based on movements of one or more facial muscles and can be codified with a system such as the facial action coding system (FACS). The action units described in FACS can each have a number as well as a description. The AUs can correspond to positions of specific facial portions. For example, AU25 can be described in FACS as "Lips Part" and can correspond to depressor labii inferioris, etc. Any number of AUs can be included in a facial expression. Similarly, any number of AUs and/or facial muscle movements can correspond to an emoji. One or more emoji can be selected to represent a given facial expression, for example. In the example 500, certain emoji with combinations of one or more action units (AUs) are shown that can form the basis of the emoji. The emoji are shown along with corresponding entries in a data table 550. The data table 550 may be implemented as one or more tables in a relational database. Emoji 510 is associated with field 552 and field 554. Field 552 contains identification information for the emoji. The identification information can include AUs, other codes, and/or descriptive text. Combinations of AUs, negative AUs, the absence of AUs, etc., can be determined for any number of emoji, where the emoji can describe facial expressions, activities, and so on, as previously described. For example, the smiling face with open mouth emoji 510 can be associated with a combination of smile+AU25+negative (eye closure), as indicated in field 552. Furthermore, emoji 510 is associated with an emotion of happiness, as indicated in field 554. Similarly, the smiling face emoji 512 can be associated with a combination of smile+eye closure+negative (AU25), as indicated in field 556. Furthermore, emoji 512 is associated with an emotion of happiness, contentedness, and relief 568. The winking face emoji 514 can be associated with the presence of a wink (AU46) and a smile, as indicated in field 570. Furthermore, emoji 514 is associated with an emotion of joking, as indicated in field 572. The pouting face emoji 516 can be associated with the presence of AU15 and AU04 574, and the emoji 516 is associated with the emotions of anger and disappointment as indicated in field 576. A similar categorization can exist in table 550 for the other emoji shown in FIG. 4A and FIG. 4B.

Figure 6:
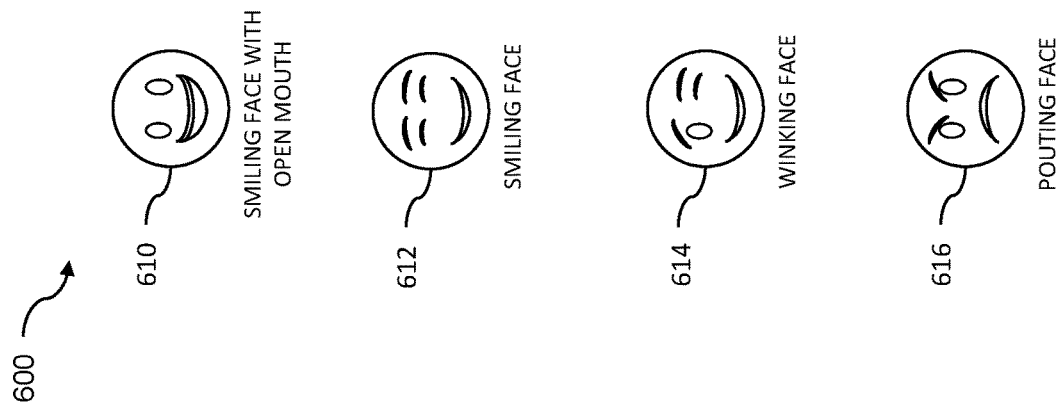
FIG. 6 illustrates example emoji with AUs and weights.

FIG. 6 shows example emoji with AUs and weights. In the example 600, one or more emoji can be selected as representative icons that can result from translating facial landmarks of a face that can be identified in an image obtained of an individual. The one or more emoji can be based on facial expressions, where the facial expressions can include the presence or absence of one or more action units (AUs). Since the magnitude of a particular AU can vary from person to person and from image to image, weights can be assigned to help assist in the selection of an emoji as a representative icon. The action units can be added, subtracted, multiplied, etc., as part of the weighting. For example, a smiling face with open mouth emoji 610 can include positive AUs (smile, AU25) and negative AU (eye closure). The weight can be determined as a function of one or more attributes and/or action units. In embodiments, the function is a minimum function that returns the minimum value amongst multiple input values. A weight for the emoji smiling face with open mouth can be determined based on an expression equaling a minimum value from the AUs, a maximum value from the AUs, arithmetic combinations of the AUs, and so on. For example, a weight for determining the emoji 610 of a smiling face with open mouth can be: func(smile, AU25, 100-eye_closure). The function can be a minimum function, in which case the weight can be expressed as min (smile, AU25, 100-eye_closure). The smiling face emoji 612 can include action units AU25, AU02, and AU04. In embodiments, the weight for determining the emoji 612 can be expressed as min((smile, AU25)−0.2*AU02−0.2*AU04).

The winking face emoji 614 can include action units AU46, and absence of tongue out and eye closure. In embodiments, the weight for determining the emoji 614 can be expressed as min((AU15, AU04)+0.5*AU09−0.1*AU18−0.1*AU25−0.1*smile−0.1*smirk).

The weighting for a particular emoji can include any number of terms. For example, the emoji 616 of a pouting face can be determined based on positive AUs (AU15, AU04, AU09(0.5)) and negative AUs (AU18(−0.1), AU25 (−0.1), smile(−0.1), smirk(−0.1)), and so on. The coefficients that can be included with the AUs can correspond to weighting factors for the AUs. The weighting factor can be positive or negative, can have a range of values, and so on. The AUs that can be included in the determining of the emoji pouting face can include for example AU15 "Lip Corner Depressor", AU04 "Brow Lowerer", AU09 "Nose Wrinkler", AU18 "Lip Pucker", AU25 "Lips Part", "Smile", and "Smirk". A weight for the emoji pouting face can be based on an expression equaling a minimum value from some of the AUs with additions, subtractions, etc. of other AUs. For example, a weight for determining the emoji 616 of pouting face can be: min ((AU15, AU04)+0.5*AU09−0.1*AU18−0.1*AU25−0.1*smile−0.1*smirk). Any number of action units and weights can be considered in the selection of an emoji as a representative icon.

Figure 7:
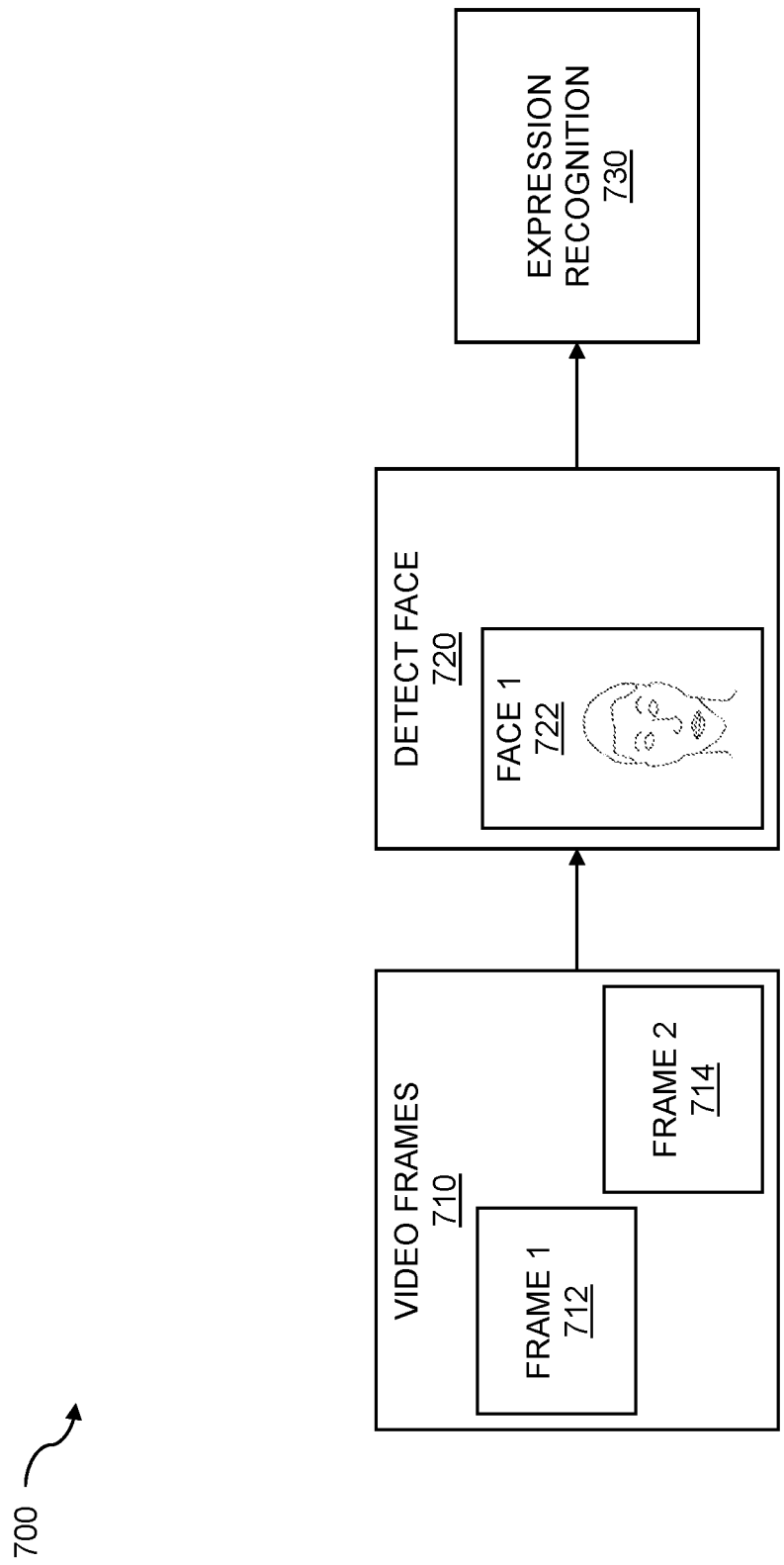
FIG. 7 shows expression recognition.

FIG. 7 shows expression recognition. Images of an individual are obtained and the face of the individual is identified. The face of the individual is classified to determine facial content using a plurality of image classifiers. The classifying includes generating confidence values for a plurality of action units for the face. The facial content is translated into a representative icon, where the translating the facial content includes summing the confidence values for the plurality of action units. The summing includes weighted summation of the confidence values. The representative icon can be an emoji and can be selected based on emotion content analysis of the face. Expression recognition 700 can be determined for an individual by analyzing the face of the individual. The face of the individual can be captured using a camera such as a video camera, still camera, or other image capture device. In the case of the camera being a video camera, the video can be partitioned into video frames 710. The video frames can include a first frame 1 712, a second frame 2 714, and so on including an Nth frame (not shown). The video frames, including frame 1 712 and frame 2 714 can be analyzed to detect a face 720. The face that can be detected in one or more frames can include face 1 722. Thus, in embodiments, the image is one image from a series of images of the individual. In embodiments, the series of images comprises a video of the individual. In embodiments, other faces including a second face (not shown) can be identified in the one or more video frames. The face can include a human face, an animal face, a cartoon face, and so on. In other embodiments, an identified feature in a video frame can include an object, a structure, a geological feature, etc. The detecting a face can include tracking the face. To improve tracking of the face, the face can be aligned, normalized, scaled, and so on.

The detected face such as face 1 722 can be analyzed for expression recognition 730. An expression including a facial expression can include a smile, frown, smirk, sneer, etc. The facial expression can result from the movement of one or more facial muscles of the detected face. Expression recognition can be based on classifying the face to determine facial content, where the classifying can be based on the use of image classifiers. The image classifiers can be used to identify action units (AUs). The AUs can be weighted, where the weight for an AU can be positive, negative, a percentage, a ratio, etc. The presence (e.g. positive AUs) or absence (e.g. negative AUs) of one or more action units can determine an expression on the face. The action units can include AUs from the facial action coding system (FACS) which describes the outward appearance on the face of the movements of various facial muscles. The action units can include main codes, head movement codes, eye movement codes, visibility codes, gross behavior codes, combinations of the types of codes, and so on. The main codes can include inner brow raiser AU 1, nose wrinkler AU 9, dimpler AU 14, jaw drop AU 26, and so on. The AUs can represent the deconstructed facial expression. The facial expression can convey an emotional state, where the emotional state can include sadness, stress, happiness, anger, humor, poignancy, mirth, and so on. Sadness can include AU 1+AU 4+AU 15, happiness can include AU 6 plus AU 12, anger can include AU 4+AU 5+AU 7+AU 23, etc. Other emotions can be determined by adding AUs, subtracting AUs, and so on. The head movement codes can include head turn left, head turn right, etc. The eye movement codes can include eyes turned left, eyes turned right, etc. Visibility codes can include brows and forehead not visible, eyes not visible, and so on. Gross behavior codes can include sniff, shoulder shrug, head nod, etc.

Figure 8:
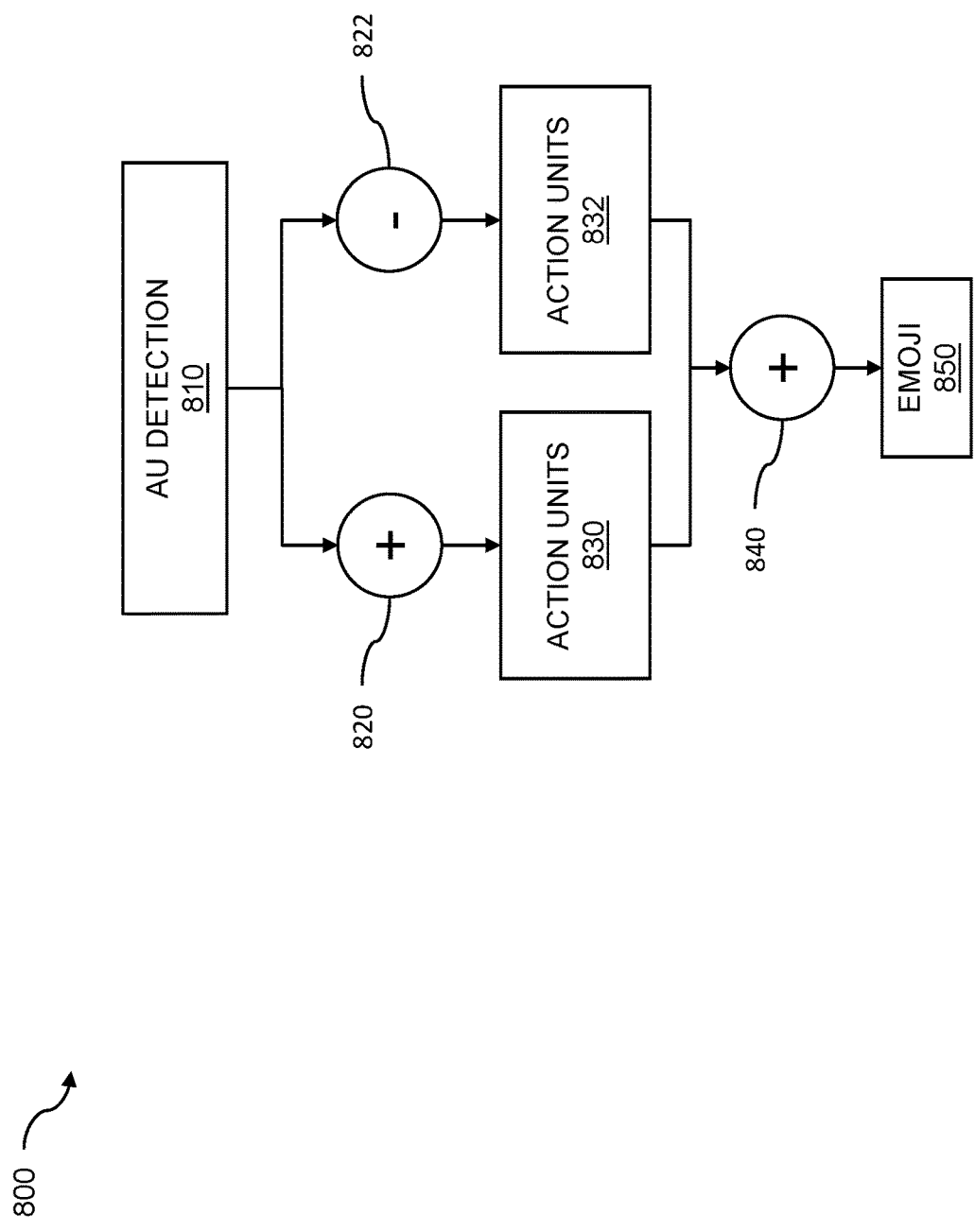
FIG. 8 illustrates emoji determination.

FIG. 8 illustrates emoji determination. Images of an individual are obtained and the face of the individual is identified. The face of the individual is classified to determine facial content using a plurality of image classifiers. The classifying includes generating confidence values for a plurality of action units for the face. The facial content is translated into a representative icon, where the translating the facial content includes summing the confidence values for the plurality of action units. The summing includes weighted summation of the confidence values. The representative icon can be an emoji and can be selected based on emotion content analysis of the face. Emoji determination 800 can be based on facial content of an individual. The facial content of the individual can include using image classifiers to classify the face. The facial content can be translated into a representative icon, where the representative icon can include one or more emoji. As discussed elsewhere, facial content can include action units (AUs), where the action units can include action units from the facial action coding system (FACS). The action units can describe movements including micro-movements of various facial muscles. AUs can be detected 810, where the detection of AUs can include generating confidence values or weights for each detected AU. The confidence values or weights can be positive (e.g. the presence of an AU) and negative (e.g. the absence of an AU). The presence of AUs and the absence of AUs can be combined to determine a facial expression. The combination of the AUs can include adding AUs, subtracting AUs, multiplying AUs, and so on. A facial expression can be used to determine a cognitive state of a person, where the cognitive state can include sadness, stress, happiness, and so on.

Action units can be determined by classifying a face to determine facial content. The determining of facial content can be based on using image classifiers. The classifying can include generating confidence values for action units for the face. The confidence values can be positive 820 to indicate the presence of an AU, negative 822 to indicate the absence 822 of an AU, and so on. The positive action units 830 and the negative action units 832 can be summed 840. The summing of the positive AUs and the negative AUs can be used to determine one or more emoji 850. The emoji that can be determined can be obtained by uploading by a user, downloading from the Internet, etc. The emoji can represent a facial expression, a mental state, an emotional state, a cognitive state, and so on, of an individual. The emoji can include a static image such as a jpeg file and a tiff file, an animated image such as a gif file, a cartoon representation, and so on. Thus, in embodiments, the emoji includes a static image. In some embodiments, the emoji includes an animated image. In some embodiments, the emoji includes a cartoon representation. The emoji can include demographic information such as gender, age, ethnicity, etc. The emoji can be customizable. The emoji can be used to cover the face of the individual captured in an image, video frame, etc. The emoji 850 that are determined can represent the facial content depicted by the AUs, a cognitive state, an emotional state, etc. The emoji that are determined can be presented with a probability score, where the probability score can be used to aid in the selection of one or more emoji. The selection of the one or more emoji can be based on automatic selection, can be selected by the individual whose face has been analyzed, can be selected by voting, can be a most commonly selected emoji, and so on. Selection of the one or more emoji can be performed using an emoji keyboard or other selection technique.

Figure 9:
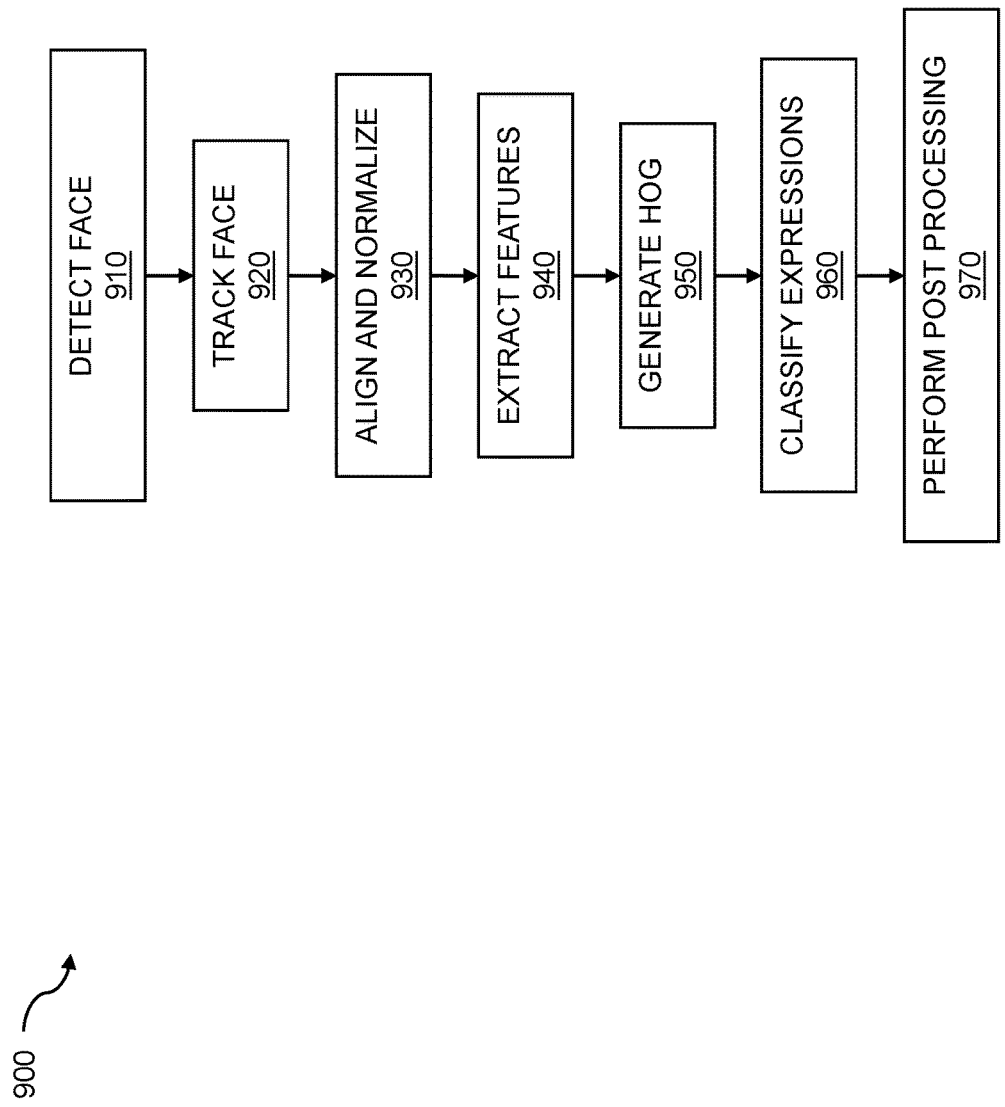
FIG. 9 is a flow diagram for expression classification.

FIG. 9 is a flow diagram for expression classification. Images of an individual are obtained and the face of the individual is identified. The face of the individual is classified to determine facial content using a plurality of image classifiers. The classifying includes generating confidence values for a plurality of action units for the face. The facial content is translated into a representative icon, where the translating the facial content includes summing the confidence values for the plurality of action units. The summing includes weighted summation of the confidence values. The representative icon can be an emoji and can be selected based on emotion content analysis of the face. The flow 900 includes detecting a face 910. Detection of the face can include identifying facial landmarks, locating facial regions, and so on. The facial landmarks can include edges of eyes, corners of a mouth, tip of a nose, etc. The facial regions can include eyes, ears, a nose, a mouth, a chin, a forehead, etc. The detection of the face can be based on using classifiers, where the classifiers can be used to generate confidence values, whether positive confidence values or negative confidence values, for action units (AUs). The action units can include those described by the facial action coding system (FACS).

The flow 900 includes tracking the face 920 that is detected. The tracking of the face can include identifying the face within two or more video frames that can be extracted from a video. The tracking of the face can include identifying the face within a series of still images. The flow 900 includes aligning and normalizing 930 the face. Depending on the proximity, orientation, etc., of a person whose image can be captured by a camera, the face of the person can appear larger, smaller, in profile, rotated, tilted, and so on. To improve tracking of the face, various techniques can be used including alignment of facial landmarks, facial regions, etc. The alignment can include aligning facial features from one image or video frame with the facial features from another image or video frame. The alignment can include aligning facial features to a facial standard, a facial template, etc. The improvement of the tracking can include normalization of the face. The normalization of the face can include registering, zooming in (magnifying), zooming out (contracting), rotating, and so on. The normalization can be based on estimating a head angle, where the head angle can include roll, pitch, and yaw of the head of the individual. The normalizing can include warping the face. The flow 900 includes extracting features 940. The extracting features, including extracting facial features, can include determining the locations of key facial landmarks, facial regions, etc. Facial landmarks can include edges of eyebrows, corners of eyes, center of pupil, bridge of nose, tip of nose, edges of nose, corners of mouth, tips of ears, etc. Facial regions can include eyebrows, eyes, nose, mouth, ears, and so on.

The flow 900 includes generating a histogram of oriented gradients (HoG) 950. A HoG is a feature descriptor, such as shape, color, motion, etc., that can be used for object detection. The object that can be detected can include a face. The HoG can be used to count occurrences of a gradient orientation within a localized portion of an image. An image can be divided into cells which can be small, connected regions within the image. A histogram of gradient directions can be generated for one or more cells. The HoG can be a concatenation of the histograms generated for each cell. The flow 900 includes classifying expressions 960. The classifying can include determining into which of a set of categories a particular observation such as a facial expression belongs. The determination of the category can be based on comparison to a training set of data, where the set of data contains observations for which category membership is known. The classifying can be used to classify a facial expression such as smiling, smirking, frowning, etc. The flow 900 includes performing post processing 970. The post processing can include removing noise from a signal, removing a predilection of an individual based on a baseline determined for the individual, and so on. The post processing can include augmenting the classifying the face of the individual with audio obtained from the individual.

Figure 10:
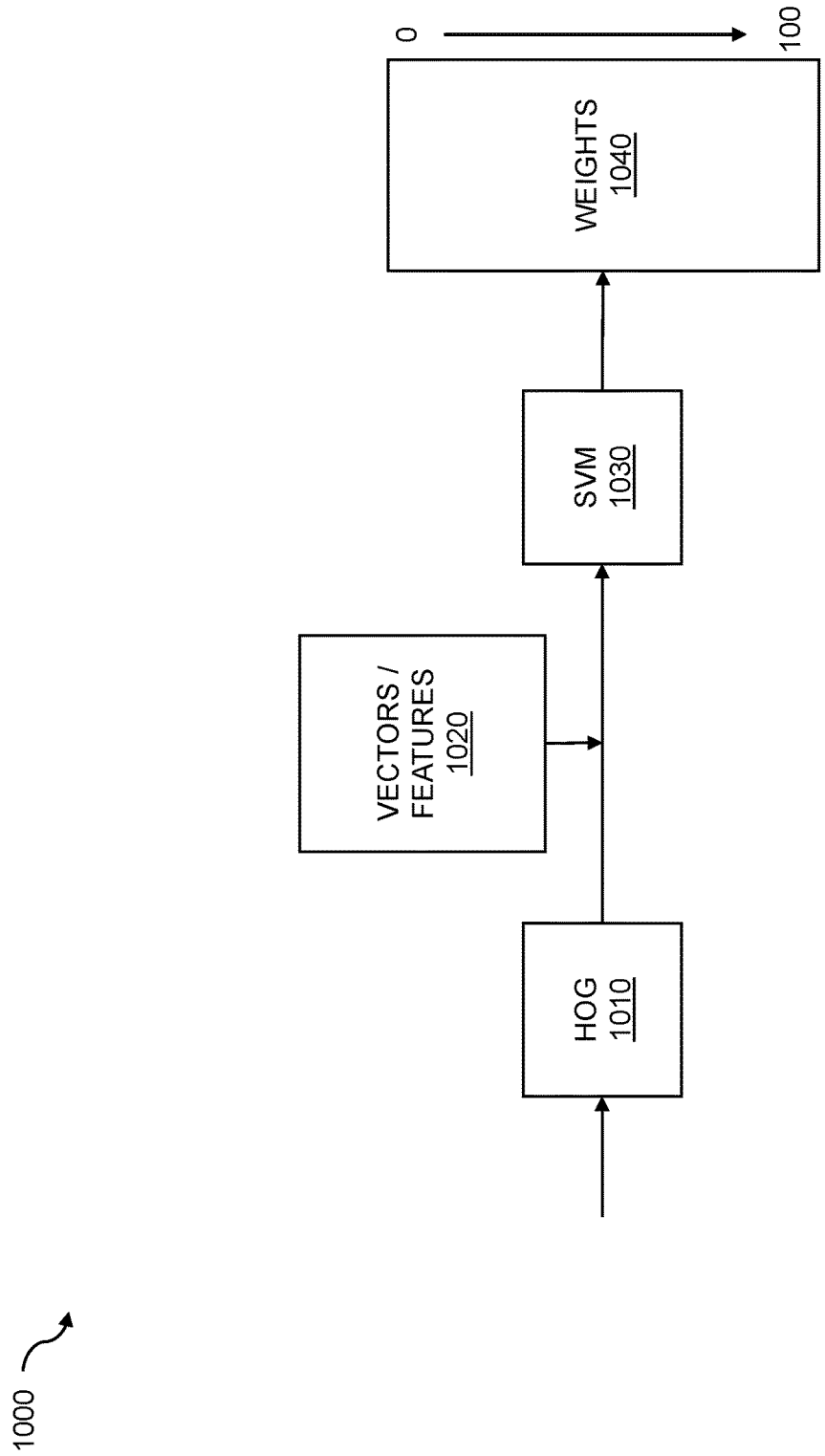
FIG. 10 illustrates weight determination.

FIG. 10 illustrates weight determination. Images of an individual are obtained and the face of the individual is identified. The face of the individual is classified to determine facial content using a plurality of image classifiers. The classifying includes generating confidence values for a plurality of action units for the face. The facial content is translated into a representative icon, where the translating the facial content includes summing the confidence values for the plurality of action units. The summing includes weighted summation of the confidence values. The representative icon can be an emoji and can be selected based on emotion content analysis of the face. Weight determination 1000 can be performed based on a histogram of oriented gradients (HoG) 1010. The HoG can describe the concatenation of gradient orientations that can be determined for localized, connected cells within an image. Vectors and features 1020 can include features such as facial features. The facial features can include eyes, a nose, a mouth, ears, eyebrows, a forehead, a chin, and so on. The vectors and features 1020 can be used for training a support vector machine (SVM) 1030. A support vector machine can be based on one or more supervised learning models. The supervised learning models can include algorithms, including learning algorithms, that can be used for analyzing data for classification. The vectors and features can include known classifications and can be used to train the SVM to categorize new data into a known classification or classifications. The classification can include classifying a face to determine facial content. The SVM 1030 can analyzed the HoG 1010 and can generate confidence values for a plurality of action units (AUs). As discussed elsewhere, the AUs can include AUs from the facial actions classification system (FACS). The confidence values can include weights 1040. The weights can be positive or negative. The values of the weights can be integer values, real values, binary values, and so on. While a range of weights including 0 to 100 is shown, other ranges such as 0.0 to 1.0, 1 to 10, and so on can also be used. A positive weight can indicate the presence and intensity of an AU. A negative weight can indicate the absence and intensity of an AU. The weights, including positive weights and negative weights can be summed. The weight summation of the confidence values can be used for selection and presentation of one or more emoji. The emoji can represent a facial expression, a cognitive state, an emotional state, and so on.

Figure 11:
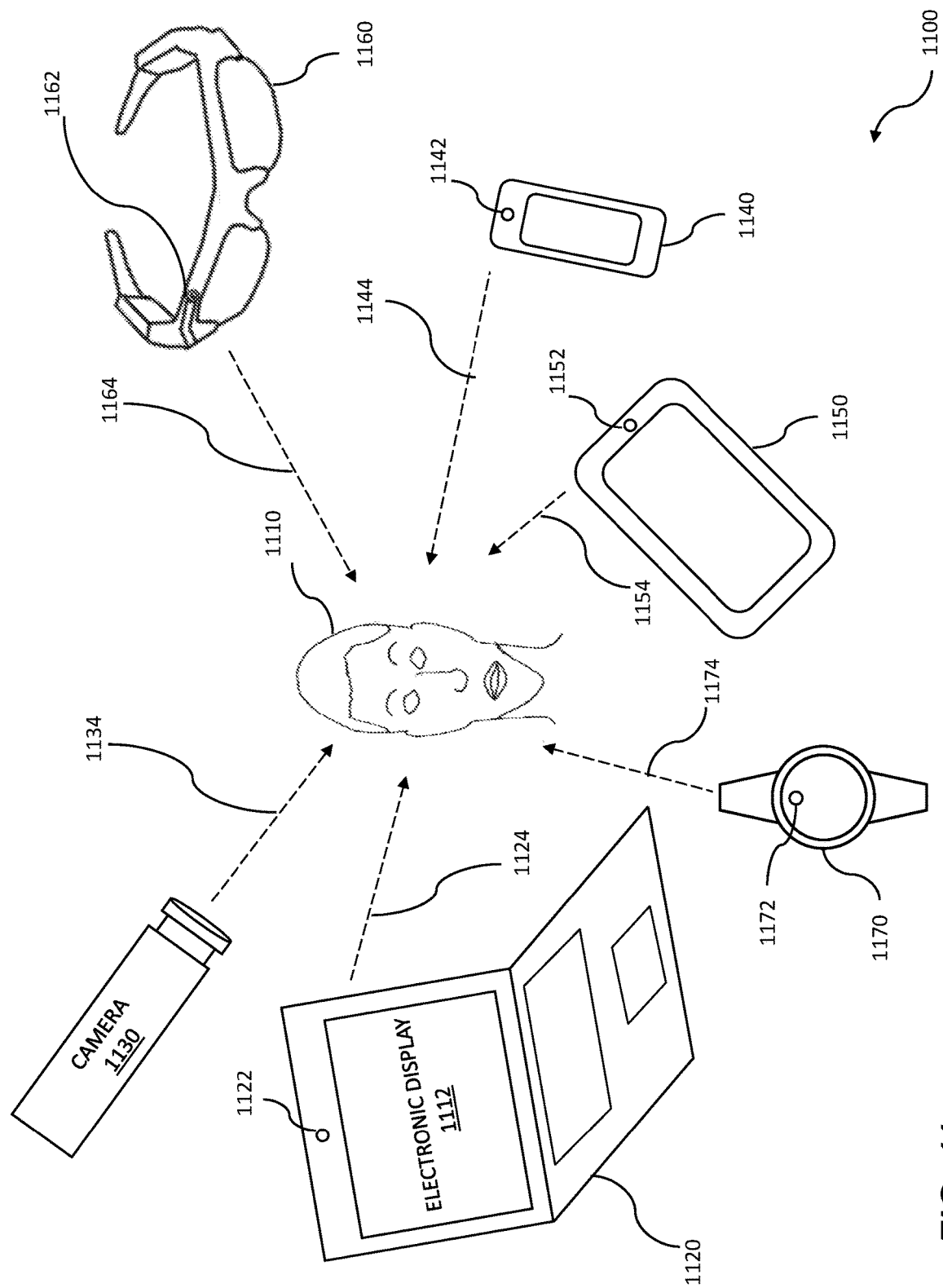
FIG. 11 is a diagram showing image collection including multiple mobile devices.

FIG. 11 is a diagram showing image collection including multiple mobile devices. Images from these multiple devices can be used by the convolutional neural net to evaluate emotions. The collected images can be analyzed for cognitive state analysis and/or facial expressions. A plurality of images of an individual viewing an electronic display can be received. A face can be identified in an image, based on the use of image classifiers. The plurality of images can be evaluated to determine cognitive states and/or facial expressions of the individual. In the diagram 1100, the multiple mobile devices can be used singly or together to collect video data on a user 1110. While one person is shown, the video data can be collected on multiple people. A user 1110 can be observed as she or he is performing a task, experiencing an event, viewing a media presentation, and so on. The user 1110 can be shown one or more media presentations, political presentations, or social media, or another form of displayed media. The one or more media presentations can be shown to a plurality of people. The media presentations can be displayed on an electronic display 1112 or another display. The data collected on the user 1110 or on a plurality of users can be in the form of one or more videos, video frames, still images, etc. The plurality of videos can be of people who are experiencing different situations. Some example situations can include the user or plurality of users being exposed to TV programs, movies, video clips, social media, and other such media. The situations could also include exposure to media such as advertisements, political messages, news programs, and so on. As noted before, video data can be collected on one or more users in substantially identical or different situations and viewing either a single media presentation or a plurality of presentations. The data collected on the user 1110 can be analyzed and viewed for a variety of purposes including expression analysis, cognitive state analysis, and so on. The electronic display 1112 can be on a laptop computer 1120 as shown, a tablet computer 1150, a cell phone 1140, a television, a mobile monitor, or any other type of electronic device. In one embodiment, expression data is collected on a mobile device such as a cell phone 1140, a tablet computer 1150, a laptop computer 1120, or a watch 1170. Thus, the multiple sources can include at least one mobile device, such as a phone 1140 or a tablet 1150, or a wearable device such as a watch 1170 or glasses 1160. A mobile device can include a forward facing camera and/or a rear-facing camera that can be used to collect expression data. Sources of expression data can include a webcam 1122, a phone camera 1142, a tablet camera 1152, a wearable camera 1162, and a mobile camera 1130. A wearable camera can comprise various camera devices such as the watch camera 1172. A mobile device could include an automobile, truck, or other vehicle. The cognitive state analysis could be performed by such a vehicle or devices and system with which the vehicle communicates.

As the user 1110 is monitored, she or he might move due to the nature of the task, boredom, discomfort, distractions, or for another reason. As the user moves, the camera with a view of the user's face can be changed. Thus, as an example, if the user 1110 is looking in a first direction, the line of sight 1124 from the webcam 1122 is able to observe the user's face, but if the user is looking in a second direction, the line of sight 1134 from the mobile camera 1130 is able to observe the user's face. Furthermore, in other embodiments, if the user is looking in a third direction, the line of sight 1144 from the phone camera 1142 is able to observe the user's face, and if the user is looking in a fourth direction, the line of sight 1154 from the tablet camera 1152 is able to observe the user's face. If the user is looking in a fifth direction, the line of sight 1164 from the wearable camera 1162, which can be a device such as the glasses 1160 shown and can be worn by another user or an observer, is able to observe the user's face. If the user is looking in a sixth direction, the line of sight 1174 from the wearable watch-type device 1170, with a camera 1172 included on the device, is able to observe the user's face. In other embodiments, the wearable device is another device, such as an earpiece with a camera, a helmet or hat with a camera, a clip-on camera attached to clothing, or any other type of wearable device with a camera or other sensor for collecting expression data. The user 1110 can also use a wearable device including a camera for gathering contextual information and/or collecting expression data on other users. Because the user 1110 can move her or his head, the facial data can be collected intermittently when she or he is looking in a direction of a camera. In some cases, multiple people can be included in the view from one or more cameras, and some embodiments include filtering out faces of one or more other people to determine whether the user 1110 is looking toward a camera. All or some of the expression data can be continuously or sporadically available from the various devices and other devices. The changes in the direction in which the user 1110 is looking or facing can be used in determining cognitive states associated with a piece of media content.

In some embodiments, the translating of the facial content into a representative icon further includes acquiring, analyzing, and processing audio associated with the captured images. In some cases, certain facial expressions that reflect different emotions can have similar action units. For example, a wincing expression of pain can bear some similarities to a smile. By analyzing associated audio and/or speech, an inference of context can be made by the system to infer if the cognitive state is more likely to be one of happiness or pain, using the aforementioned example. Many user devices have built-in microphones as well as user-facing cameras (e.g. tablet computer 1150, and/or cell phone 1140). By analyzing speech, the spoken words can be checked to determine if they appear to be in the context of a positive conversation. Alternatively, or additionally, the volume and/or duration of speech can be used to infer cognitive state. This can reduce situations where an inappropriate representative icon is used or suggested for a given cognitive state. By using audio and/or speech along with the images for facial analysis, an improved level of accuracy and effectiveness may be achieved. Thus, in embodiments, the method further includes using audio as a criterion for representative icon selection.

The captured video data can include facial expressions and can be analyzed on a computing device such as the video capture device or on another separate device. The analysis could take place on one of the mobile devices discussed above, on a local server, on a remote server, and so on. In embodiments, some of the analysis takes place on the mobile device, while other analysis takes place on a server device. The analysis of the video data can include the use of a classifier. The video data can be captured using one of the mobile devices discussed above and sent to a server or another computing device for analysis. However, the captured video data including expressions can also be analyzed on the device which performed the capturing. The analysis can be performed on a mobile device where the videos were obtained with the mobile device and wherein the mobile device includes one or more of a laptop computer, a tablet, a PDA, a smartphone, a wearable device, and so on. In another embodiment, the analyzing comprises using a classifier on a server or another computing device other than the capturing device.

Figure 12:
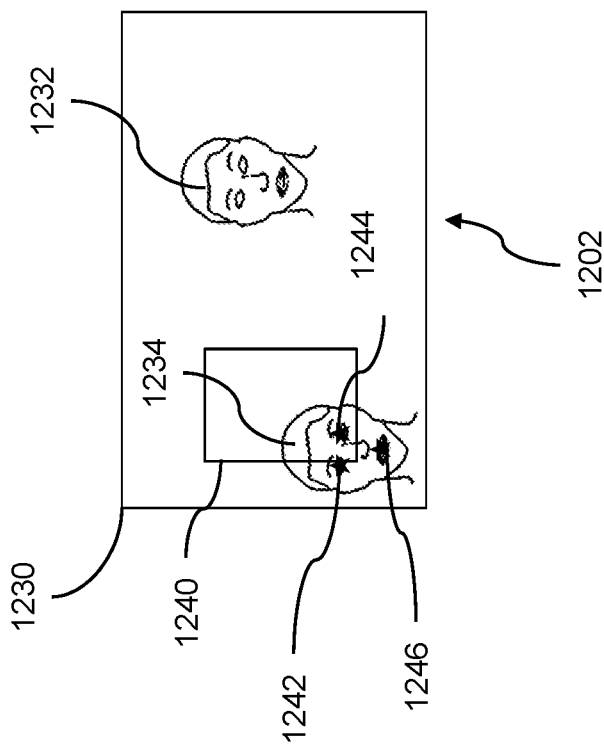
FIG. 12 illustrates feature extraction for multiple faces.
Figure 12:
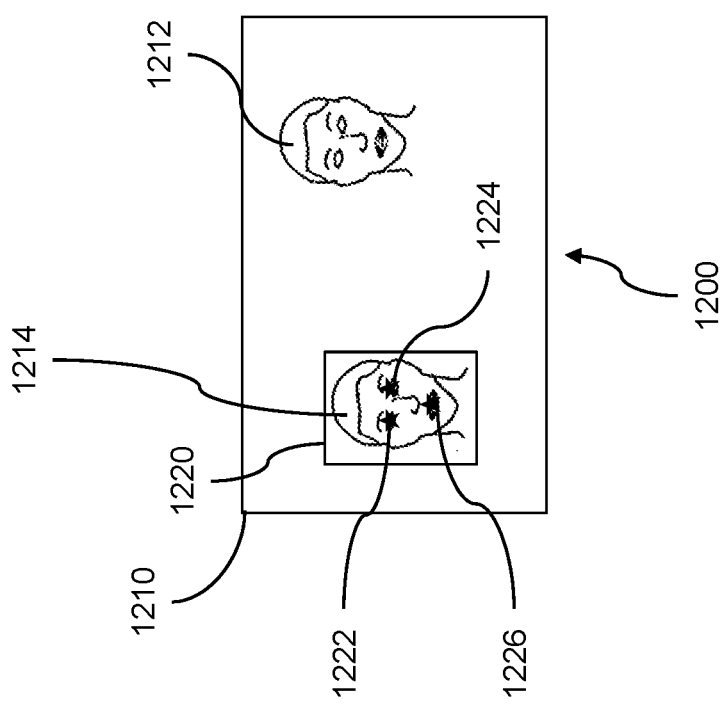

FIG. 12 illustrates feature extraction for multiple faces. The features can be evaluated within a deep learning environment. The feature extraction for multiple faces can be performed for faces that can be detected in multiple images. The images can be analyzed for cognitive states and/or facial expressions. A plurality of images of an individual viewing an electronic display can be received. A face in an image can be identified, based on the use of classifiers. The plurality of images can be evaluated to determine cognitive states and/or facial expressions of the individual. The feature extraction can be performed by analysis using one or more processors, using one or more video collection devices, and by using a server. The analysis device can be used to perform face detection for a second face, as well as for facial tracking of the first face. One or more videos can be captured, where the videos contain one or more faces. The video or videos that contain the one or more faces can be partitioned into a plurality of frames, and the frames can be analyzed for the detection of the one or more faces. The analysis of the one or more video frames can be based on one or more classifiers. A classifier can be an algorithm, heuristic, function, or piece of code that can be used to identify into which of a set of categories a new or particular observation, sample, datum, etc. should be placed. The decision to place an observation into a category can be based on training the algorithm or piece of code by analyzing a known set of data, known as a training set. The training set can include data for which category memberships of the data can be known. The training set can be used as part of a supervised training technique. If a training set is not available, then a clustering technique can be used to group observations into categories. The latter approach, or unsupervised learning, can be based on a measure (i.e. distance) of one or more inherent similarities among the data that is being categorized. When the new observation is received, then the classifier can be used to categorize the new observation. Classifiers can be used for many analysis applications including analysis of one or more faces. The use of classifiers can be the basis of analyzing the one or more faces for gender, ethnicity, and age; for detection of one or more faces in one or more videos; for detection of facial features and facial landmarks; and so on. The observations can be analyzed based on one or more of a set of quantifiable properties. The properties can be described as features and explanatory variables and can include various data types that can include numerical (integer-valued, real-valued), ordinal, categorical, and so on. Some classifiers can be based on a comparison between an observation and prior observations, as well as based on functions such as a similarity function, a distance function, and so on.

Classification can be based on various types of algorithms, heuristics, codes, procedures, statistics, and so on. Many techniques for performing classification exist. This classification of one or more observations into one or more groups can be based on distributions of the data values, probabilities, and so on. Classifiers can be binary, multiclass, linear, and so on. Algorithms for classification can be implemented using a variety of techniques, including neural networks, kernel estimation, support vector machines, use of quadratic surfaces, and so on. Classification can be used in many application areas such as computer vision, speech and handwriting recognition, and so on. Classification can be used for biometric identification of one or more people in one or more frames of one or more videos.

Returning to FIG. 12, the detection of the first face, the second face, and multiple faces can include identifying facial landmarks, generating a bounding box, and prediction of a bounding box and landmarks for a next frame, where the next frame can be one of a plurality of frames of a video containing faces. A first video frame 1200 includes a frame boundary 1210, a first face 1212, and a second face 1214. The video frame 1200 also includes a bounding box 1220. Facial landmarks can be generated for the first face 1212. Face detection can be performed to initialize a second set of locations for a second set of facial landmarks for a second face within the video. Facial landmarks in the video frame 1200 can include the facial landmarks 1222, 1224, and 1226. The facial landmarks can include corners of a mouth, corners of eyes, eyebrow corners, the tip of the nose, nostrils, chin, the tips of ears, and so on. The performing of face detection on the second face can include performing facial landmark detection with the first frame from the video for the second face and can include estimating a second rough bounding box for the second face based on the facial landmark detection. The estimating of a second rough bounding box can include the bounding box 1220. Bounding boxes can also be estimated for one or more other faces within the boundary 1210. The bounding box can be refined, as can one or more facial landmarks. The refining of the second set of locations for the second set of facial landmarks can be based on localized information around the second set of facial landmarks. The bounding box 1220 and the facial landmarks 1222, 1224, and 1226 can be used to estimate future locations for the second set of locations for the second set of facial landmarks in a future video frame from the first video frame.

A second video frame 1202 is also shown. The second video frame 1202 includes a frame boundary 1230, a first face 1232, and a second face 1234. The second video frame 1202 also includes a bounding box 1240 and the facial landmarks 1242, 1244, and 1246. In other embodiments, multiple facial landmarks are generated and used for facial tracking of the two or more faces of a video frame, such as the shown second video frame 1202. Facial points from the first face can be distinguished from other facial points. In embodiments, the other facial points include facial points of one or more other faces. The facial points can correspond to the facial points of the second face. The distinguishing of the facial points of the first face and the facial points of the second face can be used to distinguish between the first face and the second face, to track either or both of the first face and the second face, and so on. Other facial points can correspond to the second face. As mentioned above, multiple facial points can be determined within a frame. One or more of the other facial points that are determined can correspond to a third face. The location of the bounding box 1240 can be estimated, where the estimating can be based on the location of the generated bounding box 1220 shown in the first video frame 1200. The three facial landmarks shown, facial landmarks 1242, 1244, and 1246, might lie within the bounding box 1240 or might not lie partially or completely within the bounding box 1240. For instance, the second face 1234 might have moved between the first video frame 1200 and the second video frame 1202. Based on the accuracy of the estimating of the bounding box 1240, a new estimation can be determined for a third, future frame from the video, and so on. The evaluation can be performed, all or in part, on semiconductor-based logic.

Figure 13:
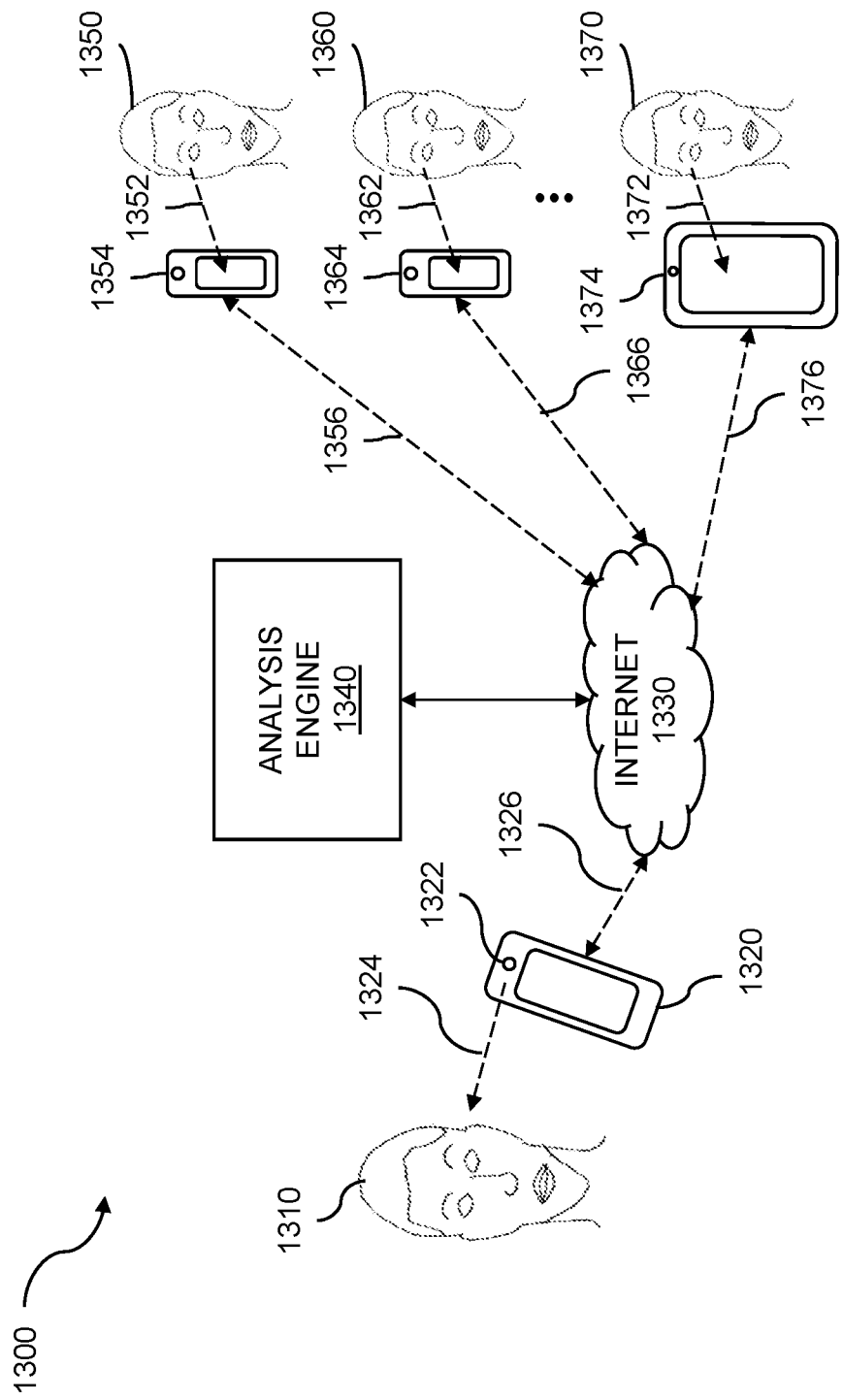
FIG. 13 shows live streaming of social video.

FIG. 13 shows live streaming of social video in a social media context. The live streaming can be used within a deep learning environment. Analysis of live streaming of social video can be performed using data collected from evaluating images to determine a facial expression and/or cognitive state. A plurality of images of an individual viewing an electronic display can be received. A face can be identified in an image, based on the use of classifiers. The plurality of images can be evaluated to determine facial expressions and/or cognitive states of the individual. The streaming and analysis can be facilitated by a video capture device, a local server, a remote server, semiconductor-based logic, and so on. The streaming can be live streaming and can include cognitive state analysis, cognitive state event signature analysis, etc. Live streaming video is an example of one-to-many social media, where video can be sent over the Internet from one person to a plurality of people using a social media app and/or platform. Live streaming is one of numerous popular techniques used by people who want to disseminate ideas, send information, provide entertainment, share experiences, and so on. Some of the live streams can be scheduled, such as webcasts, online classes, sporting events, news, computer gaming, or video conferences, while others can be impromptu streams that are broadcasted as needed or when desirable. Examples of impromptu live stream videos can range from individuals simply wanting to share experiences with their social media followers, to live coverage of breaking news, emergencies, or natural disasters. The latter coverage is known as mobile journalism and is becoming increasingly common. With this type of coverage, "reporters" can use networked, portable electronic devices to provide mobile journalism content to a plurality of social media followers. Such reporters can be quickly and inexpensively deployed as the need or desire arises.

Several live streaming social media apps and platforms can be used for transmitting video. One such video social media app is Meerkat™ that can link with a user's Twitter™ account. Meerkat™ enables a user to stream video using a handheld, networked electronic device coupled to video capabilities. Viewers of the live stream can comment on the stream using tweets that can be seen by and responded to by the broadcaster. Another popular app is Periscope™ that can transmit a live recording from one user to that user's Periscope™ account and other followers. The Periscope™ app can be executed on a mobile device. The user's Periscope™ followers can receive an alert whenever that user begins a video transmission. Another live-stream video platform is Twitch™ that can be used for video streaming of video gaming and broadcasts of various competitions and events.

The example 1300 shows a user 1310 broadcasting a video live-stream to one or more people as shown by the person 1350, the person 1360, and the person 1370. A portable, network-enabled electronic device 1320 can be coupled to a forward-facing camera 1322. The portable electronic device 1320 can be a smartphone, a PDA, a tablet, a laptop computer, and so on. The camera 1322 coupled to the device 1320 can have a line-of-sight view 1324 to the user 1310 and can capture video of the user 1310. The captured video can be sent to a recommendation or analysis engine 1340 using a network link 1326 to the Internet 1330. The network link can be a wireless link, a wired link, and so on. The analysis engine 1340 can recommend to the user 1310 an app and/or platform that can be supported by the server and can be used to provide a video live stream to one or more followers of the user 1310. In the example 1300, the user 1310 has three followers: the person 1350, the person 1360, and the person 1370. Each follower has a line-of-sight view to a video screen on a portable, networked electronic device. In other embodiments, one or more followers follow the user 1310 using any other networked electronic device, including a computer. In the example 1300, the person 1350 has a line-of-sight view 1352 to the video screen of a device 1354; the person 1360 has a line-of-sight view 1362 to the video screen of a device 1364, and the person 1370 has a line-of-sight view 1372 to the video screen of a device 1374. The portable electronic devices 1354, 1364, and 1374 can each be a smartphone, a PDA, a tablet, and so on. Each portable device can receive the video stream being broadcasted by the user 1310 through the Internet 1330 using the app and/or platform that can be recommended by the analysis engine 1340. The device 1354 can receive a video stream using the network link 1356, the device 1364 can receive a video stream using the network link 1366, the device 1374 can receive a video stream using the network link 1376, and so on. The network link can be a wireless link, a wired link, a hybrid link, and so on. Depending on the app and/or platform that can be recommended by the analysis engine 1340, one or more followers, such as the followers 1350, 1360, 1370, and so on, can reply to, comment on, and otherwise provide feedback to the user 1310 using their devices 1354, 1364, and 1374, respectively. In embodiments, cognitive state and/or facial expression analysis is performed on each follower (1350, 1360, and 1370). Embodiments include transmitting the representative icon within a social media context.

The human face provides a powerful communications medium through its ability to exhibit a myriad of expressions that can be captured and analyzed for a variety of purposes. In some cases, media producers are acutely interested in evaluating the effectiveness of message delivery by video media. Such video media includes advertisements, political messages, educational materials, television programs, movies, government service announcements, etc. Automated facial analysis can be performed on one or more video frames containing a face in order to detect facial action. Based on the facial action detected, a variety of parameters can be determined, including affect valence, spontaneous reactions, facial action units, and so on. The parameters that are determined can be used to infer or predict emotional and cognitive states. For example, determined valence can be used to describe the emotional reaction of a viewer to a video media presentation or another type of presentation. Positive valence provides evidence that a viewer is experiencing a favorable emotional response to the video media presentation, while negative valence provides evidence that a viewer is experiencing an unfavorable emotional response to the video media presentation. Other facial data analysis can include the determination of discrete emotional states of the viewer or viewers.

Facial data can be collected from a plurality of people using any of a variety of cameras. A camera can include a webcam, a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. In some embodiments, the person is permitted to "opt-in" to the facial data collection. For example, the person can agree to the capture of facial data using a personal device such as a mobile device or another electronic device by selecting an opt-in choice. Opting-in can then turn on the person's webcam-enabled device and can begin the capture of the person's facial data via a video feed from the webcam or other camera. The video data that is collected can include one or more persons experiencing an event. The one or more persons can be sharing a personal electronic device or can each be using one or more devices for video capture. The videos that are collected can be collected using a web-based framework. The web-based framework can be used to display the video media presentation or event as well as to collect videos from multiple viewers who are online. That is, the collection of videos can be crowdsourced from those viewers who elected to opt-in to the video data collection.

The videos captured from the various viewers who chose to opt-in can be substantially different in terms of video quality, frame rate, etc. As a result, the facial video data can be scaled, rotated, and otherwise adjusted to improve consistency. Human factors further influence the capture of the facial video data. The facial data that is captured might or might not be relevant to the video media presentation being displayed. For example, the viewer might not be paying attention, might be fidgeting, might be distracted by an object or event near the viewer, or otherwise inattentive to the video media presentation. The behavior exhibited by the viewer can prove challenging to analyze due to viewer actions including eating, speaking to another person or persons, speaking on the phone, etc. The videos collected from the viewers might also include other artifacts that pose challenges during the analysis of the video data. The artifacts can include items such as eyeglasses (because of reflections), eye patches, jewelry, and clothing that occludes or obscures the viewer's face. Similarly, a viewer's hair or hair covering can present artifacts by obscuring the viewer's eyes and/or face.

The captured facial data can be analyzed using the facial action coding system (FACS). The FACS seeks to define groups or taxonomies of facial movements of the human face. The FACS encodes movements of individual muscles of the face, where the muscle movements often include slight, instantaneous changes in facial appearance. The FACS encoding is commonly performed by trained observers but can also be performed on automated, computer-based systems. Analysis of the FACS encoding can be used to determine emotions of the persons whose facial data is captured in the videos. The FACS is used to encode a wide range of facial expressions that are anatomically possible for the human face. The FACS encodings include action units (AUs) and related temporal segments that are based on the captured facial expression. The AUs are open to higher order interpretation and decision-making. These AUs can be used to recognize emotions experienced by the observed person. Emotion-related facial actions can be identified using the emotional facial action coding system (EMFACS) and the facial action coding system affect interpretation dictionary (FACSAID). For a given emotion, specific action units can be related to the emotion. For example, the emotion of anger can be related to AUs 4, 5, 7, and 23, while happiness can be related to AUs 6 and 12. Other mappings of emotions to AUs have also been previously associated. The coding of the AUs can include an intensity scoring that ranges from A (trace) to E (maximum). The AUs can be used for analyzing images to identify patterns indicative of a particular mental and/or emotional state. The AUs range in number from 0 (neutral face) to 98 (fast up-down look). The AUs include so-called main codes (inner brow raiser, lid tightener, etc.), head movement codes (head turn left, head up, etc.), eye movement codes (eyes turned left, eyes up, etc.), visibility codes (eyes not visible, entire face not visible, etc.), and gross behavior codes (sniff, swallow, etc.). Emotion scoring can be included where intensity is evaluated, as well as specific emotions, moods, or cognitive states.

The coding of faces identified in videos captured of people observing an event can be automated. The automated systems can detect facial AUs or discrete emotional states. The emotional states can include amusement, fear, anger, disgust, surprise, and sadness. The automated systems can be based on a probability estimate from one or more classifiers, where the probabilities can correlate with an intensity of an AU or an expression. The classifiers can be used to identify into which of a set of categories a given observation can be placed. In some cases, the classifiers can be used to determine a probability that a given AU or expression is present in a given frame of a video. The classifiers can be used as part of a supervised machine learning technique, where the machine learning technique can be trained using "known good" data. Once trained, the machine learning technique can proceed to classify new data that is captured.

The supervised machine learning models can be based on support vector machines (SVMs). An SVM can have an associated learning model that is used for data analysis and pattern analysis. For example, an SVM can be used to classify data that can be obtained from collected videos of people experiencing a media presentation. An SVM can be trained using "known good" data that is labeled as belonging to one of two categories (e.g. smile and no-smile). The SVM can build a model that assigns new data into one of the two categories. The SVM can construct one or more hyperplanes that can be used for classification. The hyperplane that has the largest distance from the nearest training point can be determined to have the best separation. The largest separation can improve the classification technique by increasing the probability that a given data point can be properly classified.

In another example, a histogram of oriented gradients (HoG) can be computed. The HoG can include feature descriptors and can be computed for one or more facial regions of interest. The regions of interest of the face can be located using facial landmark points, where the facial landmark points can include outer edges of nostrils, outer edges of the mouth, outer edges of eyes, etc. A HoG for a given region of interest can count occurrences of gradient orientation within a given section of a frame from a video, for example. The gradients can be intensity gradients and can be used to describe an appearance and a shape of a local object. The HoG descriptors can be determined by dividing an image into small, connected regions, also called cells. A histogram of gradient directions or edge orientations can be computed for pixels in the cell. Histograms can be contrast-normalized based on intensity across a portion of the image or the entire image, thus reducing any influence from illumination or shadowing changes between and among video frames. The HoG can be computed on the image or on an adjusted version of the image, where the adjustment of the image can include scaling, rotation, etc. The image can be adjusted by flipping the image around a vertical line through the middle of a face in the image. The symmetry plane of the image can be determined from the tracker points and landmarks of the image.

In embodiments, an automated facial analysis system identifies five facial actions or action combinations in order to detect spontaneous facial expressions for media research purposes. Based on the facial expressions that are detected, a determination can be made with regard to the effectiveness of a given video media presentation, for example. The system can detect the presence of the AUs or the combination of AUs in videos collected from a plurality of people. The facial analysis technique can be trained using a web-based framework to crowdsource videos of people as they watch online video content. The video can be streamed at a fixed frame rate to a server. Human labelers can code for the presence or absence of facial actions including a symmetric smile, unilateral smile, asymmetric smile, and so on. The trained system can then be used to automatically code the facial data collected from a plurality of viewers experiencing video presentations (e.g. television programs).

Spontaneous asymmetric smiles can be detected in order to understand viewer experiences. Related literature indicates that as many asymmetric smiles occur on the right hemi face as do on the left hemi face, for spontaneous expressions. Detection can be treated as a binary classification problem, where images that contain a right asymmetric expression are used as positive (target class) samples and all other images are used as negative (non-target class) samples. Classifiers perform the classification, including classifiers such as support vector machines (SVM) and random forests. Random forests can include ensemble-learning methods that use multiple learning algorithms to obtain better predictive performance. Frame-by-frame detection can be performed to recognize the presence of an asymmetric expression in each frame of a video. Facial points can be detected, including the top of the mouth and the two outer eye corners. The face can be extracted, cropped, and warped into a pixel image of specific dimension (e.g. 96×96 pixels). In embodiments, the inter-ocular distance and vertical scale in the pixel image are fixed. Feature extraction can be performed using computer vision software such as OpenCV™. Feature extraction can be based on the use of HoGs. HoGs can include feature descriptors and can be used to count occurrences of gradient orientation in localized portions or regions of the image. Other techniques can be used for counting occurrences of gradient orientation, including edge orientation histograms, scale-invariant feature transformation descriptors, etc. The AU recognition tasks can also be performed using Local Binary Patterns (LBP) and Local Gabor Binary Patterns (LGBP). The HoG descriptor represents the face as a distribution of intensity gradients and edge directions, and is robust in its ability to translate and scale. Differing patterns, including groupings of cells of various sizes and arranged in variously sized cell blocks, can be used. For example, 4×4 cell blocks of 8×8 pixel cells with an overlap of half of the block can be used. Histograms of channels can be used, including nine channels or bins evenly spread over 0-180 degrees. In this example, the HoG descriptor on a 96×96 image is 25 blocks×16 cells×9 bins=3600, the latter quantity representing the dimension. AU occurrences can be rendered. The videos can be grouped into demographic datasets based on nationality and/or other demographic parameters for further detailed analysis. This grouping and other analyses can be facilitated via semiconductor-based logic.

Figure 14:
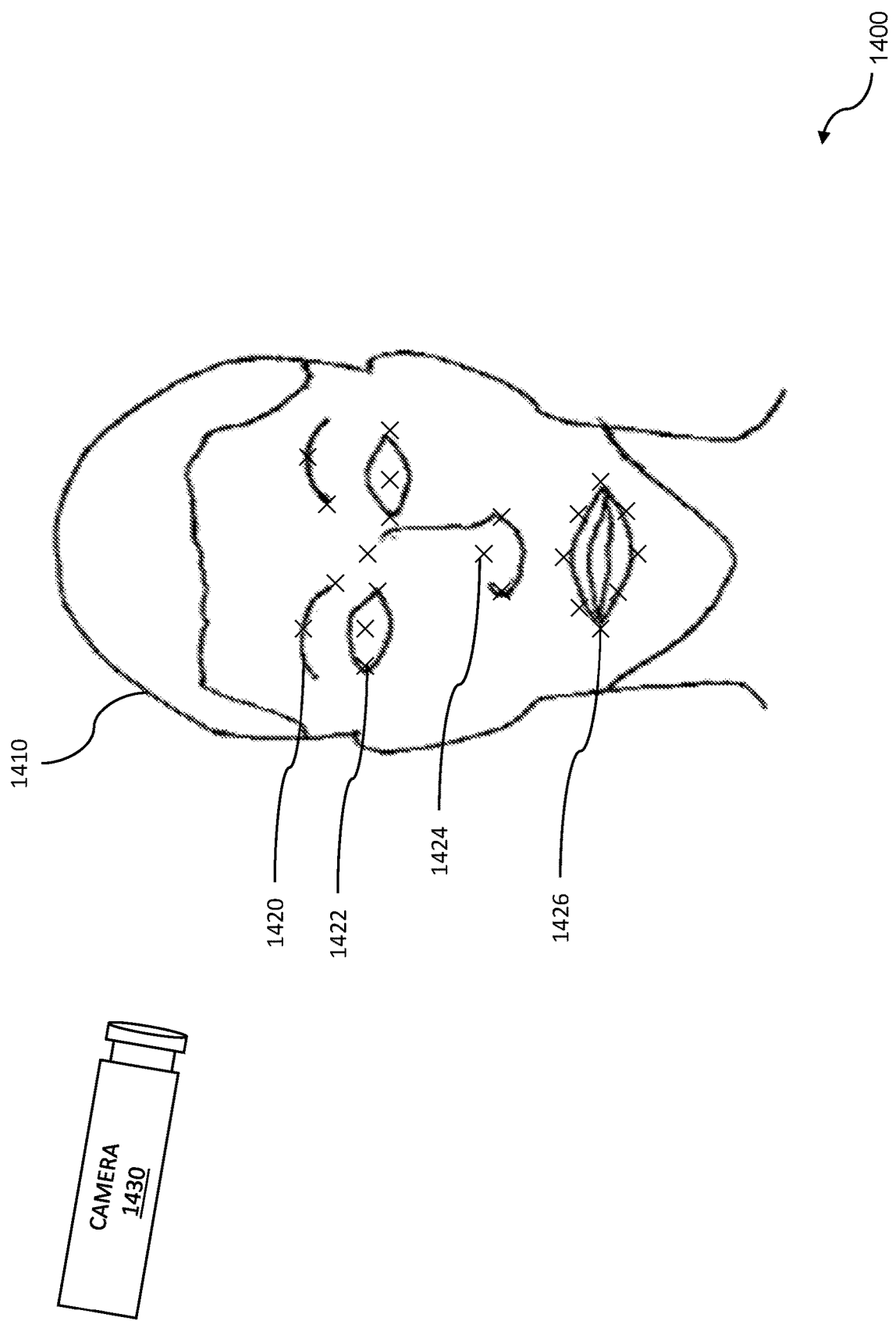
FIG. 14 shows example facial data collection including landmarks.

FIG. 14 shows example facial data collection including landmarks. The landmarks can be evaluated by a multi-layer analysis system. The collecting of facial data including landmarks can be performed for images that have been collected of an individual. Thus, embodiments include performing facial landmark detection on the face of the individual. The collected images can be analyzed for cognitive states and/or facial expressions. A plurality of images of an individual viewing an electronic display can be received. A face can be identified in an image, based on the use of classifiers. The plurality of images can be evaluated to determine cognitive states and/or facial expressions of the individual. In the example 1400, facial data including facial landmarks can be collected using a variety of electronic hardware and software techniques. The collecting of facial data including landmarks can be based on sub-sectional components of a population. The sub-sectional components can be used with performing the evaluation of content of the face, identifying facial landmarks, etc. The sub-sectional components can be used to provide a context. A face 1410 can be observed using a camera 1430 in order to collect facial data that includes facial landmarks. The facial data can be collected from a plurality of people using one or more of a variety of cameras. As previously discussed, the camera or cameras can include a webcam, where a webcam can include a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. The quality and usefulness of the facial data that is captured can depend on the position of the camera 1430 relative to the face 1410, the number of cameras used, the illumination of the face, etc. In some cases, if the face 1410 is poorly lit or over-exposed (e.g. in an area of bright light), the processing of the facial data to identify facial landmarks might be rendered more difficult. In another example, the camera 1430 being positioned to the side of the person might prevent capture of the full face. Artifacts can degrade the capture of facial data. For example, the person's hair, prosthetic devices (e.g. glasses, an eye patch, and eye coverings), jewelry, and clothing can partially or completely occlude or obscure the person's face. Data relating to various facial landmarks can include a variety of facial features. The facial features can comprise an eyebrow 1420, an outer eye edge 1422, a nose 1424, a corner of a mouth 1426, and so on. Multiple facial landmarks can be identified from the facial data that is captured. The facial landmarks that are identified can be analyzed to identify facial action units. The action units that can be identified can include AU02 outer brow raiser, AU14 dimpler, AU17 chin raiser, and so on. Multiple action units can be identified. The action units can be used alone and/or in combination to infer one or more cognitive states and emotions. A similar process can be applied to gesture analysis (e.g. hand gestures) with all of the analysis being accomplished or augmented by a mobile device, a server, semiconductor-based logic, and so on.

Figure 15:
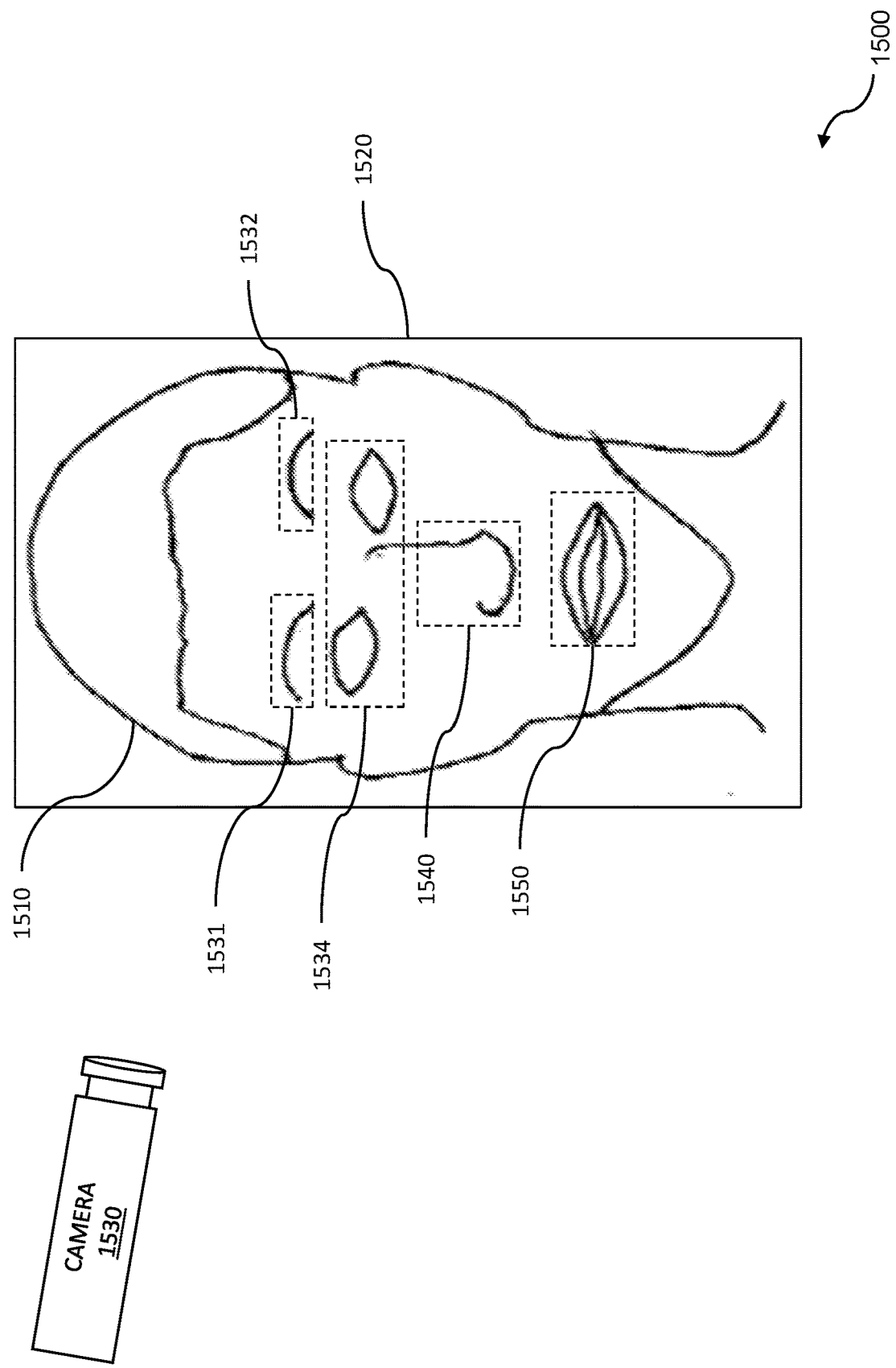
FIG. 15 illustrates example facial data collection including regions of interest.

FIG. 15 shows example facial data collection including regions. The regions can be evaluated within a deep learning environment. Thus, embodiments include determining regions within the face of the individual. The collecting of facial data including regions can be performed for images collected of an individual. The collected images can be analyzed for cognitive states and/or facial expressions. A plurality of images of an individual viewing an electronic display can be received. A face in an image can be identified, based on the use of classifiers. The plurality of images can be evaluated to determine cognitive states and/or facial expressions of the individual. Various regions of a face can be identified and used for a variety of purposes including facial recognition, facial analysis, and so on. The collecting of facial data including regions can be based on sub-sectional components of a population. The sub-sectional components can be used with performing the evaluation of content of the face, identifying facial regions, etc. The sub-sectional components can be used to provide a context. Facial analysis can be used to determine, predict, and estimate cognitive states and emotions of a person from whom facial data can be collected.

In embodiments, the one or more emotions that can be determined by the analysis can be represented by an image, a figure, an icon, etc. The representative icon can include an emoji or emoticon. One or more emoji can be used to represent a cognitive state, emotion, or mood of an individual; to represent food, a geographic location, weather, and so on. The emoji can include a static image. The static image can be a predefined size such as a certain number of pixels. The emoji can include an animated image. The emoji can be based on a GIF or another animation standard. The emoji can include a cartoon representation. The cartoon representation can be any cartoon type, format, etc. that can be appropriate to representing an emoji. In the example 1500, facial data can be collected, where the facial data can include regions of a face. The facial data that is collected can be based on sub-sectional components of a population. When more than one face can be detected in an image, facial data can be collected for one face, some faces, all faces, and so on. The facial data which can include facial regions can be collected using any of a variety of electronic hardware and software techniques. The facial data can be collected using sensors including motion sensors, infrared sensors, physiological sensors, imaging sensors, and so on. A face 1510 can be observed using a camera 1530, a sensor, a combination of cameras and/or sensors, and so on. The camera 1530 can be used to collect facial data that can be used to determine that a face is present in an image. When a face is present in an image, a bounding box 1520 can be placed around the face. Placement of the bounding box around the face can be based on detection of facial landmarks. The camera 1530 can be used to collect facial data from the bounding box 1520, where the facial data can include facial regions. The facial data can be collected from a plurality of people using any of a variety of cameras. As discussed previously, the camera or cameras can include a webcam, where a webcam can include a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. As discussed previously, the quality and usefulness of the facial data that is captured can depend on, among other examples, the position of the camera 1530 relative to the face 1510, the number of cameras and/or sensors used, the illumination of the face, any obstructions to viewing the face, and so on.

The facial regions that can be collected by the camera 1530, a sensor, or a combination of cameras and/or sensors can include any of a variety of facial features. Embodiments include determining regions within the face of the individual and evaluating the regions for emotional content. The facial features that can be included in the facial regions that are collected can include eyebrows 1531 and 1532, eyes 1534, a nose 1540, a mouth 1550, ears, hair, texture, tone, and so on. Multiple facial features can be included in one or more facial regions. The number of facial features that can be included in the facial regions can depend on the desired amount of data to be captured, whether a face is in profile, whether the face is partially occluded or obstructed, etc. The facial regions that can include one or more facial features can be analyzed to determine facial expressions. The analysis of the facial regions can also include determining probabilities of occurrence of one or more facial expressions. The facial features that can be analyzed can also include features such as textures, gradients, colors, and shapes. The facial features can be used to determine demographic data, where the demographic data can include age, ethnicity, culture, and gender. Multiple textures, gradients, colors, shapes, and so on, can be detected by the camera 1530, a sensor, or a combination of cameras and sensors. Texture, brightness, and color, for example, can be used to detect boundaries in an image for detection of a face, facial features, facial landmarks, and so on.

A texture in a facial region can include facial characteristics, skin types, and so on. In some instances, a texture in a facial region can include smile lines, crow's feet, and wrinkles, among others. Another texture that can be used to evaluate a facial region can include a smooth portion of skin such as a smooth portion of a check. A gradient in a facial region can include values assigned to local skin texture, shading, etc. A gradient can be used to encode a texture by computing magnitudes in a local neighborhood or portion of an image. The computed values can be compared to discrimination levels, threshold values, and so on. The gradient can be used to determine gender, facial expression, etc. A color in a facial region can include eye color, skin color, hair color, and so on. A color can be used to determine demographic data, where the demographic data can include ethnicity, culture, age, and gender. A shape in a facial region can include the shape of a face, eyes, nose, mouth, ears, and so on. As with color in a facial region, shape in a facial region can be used to determine demographic data including ethnicity, culture, age, gender, and so on.

The facial regions can be detected based on detection of edges, boundaries, and so on, of features that can be included in an image. The detection can be based on various types of analysis of the image. The motion of the regions can be computed across a plurality of frames of video. Thus, in embodiments, the translating of facial content is based on motion of the regions. The features that can be included in the image can include one or more faces. A boundary can refer to a contour in an image plane, where the contour can represent ownership of a particular picture element (pixel) from one object, feature, etc. in the image, to another object, feature, and so on, in the image. An edge can be a distinct, low-level change of one or more features in an image. That is, an edge can be detected based on a change, including an abrupt change such as in color or brightness within an image. In embodiments, image classifiers are used for the analysis. The image classifiers can include algorithms, heuristics, and so on, and can be implemented using functions, classes, subroutines, code segments, etc. The classifiers can be used to detect facial regions, facial features, and so on. As discussed above, the classifiers can be used to detect textures, gradients, color, shapes, and edges, among others. Any classifier can be used for the analysis, including, but not limited to, density estimation, support vector machines (SVMs), logistic regression, classification trees, and so on. By way of example, consider facial features that can include the eyebrows 1531. One or more classifiers can be used to analyze the facial regions that can include the eyebrows to determine a probability for either a presence or an absence of an eyebrow furrow. The probability can include a posterior probability, a conditional probability, and so on. The probabilities can be based on Bayesian Statistics or some other statistical analysis technique. The presence of an eyebrow furrow can indicate the person from whom the facial data was collected is annoyed, confused, unhappy, and so on. In another example, consider facial features that can include a mouth 1550. One or more classifiers can be used to analyze the facial region that can include the mouth to determine a probability for either a presence or an absence of mouth edges turned up to form a smile. Multiple classifiers can be used to determine one or more facial expressions.

Figure 16:
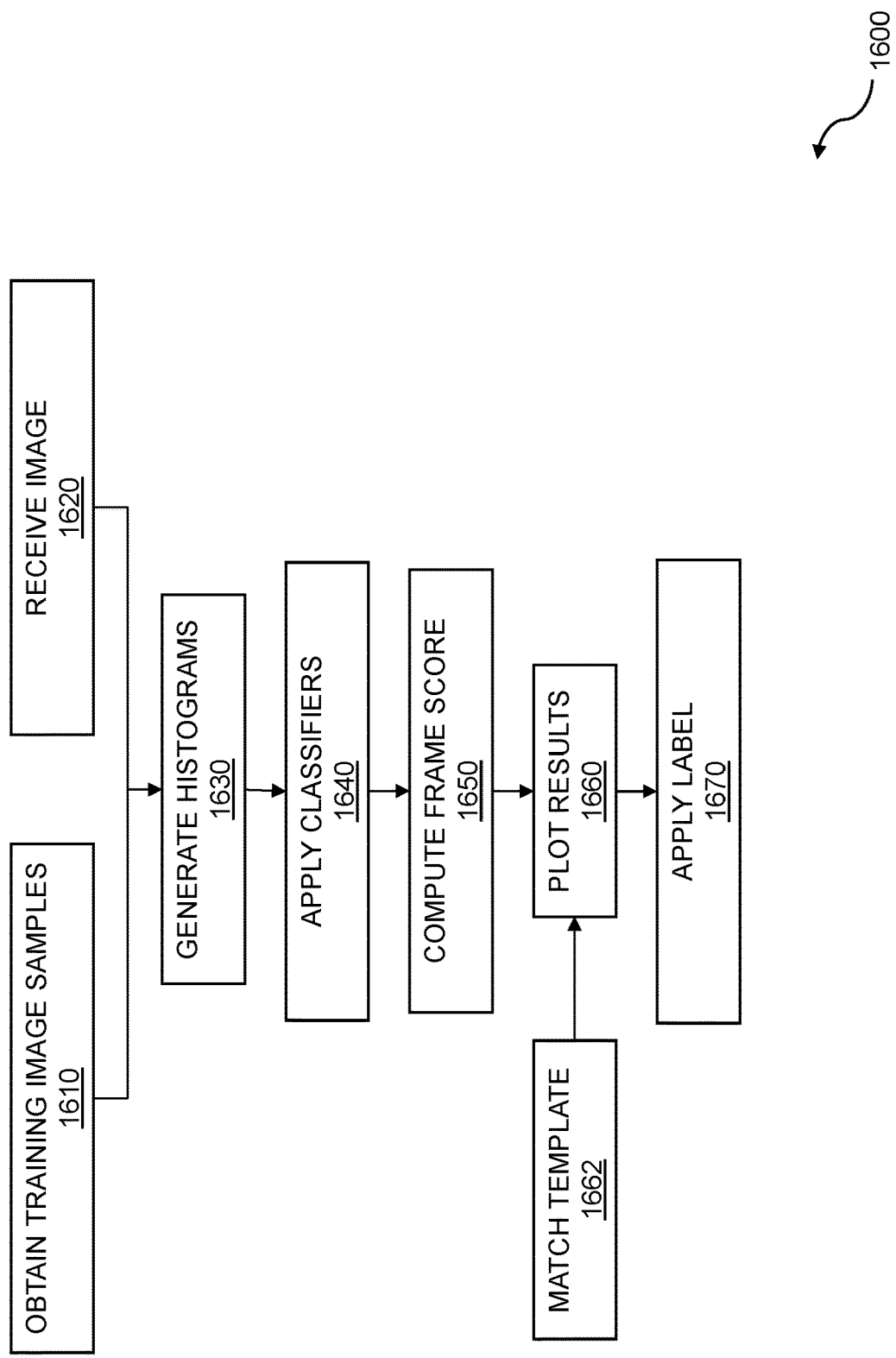
FIG. 16 is a flow diagram for detecting facial expressions.

FIG. 16 is a flow diagram for detecting facial expressions. The detection of facial expressions can be performed for data collected from images of an individual and used within a deep learning environment. The collected images can be analyzed for cognitive states and/or facial expressions. A plurality of images can be received of an individual viewing an electronic display. A face can be identified in an image, based on the use of classifiers. The plurality of images can be evaluated to determine the cognitive states and/or facial expressions of the individual. The flow 1600, or portions thereof, can be implemented in semiconductor logic, can be accomplished using a mobile device, can be accomplished using a server device, and so on. The flow 1600 can be used to automatically detect a wide range of facial expressions. A facial expression can produce strong emotional signals that can indicate valence and discrete emotional states. The discrete emotional states can include contempt, doubt, defiance, happiness, fear, anxiety, and so on. The detection of facial expressions can be based on the location of facial landmarks. The detection of facial expressions can be based on determination of action units (AUs), where the action units are determined using FACS coding. The AUs can be used singly or in combination to identify facial expressions. Based on the facial landmarks, one or more AUs can be identified by number and intensity. For example, AU12 can be used to code a lip corner puller and can be used to infer a smirk.

The flow 1600 begins by obtaining training image samples 1610. The image samples can include a plurality of images of one or more people. Human coders who are trained to correctly identify AU codes based on the FACS can code the images. The training or "known good" images can be used as a basis for training a machine learning technique. Once trained, the machine learning technique can be used to identify AUs in other images that can be collected using a camera, a sensor, and so on. The flow 1600 continues with receiving an image 1620. The image 1620 can be received from a camera, a sensor, and so on. As previously discussed, the camera or cameras can include a webcam, where a webcam can include a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. The image that is received can be manipulated in order to improve the processing of the image. For example, the image can be cropped, scaled, stretched, rotated, flipped, etc. in order to obtain a resulting image that can be analyzed more efficiently. Multiple versions of the same image can be analyzed. In some cases, the manipulated image and a flipped or mirrored version of the manipulated image can be analyzed alone and/or in combination to improve analysis. The flow 1600 continues with generating histograms 1630 for the training images and the one or more versions of the received image. The histograms can be based on a HoG or another histogram. As described in previous paragraphs, the HoG can include feature descriptors and can be computed for one or more regions of interest in the training images and the one or more received images. The regions of interest in the images can be located using facial landmark points, where the facial landmark points can include outer edges of nostrils, outer edges of the mouth, outer edges of eyes, etc. A HoG for a given region of interest can count occurrences of gradient orientation within a given section of a frame from a video.

The flow 1600 continues with applying classifiers 1640 to the histograms. The classifiers can be used to estimate probabilities, where the probabilities can correlate with an intensity of an AU or an expression. In some embodiments, the choice of classifiers used is based on the training of a supervised learning technique to identify facial expressions. The classifiers can be used to identify into which of a set of categories a given observation can be placed. The classifiers can be used to determine a probability that a given AU or expression is present in a given image or frame of a video. In various embodiments, the one or more AUs that are present include AU01 inner brow raiser, AU12 lip corner puller, AU38 nostril dilator, and so on. In practice, the presence or absence of multiple AUs can be determined. The flow 1600 continues with computing a frame score 1650. The score computed for an image, where the image can be a frame from a video, can be used to determine the presence of a facial expression in the image or video frame. The score can be based on one or more versions of the image 1620 or a manipulated image. The score can be based on a comparison of the manipulated image to a flipped or mirrored version of the manipulated image. The score can be used to predict a likelihood that one or more facial expressions are present in the image. The likelihood can be based on computing a difference between the outputs of a classifier used on the manipulated image and on the flipped or mirrored image, for example. The classifier that is used can be used to identify symmetrical facial expressions (e.g. smile), asymmetrical facial expressions (e.g. outer brow raiser), and so on.

The flow 1600 continues with plotting results 1660. The results that are plotted can include one or more scores for one or more frames computed over a given time t. For example, the plotted results can include classifier probability results from analysis of HoGs for a sequence of images and video frames. The plotted results can be matched with a template 1662. The template can be temporal and can be represented by a centered box function or another function. A best fit with one or more templates can be found by computing a minimum error. Other best-fit techniques can include polynomial curve fitting, geometric curve fitting, and so on. The flow 1600 continues with applying a label 1670. The label can be used to indicate that a particular facial expression has been detected in the one or more images or video frames which constitute the image 1620 that was received. The label can be used to indicate that any of a range of facial expressions has been detected, including a smile, an asymmetric smile, a frown, and so on. Various steps in the flow 1600 may be changed in order, repeated, omitted, or the like without departing from the disclosed concepts. Various embodiments of the flow 1600 can be included in a computer program product embodied in a non-transitory computer readable medium that includes code executable by one or more processors. Various embodiments of the flow 1600, or portions thereof, can be included on a semiconductor chip and implemented in special purpose logic, programmable logic, and so on.

Figure 17:
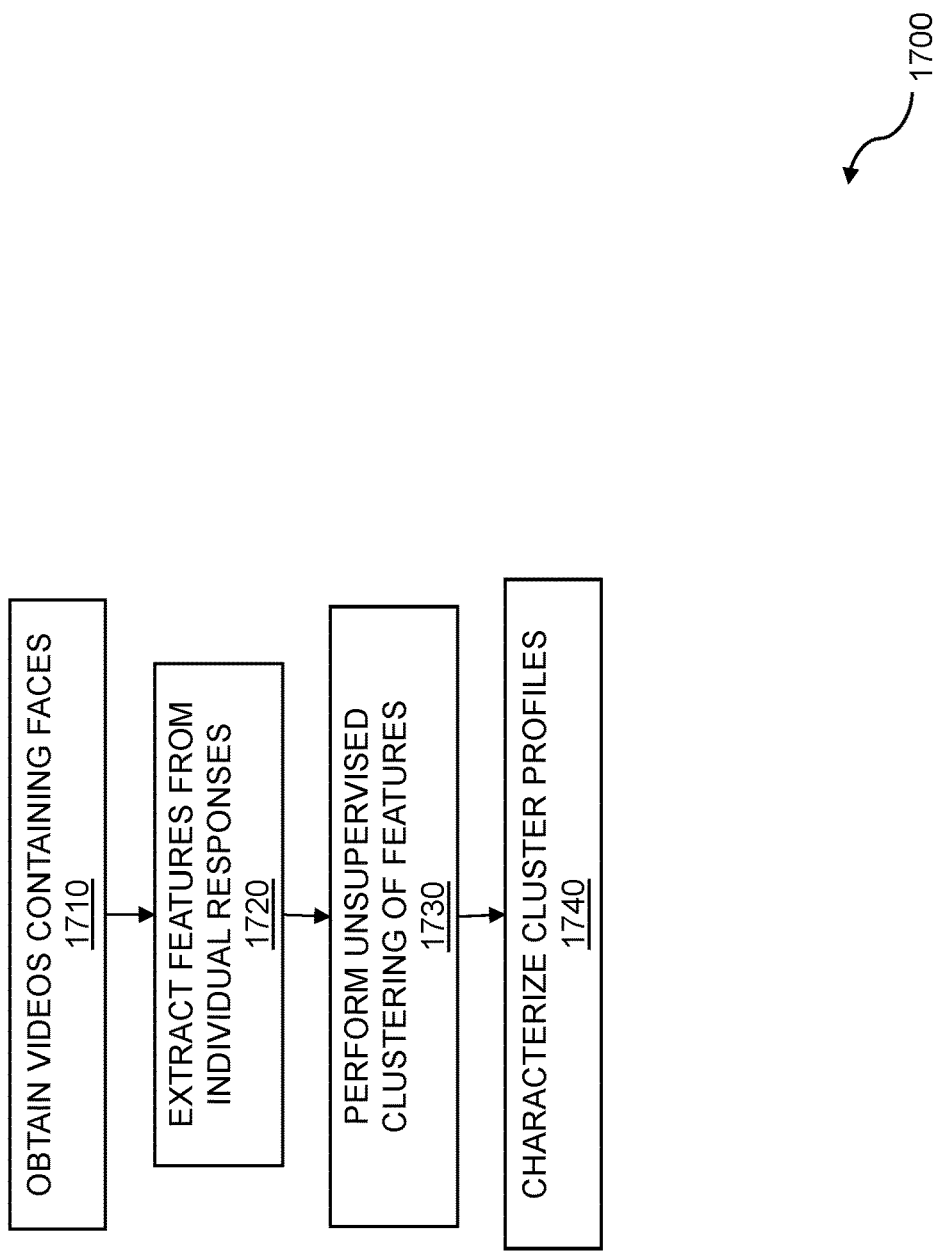
FIG. 17 is a flow diagram for the large-scale clustering of facial events.

FIG. 17 is a flow diagram for the large-scale clustering of facial events. The large-scale clustering of facial events can be performed for data collected from images of an individual. The collected images can be analyzed for cognitive states and/or facial expressions. A plurality of images can be received of an individual viewing an electronic display. A face can be identified in an image, based on the use of classifiers. The plurality of images can be evaluated to determine the cognitive states and/or facial expressions of the individual. The clustering and evaluation of facial events can be augmented using a mobile device, a server, semiconductor-based logic, and so on. As discussed above, collection of facial video data from one or more people can include a web-based framework. The web-based framework can be used to collect facial video data from large numbers of people located over a wide geographic area. The web-based framework can include an opt-in feature that allows people to agree to facial data collection. The web-based framework can be used to render and display data to one or more people and can collect data from the one or more people. For example, the facial data collection can be based on showing one or more viewers a video media presentation through a website. The web-based framework can be used to display the video media presentation or event and to collect videos from multiple viewers who are online. That is, the collection of videos can be crowdsourced from those viewers who elected to opt in to the video data collection. The video event can be a commercial, a political ad, an educational segment, and so on.

The flow 1700 begins with obtaining videos containing faces 1710. The videos can be obtained using one or more cameras, where the cameras can include a webcam coupled to one or more devices employed by the one or more people using the web-based framework. The flow 1700 continues with extracting features from the individual responses 1720. The individual responses can include videos containing faces observed by the one or more webcams. The features that are extracted can include facial features such as an eyebrow, a nostril, an eye edge, a mouth edge, and so on. The feature extraction can be based on facial coding classifiers, where the facial coding classifiers output a probability that a specified facial action has been detected in a given video frame. The flow 1700 continues with performing unsupervised clustering of features 1730. The unsupervised clustering can be based on an event. The unsupervised clustering can be based on a K-Means, where the K of the K-Means can be computed using a Bayesian Information Criterion (BICk), for example, to determine the smallest value of K that meets system requirements. Any other criterion for K can be used. The K-Means clustering technique can be used to group one or more events into various respective categories.

The flow 1700 continues with characterizing cluster profiles 1740. The profiles can include a variety of facial expressions such as smiles, asymmetric smiles, eyebrow raisers, eyebrow lowerers, etc. The profiles can be related to a given event. For example, a humorous video can be displayed in the web-based framework and the video data of people who have opted in can be collected. The characterization of the collected and analyzed video can depend in part on the number of smiles that occurred at various points throughout the humorous video. The number of smiles resulting from people viewing a humorous video can be compared to various demographic groups, where the groups can be formed based on geographic location, age, ethnicity, gender, and so on. Similarly, the characterization can be performed on collected and analyzed videos of people viewing a news presentation. The characterized cluster profiles can be further analyzed based on demographic data.

Various steps in the flow 1700 may be changed in order, repeated, omitted, or the like without departing from the disclosed concepts. Various embodiments of the flow 1700 can be included in a computer program product embodied in a non-transitory computer readable medium that includes code executable by one or more processors. Various embodiments of the flow 1700, or portions thereof, can be included on a semiconductor chip and implemented in special purpose logic, programmable logic, and so on.

Figure 18:
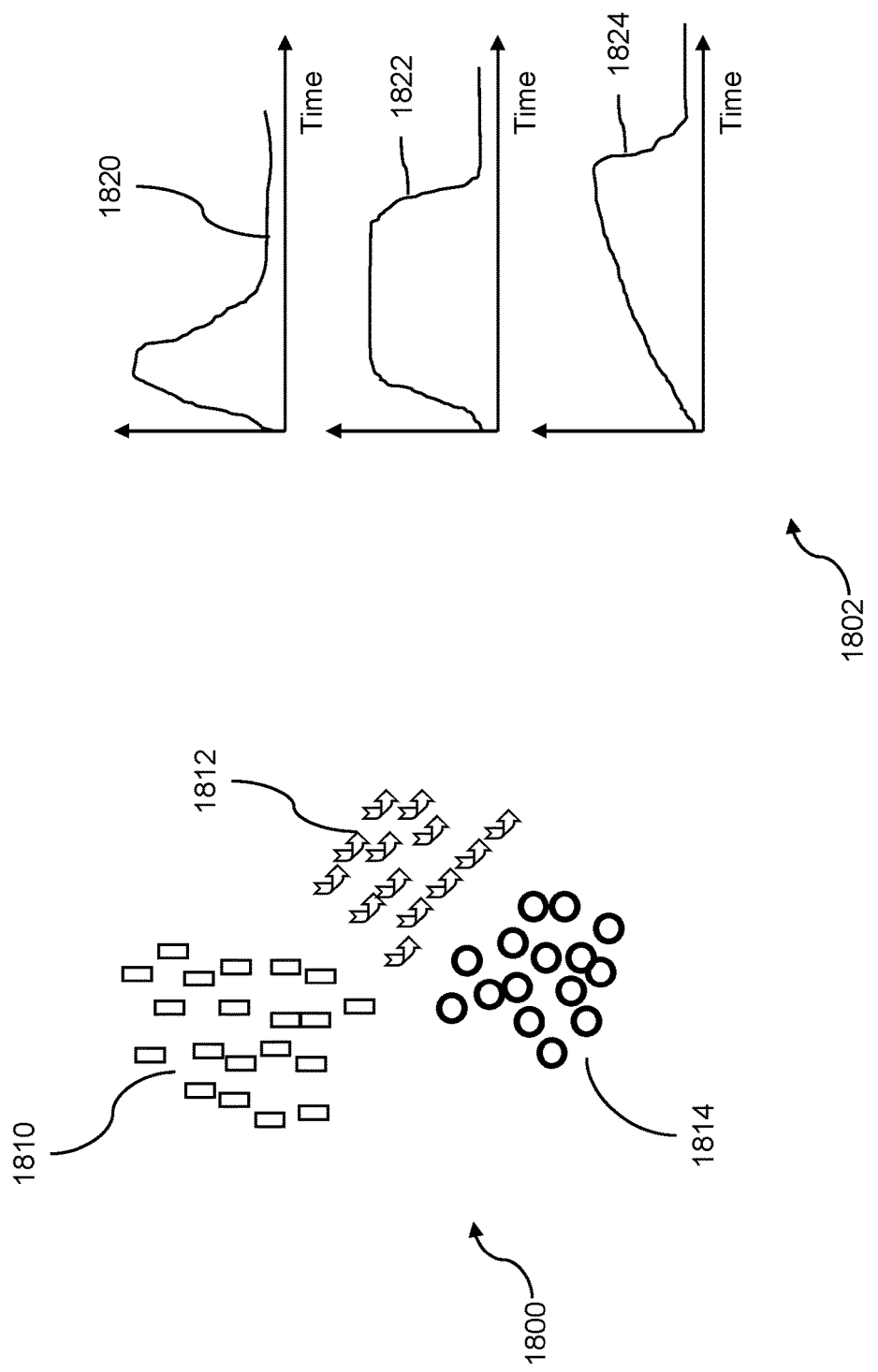
FIG. 18 shows unsupervised clustering of features and characterizations of cluster profiles.

FIG. 18 shows unsupervised clustering of features and characterizations of cluster profiles. The clustering can be accomplished as part of a deep learning effort. The clustering of features and characterizations of cluster profiles can be performed for images collected of an individual. The collected images can be analyzed for cognitive states and/or facial expressions. A plurality of images of an individual viewing an electronic display can be received. A face in an image can be identified, based on the use of classifiers. The plurality of images can be evaluated to determine cognitive states and/or facial expressions of the individual. Features including samples of facial data can be clustered using unsupervised clustering. Various clusters can be formed which include similar groupings of facial data observations. The example 1800 shows three clusters, clusters 1810, 1812, and 1814. The clusters can be based on video collected from people who have opted in to video collection. When the data collected is captured using a web-based framework, the data collection can be performed on a grand scale, including hundreds, thousands, or even more participants who can be located locally and/or across a wide geographic area. Unsupervised clustering is a technique that can be used to process the large amounts of captured facial data and to identify groupings of similar observations. The unsupervised clustering can also be used to characterize the groups of similar observations. The characterizations can include identifying behaviors of the participants. The characterizations can be based on identifying facial expressions and facial action units of the participants. Some behaviors and facial expressions can include faster or slower onsets, faster or slower offsets, longer or shorter durations, etc. The onsets, offsets, and durations can all correlate to time. The data clustering that results from the unsupervised clustering can support data labeling. The labeling can include FACS coding. The clusters can be partially or totally based on a facial expression resulting from participants viewing a video presentation, where the video presentation can be an advertisement, a political message, educational material, a public service announcement, and so on. The clusters can be correlated with demographic information, where the demographic information can include educational level, geographic location, age, gender, income level, and so on.

The cluster profiles 1802 can be generated based on the clusters that can be formed from unsupervised clustering, with time shown on the x-axis and intensity or frequency shown on the y-axis. The cluster profiles can be based on captured facial data including facial expressions. The cluster profile 1820 can be based on the cluster 1810, the cluster profile 1822 can be based on the cluster 1812, and the cluster profile 1824 can be based on the cluster 1814. The cluster profiles 1820, 1822, and 1824 can be based on smiles, smirks, frowns, or any other facial expression. The emotional states of the people who have opted in to video collection can be inferred by analyzing the clustered facial expression data. The cluster profiles can be plotted with respect to time and can show a rate of onset, a duration, and an offset (rate of decay). Other time-related factors can be included in the cluster profiles. The cluster profiles can be correlated with demographic information, as described above.

The cluster profiles 1820, 1822, and 1824 show change in cognitive state as a function of time, and serve as a cognitive state event temporal signature. The cognitive state event temporal signature is a measure of how quickly an emotion occurs or dissipates. Some emotions may occur suddenly, such as resulting from a surprise. Other emotions may occur gradually, as a user comprehends a situation unfolding over time. The time span in which a change in emotion occurs can be indicative of the intensity of the emotion. Thus, the cognitive state event temporal signature can provide valuable information for interpreting human emotion. In embodiments translating of facial content is based on a cognitive state event temporal signature.

Figure 19A:
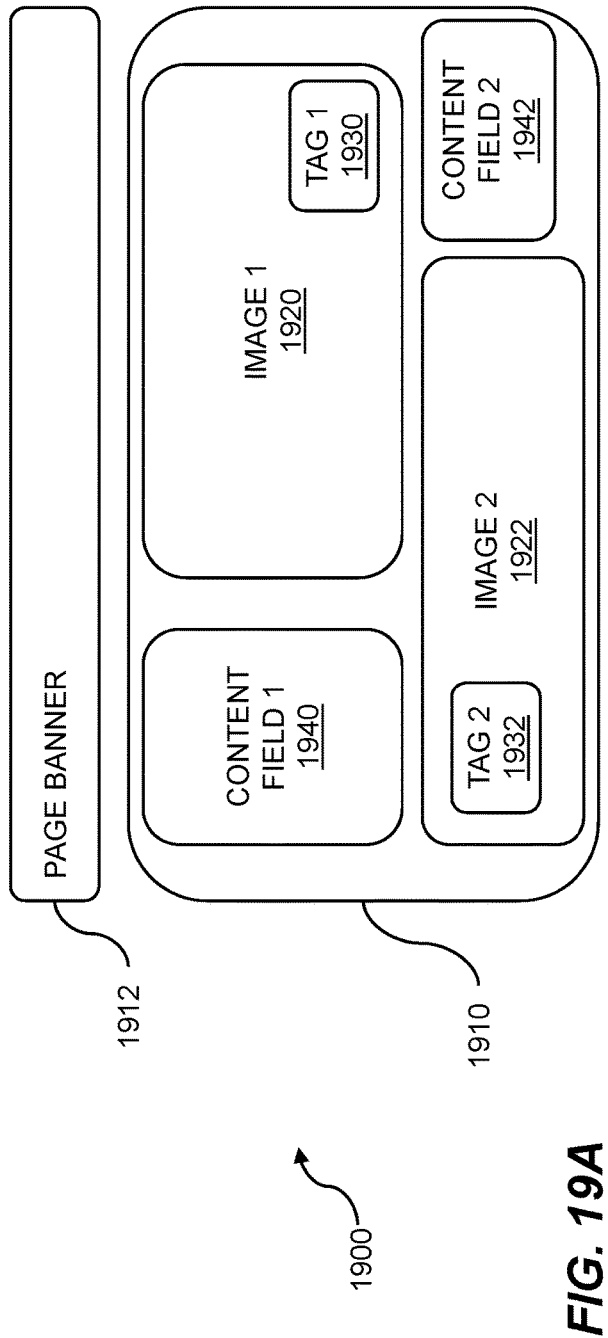
FIG. 19A shows example tags embedded in a webpage.

FIG. 19A shows example tags embedded in a webpage. The tags embedded in the webpage can be used for image analysis for images collected of an individual, and the image analysis can be performed by a multi-layer system. The collected images can be analyzed for cognitive states and/or facial expressions. A plurality of images of an individual viewing an electronic display can be received. A face in an image can be identified, based on the use of classifiers. The plurality of images can be evaluated to determine cognitive states and/or facial expressions of the individual. Once a tag is detected, a mobile device, a server, semiconductor-based logic, etc. can be used to evaluate associated facial expressions. A webpage 1900 can include a page body 1910, a page banner 1912, and so on. The page body can include one or more objects, where the objects can include text, images, videos, audio, and so on. The example page body 1910 shown includes a first image, image 1 1920; a second image, image 2 1922; a first content field, content field 1 1940; and a second content field, content field 2 1942. In practice, the page body 1910 can contain multiple images and content fields, and can include one or more videos, one or more audio presentations, and so on. The page body can include embedded tags, such as tag 1 1930 and tag 2 1932. In the example shown, tag 1 1930 is embedded in image 1 1920, and tag 2 1932 is embedded in image 2 1922. In embodiments, multiple tags are imbedded. Tags can also be embedded in content fields, in videos, in audio presentations, etc. When a user mouses over a tag or clicks on an object associated with a tag, the tag can be invoked. For example, when the user mouses over tag 1 1930, tag 1 1930 can then be invoked. Invoking tag 1 1930 can include enabling a camera coupled to a user's device and capturing one or more images of the user as the user views a media presentation (or digital experience). In a similar manner, when the user mouses over tag 2 1932, tag 2 1932 can be invoked. Invoking tag 2 1932 can also include enabling the camera and capturing images of the user. In other embodiments, other actions are taken based on invocation of the one or more tags. Invoking an embedded tag can initiate an analysis technique, post to social media, award the user a coupon or another prize, initiate cognitive state analysis, perform emotion analysis, and so on.

Figure 19B:
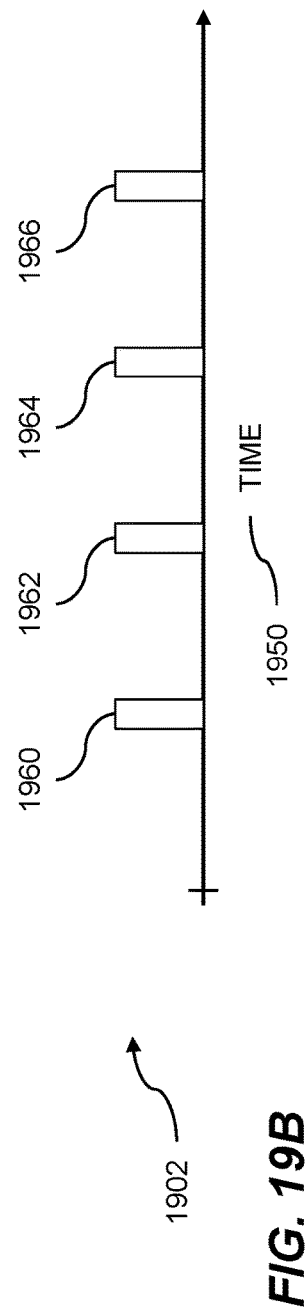
FIG. 19B shows invoking tags to collect images.

FIG. 19B shows invoking tags to collect images. The invoking tags to collect images can be used for image analysis for images collected of an individual. The collected images can be analyzed for cognitive states and/or facial expressions. A plurality of images of an individual viewing an electronic display can be received. A face in an image can be identified, based on the use of classifiers. The plurality of images can be evaluated to determine cognitive states and/or facial expressions of the individual. As previously stated, a media presentation can be a video, a webpage, and so on. A video 1902 can include one or more embedded tags, such as a tag 1960, another tag 1962, a third tag 1964, a fourth tag 1966, and so on. In practice, multiple tags can be included in the media presentation. The one or more tags can be invoked during the media presentation. The collection of the invoked tags can occur over time, as represented by a timeline 1950. When a tag is encountered in the media presentation, the tag can be invoked. When the tag 1960 is encountered, invoking the tag can enable a camera coupled to a user device and can capture one or more images of the user viewing the media presentation. Invoking a tag can depend on opt-in by the user. For example, if a user has agreed to participate in a study by indicating an opt-in, then the camera coupled to the user's device can be enabled and one or more images of the user can be captured. If the user has not agreed to participate in the study and has not indicated an opt-in, then invoking the tag 1960 does not enable the camera nor capture images of the user during the media presentation. The user can indicate an opt-in for certain types of participation, where opting-in can be dependent on specific content in the media presentation. The user could opt in to participate in a study of political campaign messages and not opt in for a particular advertisement study. In this case, tags that are related to political campaign messages, advertising messages, social media sharing, etc., and that enable the camera and image capture when invoked would be embedded in the media presentation, social media sharing, and so on. However, tags embedded in the media presentation that are related to advertisements would not enable the camera when invoked. Various other situations of tag invocation are possible. One such usage of tag invocation can include the automatic selection of a representative icon based on a user's facial expression upon invocation of the tag. Thus, when a user interacts with a given web page, a representative icon such as an emoji can be sent with a user message, or suggested to the user for inclusion in a message such as a social media post, as an example.

Figure 20:
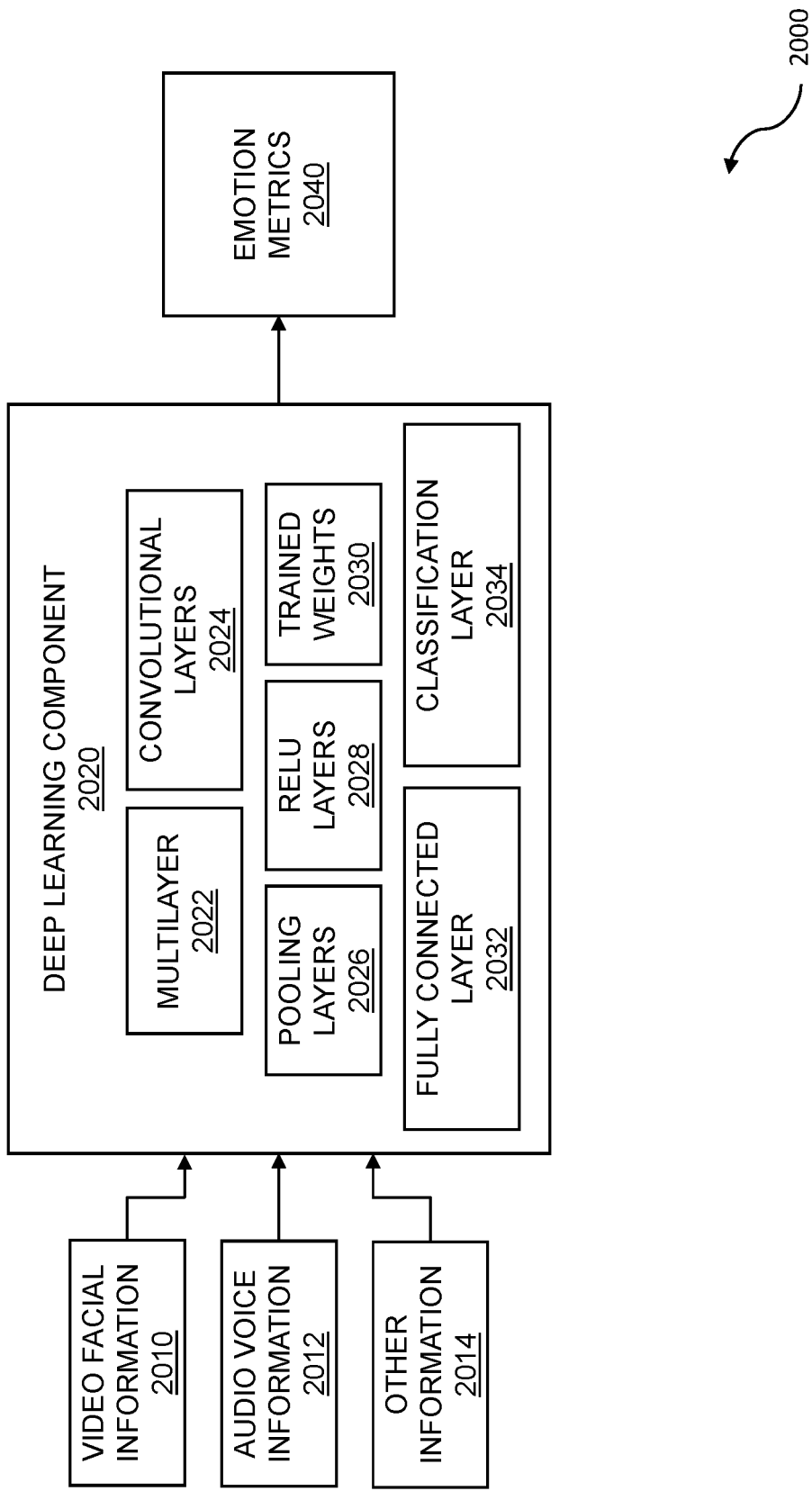
FIG. 20 shows a high-level diagram for machine learning/deep learning.

FIG. 20 illustrates a high-level diagram for machine learning/deep learning. Deep learning can be used for facial tracking with classifiers for query evaluation. A plurality of information channels is captured into a computing device such as a smartphone, personal digital assistant (PDA), tablet, laptop computer, and so on. The plurality of information channels includes contemporaneous audio information and video information from an individual. Trained weights are learned on a multilayered convolutional computing system. The trained weights are learned using the audio information and the video information from the plurality of information channels. The trained weights cover both the audio information and the video information and are trained simultaneously. The learning facilitates emotion analysis of the audio information and the video information. Further information is captured into a second computing device. The second computing device and the first computing device may be the same computing device. The further information can include physiological information, contextual information, and so on. The further information is analyzed using the trained weights to provide an emotion metric based on the further information.

Understanding and evaluating moods, emotions, or cognitive states requires a nuanced evaluation of facial expressions, audio expressions, or other cues generated by people. Cognitive state analysis is important in many areas such as research, psychology, business, intelligence, law enforcement, and so on. The understanding of cognitive states can be used in a variety of fields, such as improving marketing analysis, assessing the effectiveness of customer service experiences and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues.

Deep learning is a branch of machine learning which seeks to imitate in software the activity which takes place in layers of neurons in the neocortex of the human brain. Deep learning applications include processing of image data, audio data, and so on. In many contexts, "deep learning" and "machine learning" can be used interchangeably. FIG. 20 illustrates a high-level diagram for deep learning 2000. The deep learning can be accomplished using a multilayered convolutional computing system, a convolutional neural network, or other techniques. The deep learning can accomplish image analysis, audio analysis, and other analysis tasks. A deep learning component 2020 collects and analyzes various types of information from a plurality of information channels. The information channels can include video facial information 2010, audio voice information 2012, other information 2014, and so on. In embodiments, the other information can include one or more of electrodermal activity, heart rate, heart rate variability, skin temperature, blood pressure, muscle movements, or respiration.

Returning to the deep learning component 2020, the deep learning component can include a multilayered convolutional computing system 2022. The multilayered convolutional computing system 2022 can include a plurality of layers of varying types. The layers can include one or more convolutional layers 2024 which can be used for learning and analysis. The convolutional layers can include pooling layers 2026 which can combine the outputs of clusters into a single datum. The layers can include one or more Rectified Linear Unit (ReLU) layers 2028. The one or more ReLU layers can implement an activation function such as $f(x)=\max(0,x)$, thus providing an activation with a threshold at zero. The convolutional layers can include trained weights 2030. The trained weights can be based on learning, where the learning uses information collected from one or more individuals via a plurality of information channels. The trained weights can be used to enable the multilayer convolutional computing system to determine image characteristics, voice characteristics, and so on.

The deep learning component 2020 can include a fully connected layer 2032. The fully connected layer 2032 processes each data point from the output of a collection of intermediate layers. The fully connected layer 2032 takes all data points in the previous layer and connects them to every single node contained within the fully connected layer. The output of the fully connected layer 2032 can provide input to a classification layer 2034. The classification layer can be used to classify emotional states, cognitive states, moods, and so on. The classification can be based on using classifiers. The deep learning component 2020 provides data that includes emotion metrics 2040. The emotion metrics can include an emotion type, a number of occurrences of the emotion type, the intensity of the emotion type, and so on. The emotion metric can be based on a threshold value, on a target value, on a goal, etc. The emotion metric can be based on emotion types that can occur over a period of time. More than one emotion metric can be provided.

Figure 21:
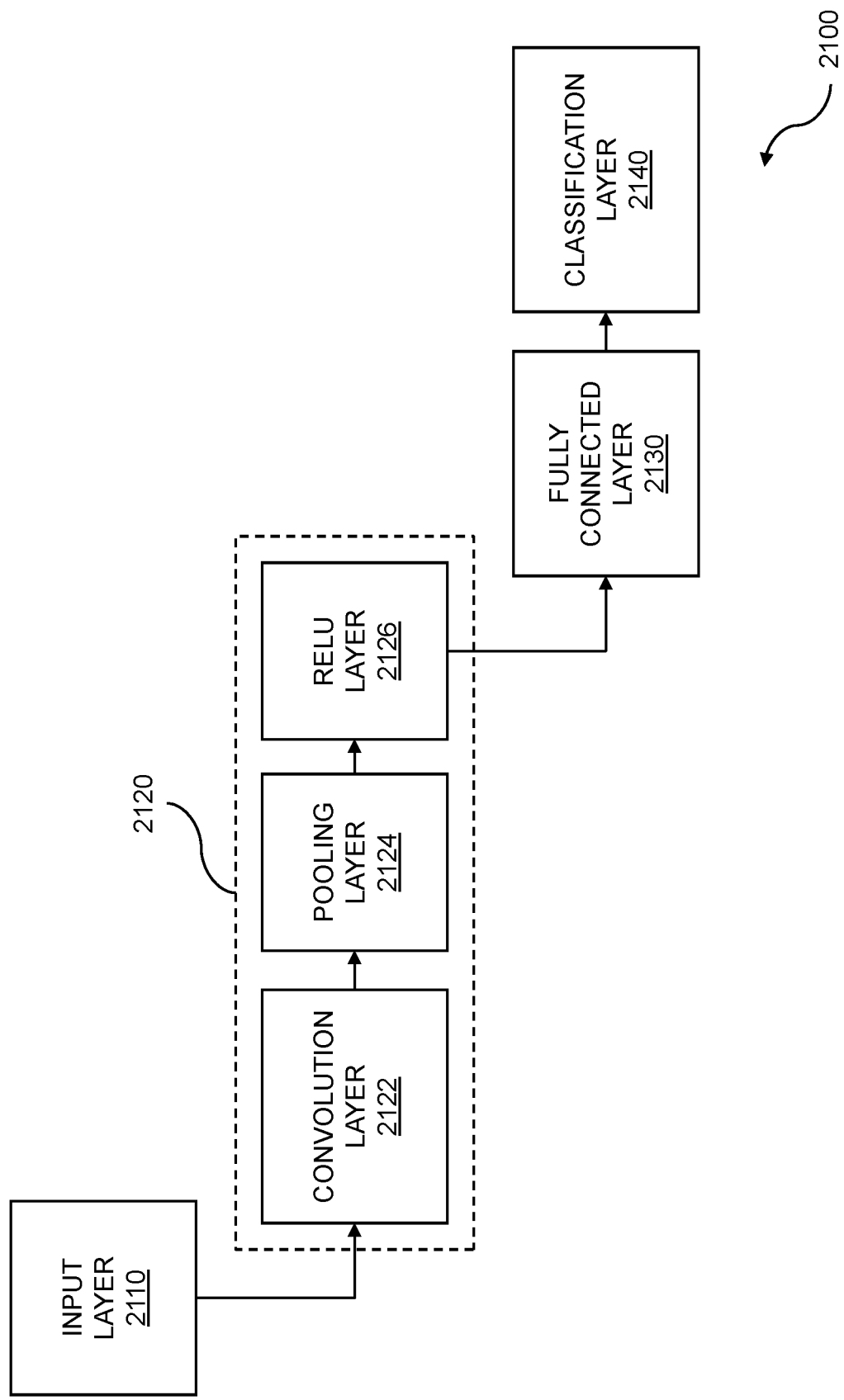
FIG. 21 is an example showing a convolutional neural network.

FIG. 21 is an example showing a convolutional neural network. A convolutional neural network can be used for facial tracking with classifiers for query evaluation. A plurality of information channels is captured into a computing device. The plurality of information channels includes contemporaneous audio information and video information from an individual. Trained weights are learned on a multilayered convolutional computing system. The trained weights are learned using the audio information and the video information from the plurality of information channels, where the trained weights cover both the audio information and the video information and are trained simultaneously, and where the learning facilitates emotion analysis of the audio information and the video information. Further information is captured into a second computing device. The further information is analyzed using the trained weights to provide an emotion metric based on the further information.

Emotion analysis is a very complex task. Understanding and evaluating moods, emotions, or cognitive states requires a nuanced evaluation of facial expressions or other cues generated by people. Cognitive state analysis is important in many areas such as research, psychology, business, intelligence, law enforcement, and so on. The understanding of cognitive states can be used in a variety of fields, such as improving marketing analysis, assessing the effectiveness of customer service experiences and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues. In a content scenario, producing compelling content that achieves the desired effect (e.g. fear, shock, laughter, etc.) can result in increased ticket sales and/or increased advertising revenue. If a movie studio is producing a horror movie, it is desirable to know if the scary scenes in the movie are achieving the desired effect. By conducting tests in sample audiences, and analyzing faces in the audience, a computer-implemented method and system can process thousands of faces to assess the cognitive state at the time of the scary scenes. In many ways, such an analysis can be more effective than surveys that ask audience members questions, since audience members may consciously or subconsciously change answers based on peer pressure or other factors. However, spontaneous facial expressions can be more difficult to conceal or control. Thus, by analyzing facial expressions en masse, important information regarding the cognitive state of the audience can be obtained.

Analysis of facial expressions is also a complex undertaking. Image data, where the image data can include facial data, can be analyzed to identify a range of facial expressions. The facial expressions can include a smile, frown, smirk, and so on. The image data and facial data can be processed to identify the facial expressions. The processing can include analysis of expression data, action units, gestures, cognitive states, physiological data, and so on. Facial data as contained in the raw video data can include information on one or more action units such as head gestures, smiles, brow furrows, squints, lowered eyebrows, raised eyebrows, attention, and the like. The action units can be used to identify smiles, frowns, and other facial indicators of expressions. Gestures can also be identified, and can include a head tilt to the side, a forward lean, a smile, a frown, as well as many other gestures. Other types of data including the physiological data can be obtained, where the physiological data can be obtained using a camera or other image capture device, without contacting the person or persons.

Respiration, heart rate, heart rate variability, perspiration, temperature, and other physiological indicators of cognitive state can be determined by analyzing the images and video data.

Analysis of expressions emanating from human audio is also highly complex. Audio data can include speech, grunts, groans, shouts, screams, and so on. Further, the method of how the audio is produced can greatly influence the one or more expressions extracted from the audio. As a result, the audio data, such as voice data, can be evaluated for timbre, prosody, vocal register, vocal resonance, pitch, loudness, speech rate, language content, and so on. The evaluation results can be associated with cognitive states, emotional states, moods, and so on. For example, loud, rapid, shrill speech can indicate anger, while moderate, controlled speech including polysyllabic words can indicate confidence.

Deep learning is a branch of machine learning which seeks to imitate in software the activity which takes place in layers of neurons in the neocortex of the human brain. This imitative activity can enable software to "learn" to recognize and identify patterns in data, where the data can include digital forms of images, sounds, and so on. The deep learning software is used to simulate the large array of neurons of the neocortex. This simulated neocortex, or artificial neural network, can be implemented using mathematical formulas that are evaluated on processors. With the ever-increasing capabilities of the processors, increasing numbers of layers of the artificial neural network can be processed.

Deep learning applications include processing of image data, audio data, and so on. Image data applications include image recognition, facial recognition, etc. Image data applications can include differentiating dogs from cats, identifying different human faces, and the like. The image data applications can include identifying moods, cognitive states, emotional states, and so on, from the facial expressions of the faces that are identified. Audio data applications can include analyzing audio input such as ambient room sounds, physiological sounds such as breathing or coughing, noises made by an individual such as tapping and drumming, voices, and so on. The voice data applications can include analyzing a voice for timbre, prosody, vocal register, vocal resonance, pitch, loudness, speech rate, or language content. The voice data analysis can be used to determine one or more moods, cognitive states, emotional states, etc.

The artificial neural network which forms the basis for deep learning is based on layers. The layers can include an input layer, a convolution layer, a fully connected layer, a classification layer, and so on. The input layer can receive input data such as image data, where the image data can include a variety of formats including pixel formats. The input layer can then perform processing tasks such as identifying boundaries of the face, identifying landmarks of the face, extracting features of the face, and/or rotating a face within the plurality of images. The convolution layer can represent an artificial neural network such as a convolutional neural network. A convolutional neural network can contain a plurality of hidden layers within it. A convolutional layer can reduce the amount of data feeding into a fully connected layer. The fully connected layer processes each pixel/data point from the convolutional layer. A last layer within the multiple layers can provide output indicative of cognitive state. The last layer of the convolutional neural network can be the final classification layer. The output of the final classification layer can be indicative of cognitive state of faces within the images that are provided to input layer.

Deep networks including deep convolutional neural networks can be used for facial expression parsing. A first layer of the deep network includes multiple nodes, where each node represents a neuron within a neural network. The first layer can receive data from an input layer. The output of the first layer can feed to a second layer, where the latter layer also includes multiple nodes. A weight can be used to adjust the output of the first layer which is being input to the second layer. Some layers in the convolutional neural network can be hidden layers. The output of the second layer can feed to a third layer. The third layer can also include multiple nodes. A weight can adjust the output of the second layer which is being input to the third layer. The third layer may be a hidden layer. Outputs of a given layer can be fed to next layer. Weights adjust the output of one layer as it is fed to the next layer. When the final layer is reached, the output of the final layer can be a facial expression, a cognitive state, a characteristic of a voice, and so on. The facial expression can be identified using a hidden layer from the one or more hidden layers. The weights can be provided on inputs to the multiple layers to emphasize certain facial features within the face. The convolutional neural network can be trained to identify facial expressions, voice characteristics, etc. The training can include assigning weights to inputs on one or more layers within the multilayered analysis engine. One or more of the weights can be adjusted or updated during training. The assigning of weights can be accomplished during a feed-forward pass through the multilayered neural network. In a feed-forward arrangement, the information moves forward, from the input nodes, through the hidden nodes and on to the output nodes. Additionally, the weights can be updated during a backpropagation process through the multilayered analysis engine.

Returning to the figure, FIG. 21 illustrates a system diagram 2100 for deep learning. The system for deep learning can be used for multimodal machine learning. The system for deep learning can be accomplished using a convolution neural network or other techniques. The deep learning can accomplish facial recognition and analysis tasks. The network includes an input layer 2110. The input layer 2110 receives image data. The image data can be input in a variety of formats, such as JPEG, TIFF, BMP, and GIF. Compressed image formats can be decompressed into arrays of pixels, wherein each pixel can include an RGB tuple. The input layer 2110 can then perform processing such as identifying boundaries of the face, identifying landmarks of the face, extracting features of the face, and/or rotating a face within the plurality of images.

The network includes a collection of intermediate layers 2120. The multilayered analysis engine can include a convolutional neural network. Thus, the intermediate layers can include a convolution layer 2122. The convolution layer 2122 can include multiple sublayers, including hidden layers within it. The output of the convolution layer 2122 feeds into a pooling layer 2124. The pooling layer 2124 performs a data reduction, which makes the overall computation more efficient. Thus, the pooling layer reduces the spatial size of the image representation to reduce the number of parameters and computation in the network. In some embodiments, the pooling layer is implemented using filters of size 2×2, applied with a stride of two samples for every depth slice along both width and height, resulting in a reduction of 75-percent of the downstream node activations. The multilayered analysis engine can further include a max pooling layer 2124. Thus, in embodiments, the pooling layer is a max pooling layer, in which the output of the filters is based on a maximum of the inputs. For example, with a 2×2 filter, the output is based on a maximum value from the four input values. In other embodiments, the pooling layer is an average pooling layer or L2-norm pooling layer. Various other pooling schemes are possible.

The intermediate layers can include a Rectified Linear Units (ReLU) layer 2126. The output of the pooling layer 2124 can be input to the ReLU layer 2126. In embodiments, the ReLU layer implements an activation function such as $f(x)=\max(0,x)$, thus providing an activation with a threshold at zero. In some embodiments, the ReLU layer 2126 is a leaky ReLU layer. In this case, instead of the activation function providing zero when x<0, a small negative slope is used, resulting in an activation function such as $f(x)=1(x<0)(\alpha x)+1(x>=0)(x)$. This can reduce the risk of "dying ReLU" syndrome, where portions of the network can be "dead" with nodes/neurons that do not activate across the training dataset. The image analysis can comprise training a multilayered analysis engine using the plurality of images, wherein the multilayered analysis engine can comprise multiple layers that include one or more convolutional layers 2122 and one or more hidden layers, and wherein the multilayered analysis engine can be used for emotion analysis.

The example 2100 includes a fully connected layer 2130. The fully connected layer 2130 processes each pixel/data point from the output of the collection of intermediate layers 2120. The fully connected layer 2130 takes all neurons in the previous layer and connects them to every single neuron it has. The output of the fully connected layer 2130 provides input to a classification layer 2140. The output of the classification layer 2140 provides a facial expression and/or cognitive state as its output. Thus, a multilayered analysis engine such as the one depicted in FIG. 21 processes image data using weights, models the way the human visual cortex performs object recognition and learning, and provides effective analysis of image data to infer facial expressions and cognitive states.

Figure 22:
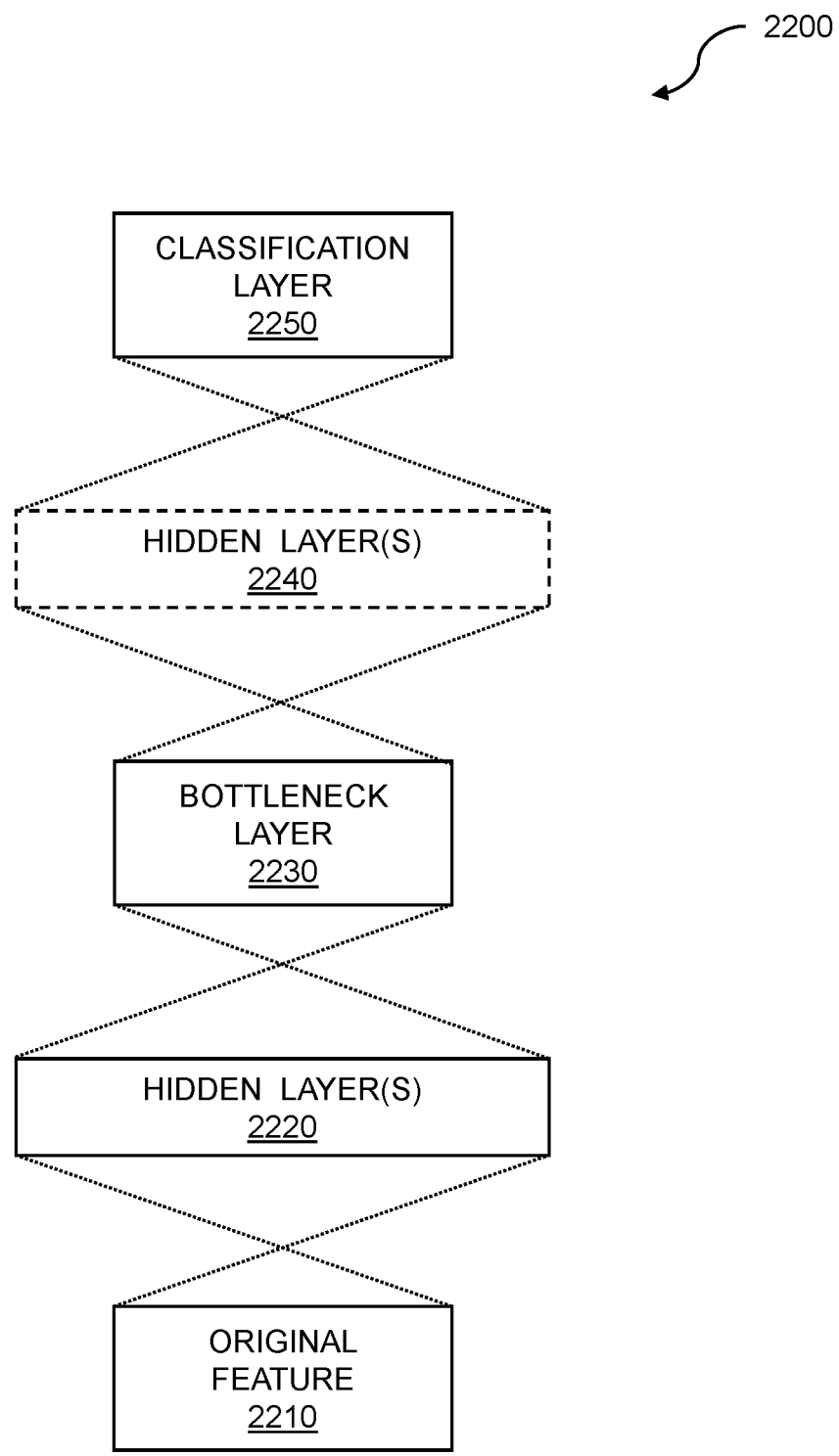
FIG. 22 illustrates a bottleneck layer within a deep learning environment.

FIG. 22 illustrates a bottleneck layer within a deep learning environment. A bottleneck layer can be a layer of a deep neural network and can be used for facial tracking with classifiers for query evaluation. A deep neural network can apply audio classifiers. The audio classifiers are learned from analyzed facial data for a face within the video data. Video data that includes images of one or more people is obtained. Audio data that corresponds to the video data is also obtained. A face is identified within the video data, and a voice from the audio data is associated with the face. Using the learned audio classifiers, further audio data is analyzed.

Layers of a deep neural network can include a bottleneck layer 2200. A bottleneck layer can be used for a variety of applications such as facial recognition, voice recognition, emotional state recognition, and so on. The deep neural network in which the bottleneck layer is located can include a plurality of layers. The plurality of layers can include an original feature layer 2210. A feature such as an image feature can include points, edges, objects, boundaries between and among regions, properties, and so on. The deep neural network can include one or more hidden layers 2220. The one or more hidden layers can include nodes, where the nodes can include nonlinear activation functions and other techniques. The bottleneck layer can be a layer that learns translation vectors to transform a neutral face to an emotional or expressive face. In some embodiments, the translation vectors can transform a neutral sounding voice to an emotional or expressive voice. Specifically, activations of the bottleneck layer determine how the transformation occurs. A single bottleneck layer can be trained to transform a neutral face or voice to an emotional or expressive face or voice. In some cases, individual bottleneck layers can be trained for a transformation pair. At runtime, once the user's emotion has been identified and an appropriate response to it can be determined (mirrored or complementary), the trained bottleneck layer can be used to perform the needed transformation.

The deep neural network can include a bottleneck layer 2230. The bottleneck layer can include a fewer number of nodes than the one or more preceding hidden layers. The bottleneck layer can create a constriction in the deep neural network or other network. The bottleneck layer can force information that is pertinent to a classification into a low dimensional representation. The bottleneck features can be extracted using an unsupervised technique. In other embodiments, the bottleneck features can be extracted in a supervised manner. The supervised technique can include training the deep neural network with a known dataset. The features can be extracted from an autoencoder such as a variational autoencoder, a generative autoencoder, and so on. The deep neural network can include hidden layers 2240. The count of the hidden layers can include zero hidden layers, one hidden layer, a plurality of hidden layers, and so on. The hidden layers following the bottleneck layer can include more nodes than the bottleneck layer. The deep neural network can include a classification layer 2250. The classification layer can be used to identify the points, edges, objects, boundaries, and so on, described above. The classification layer can be used to identify cognitive states, cognitive states, emotional states, moods, and the like. The output of the final classification layer can be indicative of the emotional states of faces within the images, where the images can be processed using the deep neural network.

Figure 23:
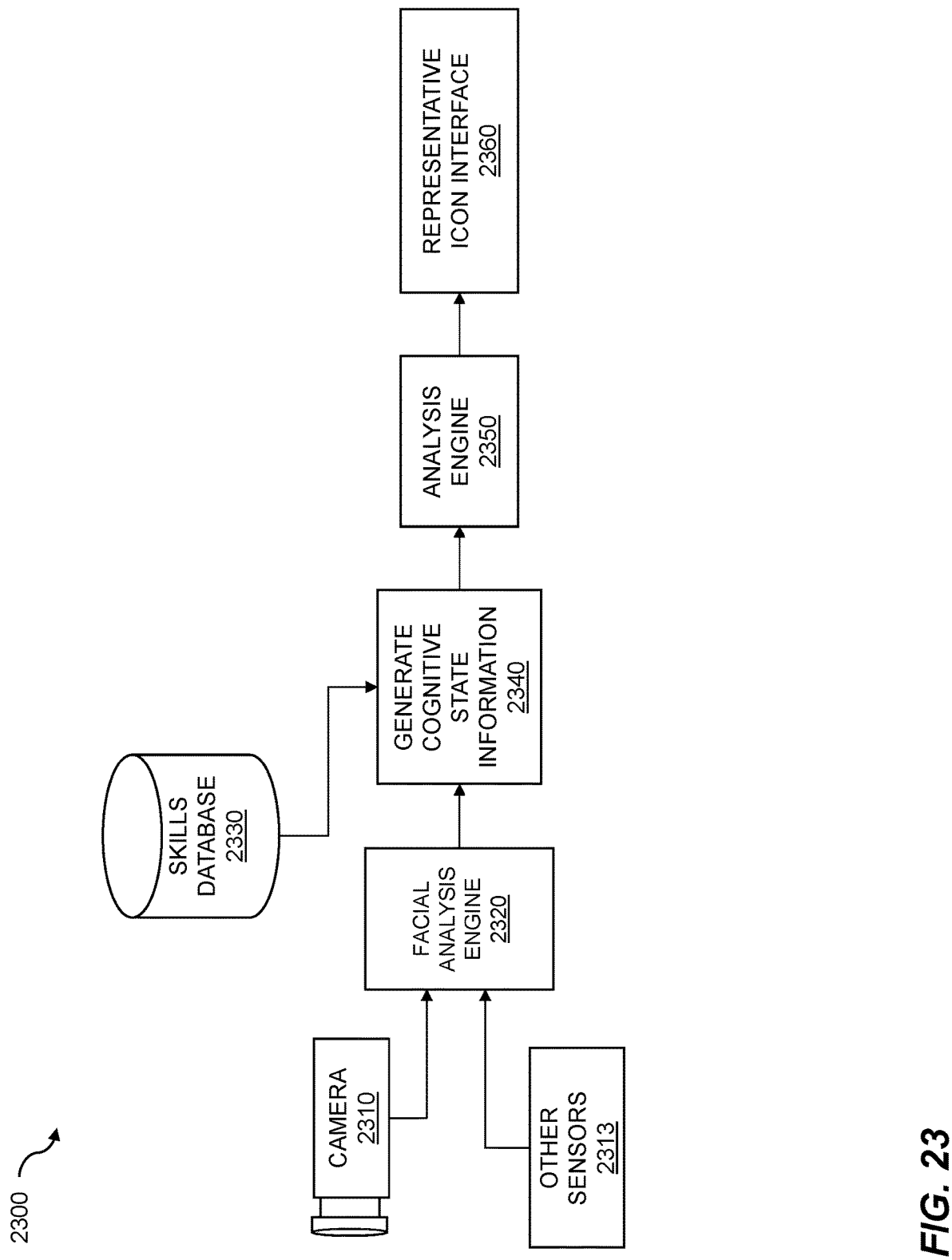
FIG. 23 illustrates a block diagram for emoji manipulation.

FIG. 23 illustrates a block diagram for emoji manipulation. The block diagram 2300 includes a camera 2310. The camera 2310 can capture an image or a plurality of images. More than one camera can be used. The camera or cameras can include a webcam, where a webcam can include a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. The camera 2310 can be coupled to a facial analysis engine 2320. Other sensors 2313 can also be coupled to the analysis engine to augment facial analysis. The other sensors 2313 could include biosensors evaluating electrodermal activity, heart rate, perspiration, respiration, blood sugar, and the like. The facial analysis engine can analyze an image from the plurality of images and can capture cognitive state data, where the cognitive state data can include facial data for the individual. The facial analysis engine 2320 can be coupled to a cognitive state information generator 2340. The cognitive state information generator can generate the cognitive state information for an individual or a plurality of individuals. The cognitive state information generator can augment the facial analysis data from the facial analysis engine 2320. The cognitive state information generator can be implemented on a machine learning system. The facial analysis engine 2320 can calculate a facial expression metric associated with the facial data. The facial expression metric can be further analyzed to generate a cognitive state metric. All or part of the analysis can be performed on a neural network. The neural network can use classifiers to translate facial data into a cognitive state metric. The neural network can be integrated or partitioned over several devices, including a portable device such as a cell phone, a server that is local or remote, or a cloud service, to name just a few. The neural network can be part of a machine learning system. Some embodiments further include calculating a facial expression metric for the individual based on the classifying. Some embodiments further include generating a cognitive state metric for the individual based on the facial expression metric. And some embodiments further include the cognitive state metric in the translating.

Augmented information can be included in the analysis. The augmented information can include a voice, a context such as an environment, time and date, social information, news cycle information, and so on. The cognitive state information generator can be coupled to a skills database 2330. The skills database 2330 can include filtering information, temporal information, logical information, and so on. The cognitive state information generator can be coupled to an analysis engine 2350. The analysis engine can be based on behavioral models. The analysis engine can generate instructions for translating a representative icon based on the facial analysis and the cognitive state information that can be generated. The instructions from the analysis engine can be sent to a representative icon interface 2360. The instructions can enable representative icon rendering.

Figure 24:
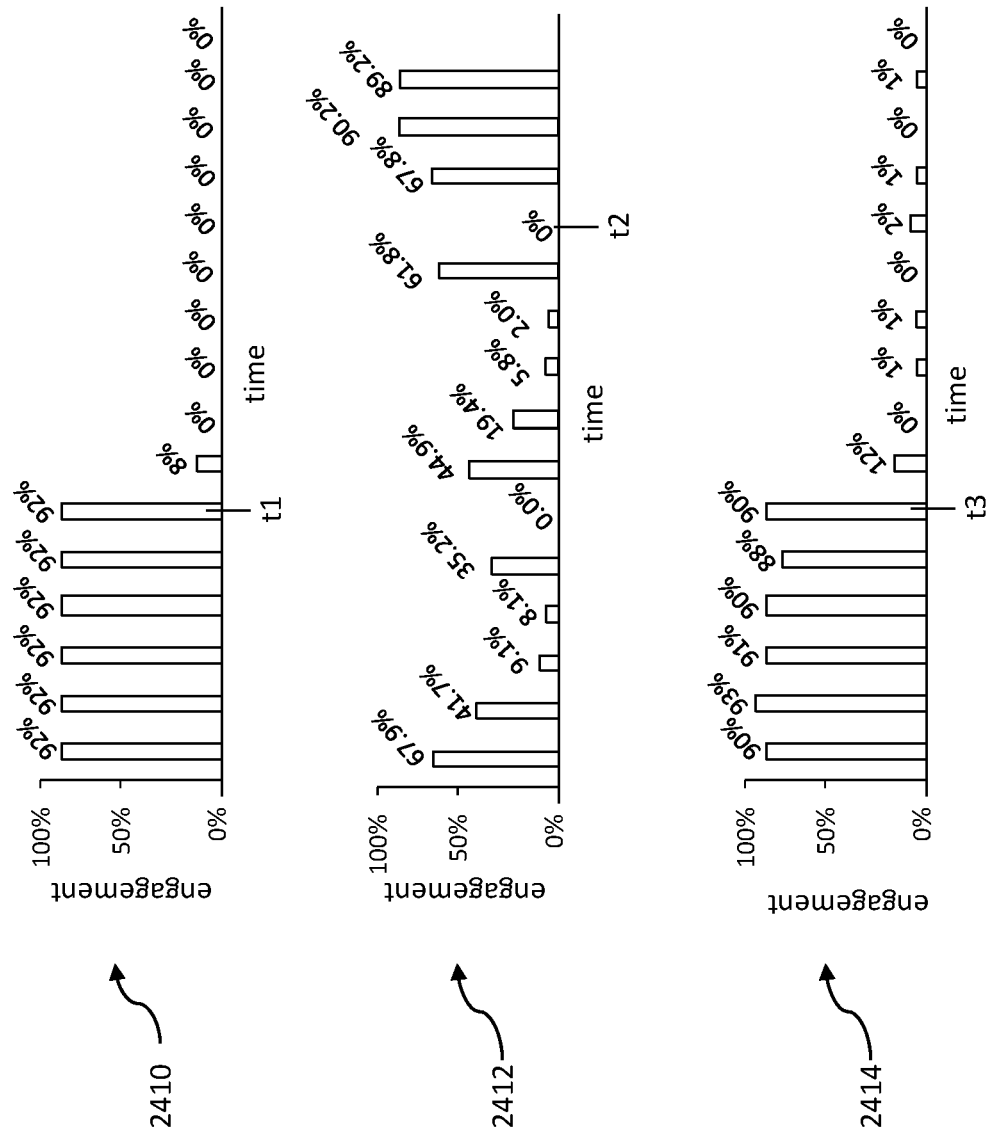
FIG. 24 is an example illustrating facial data that can be used to generate a cognitive state metric.

FIG. 24 is an example illustrating facial data that can be used to generate a cognitive state metric. FIG. 24 includes three charts, charts 2410, 2412, and 2414. Each chart has a horizontal axis of time, and a vertical axis of an engagement level, which may be derived from cognitive state data. In other embodiments, cognitive state data or other data derived from cognitive state data may be used to generate cognitive state metrics, such as measures of happiness, inattentiveness, concentration, and so on. Each bar on the chart may represent a time window comprising a fixed unit of time, such as one minute. In chart 2410, until time t1, the engagement level is at 92%, indicating that the user is mostly focused on the displayed content. After time t1, the next bar indicates a very low engagement level because at some point during that time window, the user left the area. In the subsequent time windows, the engagement level is zero, as the individual is no longer present.

In chart 2412, the individual remains present in front of the rendered content, but for a portion of the video, he frequently looks away. As can be seen in the chart 2412, up until time t2, the engagement level is sporadic, fluctuating between low and midrange levels. After time t2, the engagement level increases. In such an embodiment where digital media content is modified based on viewership, a chart such as 2412 indicates that the ending of the video is engaging to the individual, while earlier in the video, before time t2, the video was not as engaging. Thus, in embodiments, the modification includes shortening the video by deleting and/or shortening scenes of the video prior to time t2, in order to better hold the individual's attention and interest.

In chart 2414, the individual remains present in front of the rendered content, but for a portion of the video, he is frequently looking away by averting his gaze away from the screen that is presenting the media content. As can be seen in chart 2414, up until time t3, the engagement level is relatively high, indicating a high level of focus by the individual on the media content. After time t3, the engagement level significantly decreases. Each detected engagement level may be considered cognitive state data. In order to generate a cognitive state metric based on a chart such as

2414, the cognitive state data may be processed in any appropriate and desired fashion.

For example, groups of three sequential engagement levels may be averaged to produce cognitive state metrics for a plurality of time periods. As another example, all of the engagement levels for a given time period may be summed and divided by the number of engagement levels that are below 50% in order to determine a cumulative cognitive state metric. For example, in chart 2410, a cumulative cognitive state metric may be determined by summing all of the engagement levels (560) and dividing by the number of engagement levels below 50% (ten), resulting in a cumulative cognitive state metric of 560/10 or 56. For chart 2410, a cumulative cognitive state metric may be determined by summing all of the engagement levels (543.1) and dividing by the number of engagement levels below 50% (ten), resulting in a cumulative cognitive state metric of 543.1/10 or 54.31. For chart 2414, a cumulative cognitive state metric may be determined by summing all of the engagement levels (560) and dividing by the number of engagement levels below 50% (ten in chart 2414), resulting in a cumulative cognitive state metric of 56. Thus, if chart 2410 has a cumulative cognitive state metric of 56, chart 2412 has a metric of 54.31, and chart 2414 has a metric of 56, it may be determined that charts 2410 and 2414 indicate roughly equal levels of engagement while chart 2412 indicates slightly lower engagement than that shown by charts 2410 and 2414. As further examples, if a user is 100% engaged for 8 of 16 sample periods and 49% engaged for the remaining eight sample periods, the cumulative cognitive state metric may be calculated as 100, indicating more engagement than is shown in charts 2410, 2412, and 2414. However, if a user is only 80% engaged for 4 of 16 sample periods and 0% engaged for the remaining 12 sample periods, the cumulative cognitive state metric may be calculated as 26.67, indicating less engagement than is shown in charts 2410, 2412, and 2414. Although only a selection of cognitive state metrics is explicitly discussed herein, it will be understood after reviewing this application in its entirety that any number of different cognitive state metrics may be used.

Figure 25:
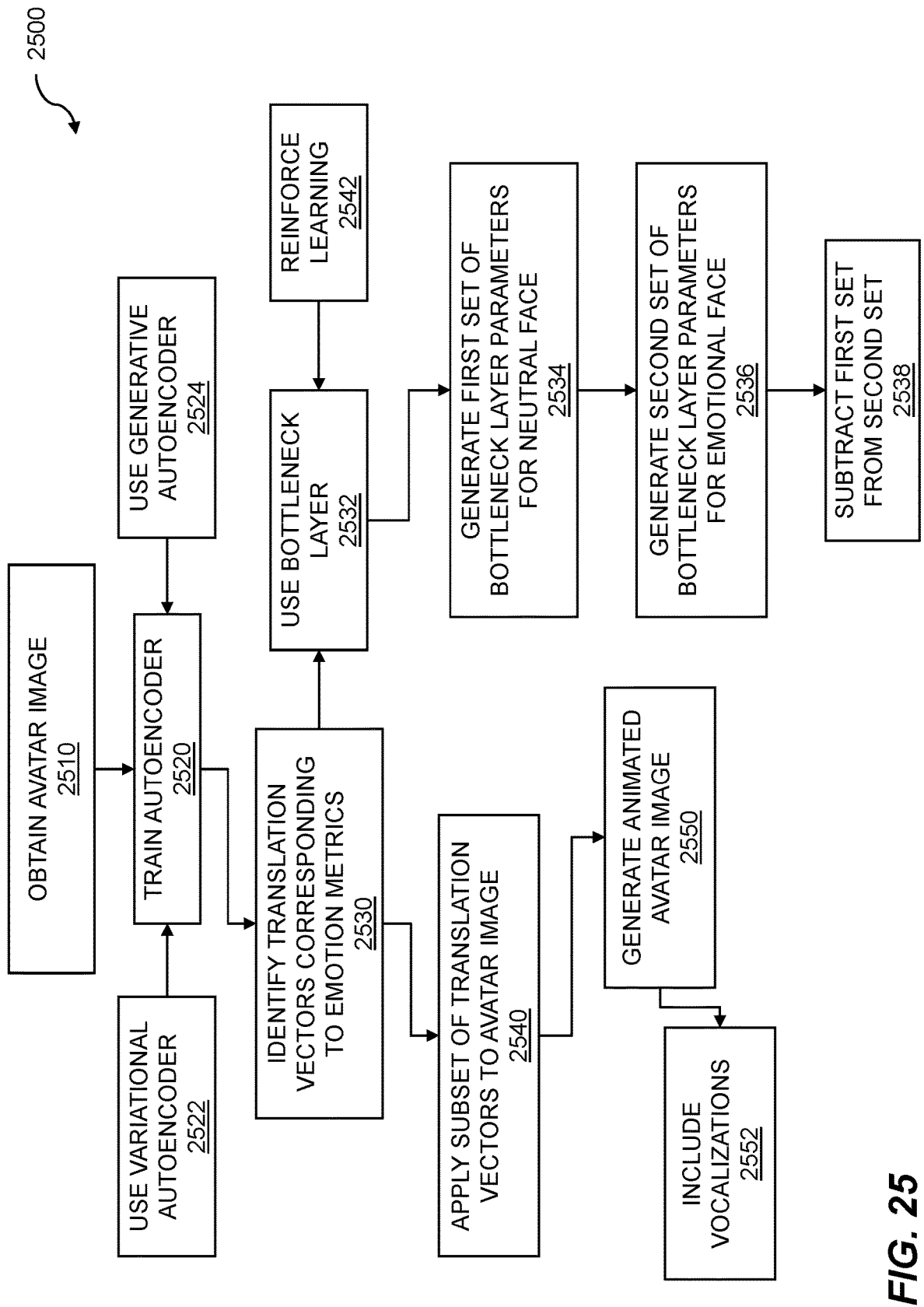
FIG. 25 is a flow diagram for an emotion-enabled animation.

FIG. 25 is a flow diagram for an emotion-enabled animation. Various disclosed techniques include image generation for avatar image or emoji animation using translation vectors. The flow 2500 includes obtaining an avatar image 2510 for representation on a first computing device. The avatar image can be based on one or more images of a person, a morphed image, and the like. The avatar image can be based on an emoji, an animated emoji, a cartoon, and so on. In embodiments, the avatar image can include a humanoid face. The humanoid face can be a simulated face, a cartoon face, a character face, and so on. In embodiments, the avatar image includes vocalizations. The vocalization can include speech vocalizations, non-speech vocalizations, etc. The first computing device can include a personal electronic device such as a smartphone, a personal digital assistant (PDA), and a tablet computer. The first computing device can include a wearable device such as a smart watch, smart glasses, a smart garment, etc. The first computing device can be a laptop computer, a desktop computer, etc. The flow 2500 incudes training an autoencoder 2520, on a second computing device comprising an artificial neural network, to generate synthetic emotive faces. The artificial neural network can include a convolutional neural network, a deep neural network, and so on. The second computing device can be similar to the first computing device or can be different from the first computing device. The second computing device can be a local server, a remote server, a blade server, a distributed server, a cloud server, and so on. Various types of autoencoders can be used. In embodiments, the training the autoencoder can include using a variational autoencoder 2522. In other embodiments, the training the autoencoder can include using a generative autoencoder 2524. In embodiments, the training is based on a plurality of facial videos of pre-catalogued facial emotion expressions.

The flow 2500 includes identifying a plurality of translation vectors corresponding to a plurality of emotion metrics 2530, based on the training. The translation vectors can be used to translate an avatar image, including a humanoid face, from one expression of an emotion to another expression of the same emotion or to a different emotion. The translation vectors can correspond to emotion metrics, where the emotion metrics can be used to determine one or more emotions, an intensity of an emotion, a duration of an emotion, and so on. The emotions can include happy, sad, angry, bored, and so on. In embodiments, the emotion metric input is obtained from facial analysis of an individual. The facial analysis can be based on one or more images captured from the individual. In embodiments, the facial expression is identified using a software development kit (SDK). The software development kit can be obtained from the provider of the animated avatar, from a third party, from shareware, and so on. In embodiments, the identifying the plurality of translation vectors uses a bottleneck layer 2532 within the autoencoder. The bottleneck layer can include a fewer number of nodes than the one or more preceding hidden layers in an artificial neural network. The bottleneck layer can create a constriction in the artificial neural network. The bottleneck layer can force information that is pertinent to a classification, for example, into a low dimensional representation. The flow 2500 can further include generating a first set of bottleneck layer parameters, from the bottleneck layer, learned for a neutral face 2534. The first set of bottleneck layer parameters can be used to identify characteristics of the neutral face. The characteristics of the neutral face can include lip position, eyelid position, and so on. The neutral face can be the humanoid face, a cartoon face, and so on. The flow 2500 further includes generating a second set of bottleneck layer parameters for an emotional face 2536. The second set of bottleneck layer parameters can be used for determining the one or more emotions of the emotional face. The second set of bottleneck layer parameters can be used to identify emotions based on non-speech vocalizations such as laughter, cries, sighs, squeals, yawns, grunts, clicks, filled pauses, unfilled pauses, and so on. The flow 2500 further includes subtracting the first set of bottleneck layer parameters from the second set of bottleneck layer parameters 2538 for use in the translation vectors. The subtracting the first set of bottleneck layer parameters from the second set of bottleneck layer parameters can be used to map the transition from the face with the neutral expression to the face with the emotional expression. The mapping can include intermediate steps between the neutral face and the emotional face so that the avatar animation can show the onset of the emotional face, variations of the emotional face such as head movement and blinking eyes, the decay of the emotional face, and so on.

The flow 2500 includes applying a subset of the plurality of translation vectors to the avatar image 2540, wherein the subset represents an emotion metric input. Many translation vectors can be identified in order to translate a neutral avatar face such as a humanoid face to an emotional avatar face. The emotional face can be derived from the neutral face by using a subset of the translation vectors. A happy face can result from using a subset of the translation vectors, a laughing face can result from using a subset of the translation vectors, and so on. The subsets of translation vectors may overlap or may not overlap, depending on the desired emotional face. The flow 2500 includes reinforcing learning 2542 of one or more bottleneck layers. Feedback can be provided, either manually or automatically, to further train a bottleneck layer based on responses from a person to a currently displayed avatar image.

The flow 2500 includes generating an animated avatar image 2550 for the first computing device, based on the applying, wherein the animated avatar image is reflective of the emotion metric input. The generated animated avatar image can be rendered on a screen coupled to the first computing device. The generated animated avatar image can be rendered in a program, an app, a webpage displayed in a web browser, and so on. The animated avatar can represent facial expressions of an individual. The individual can be the user of the first computing device. In embodiments, the avatar image includes body language. The body language can include body position, body orientation, body movement, and so on. In embodiments, the generating further includes vocalizations 2552 based on the emotion metric input. The vocalizations can include speech vocalizations, non-speech vocalizations, etc. Various steps in the flow 2500 may be changed in order, repeated, omitted, or the like without departing from the disclosed concepts. Various embodiments of the flow 2500 can be included in a computer program product embodied in a non-transitory computer readable medium that includes code executable by one or more processors.

Figure 26:
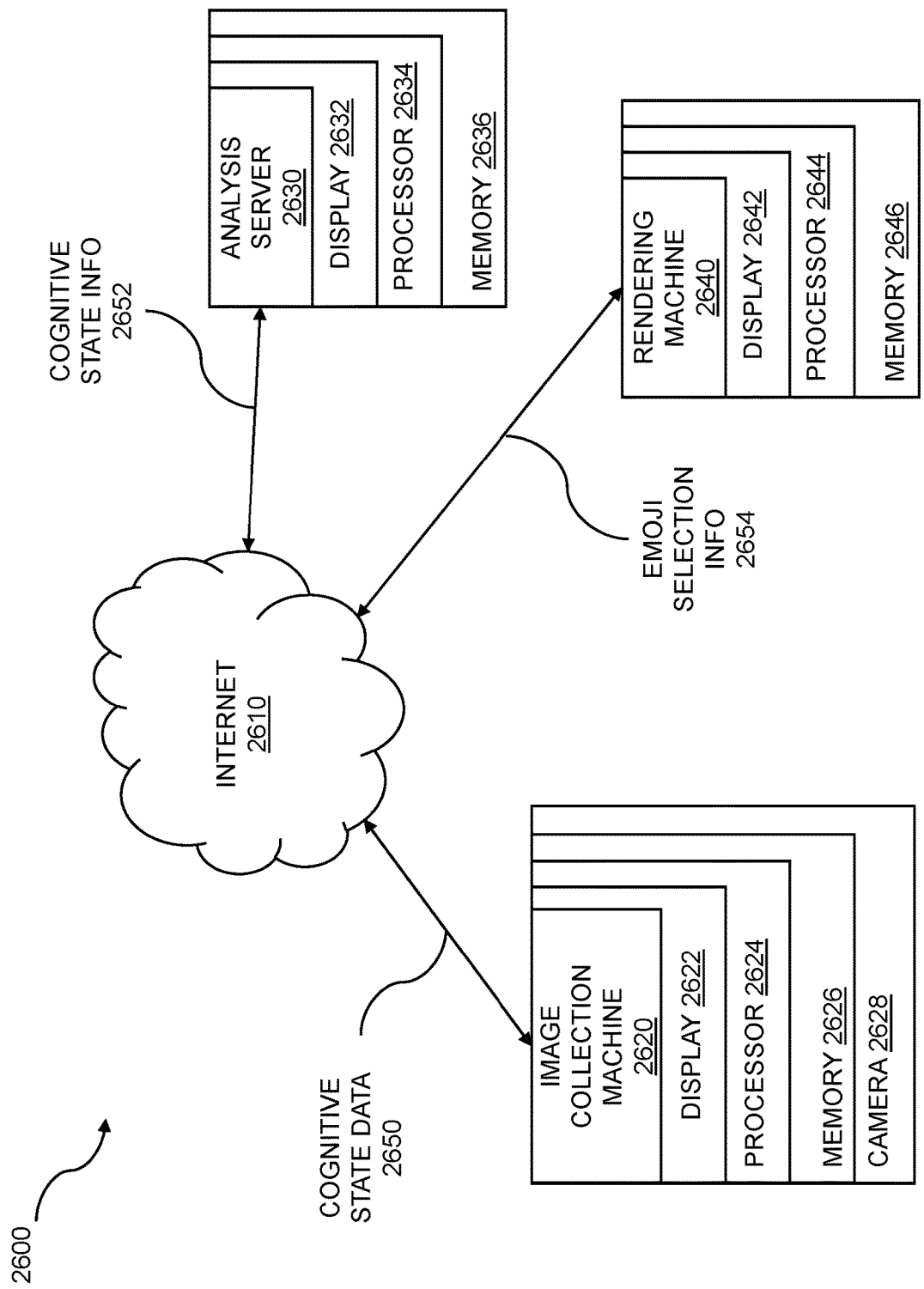
FIG. 26 is a system diagram for emoji manipulation using machine learning.

FIG. 26 is a system diagram for emoji manipulation using machine learning. The system 2600 for analysis of image content can be implemented using a variety of electronic hardware and software techniques. For example, the system 2600 for analysis of image content can be implemented using one or more machines. The one or more machines can implement deep learning or machine learning. An example system 2600 is shown for mental state data collection, analysis, and rendering. The system 2600 can include a memory which stores instructions and one or more processors attached to the memory wherein the one or more processors, when executing the instructions which are stored, are configured to: obtain an image of an individual; identify a face of the individual; extract features within the face of the individual; perform facial landmark detection on the face of the individual; and translate facial landmarks, detected during the performing of the facial landmark detection, into a representative icon. The system 2600 can perform a computer-implemented method for image analysis comprising: obtaining an image of an individual; identifying a face of the individual; extracting features within the face of the individual; performing facial landmark detection on the face of the individual; and translating facial landmarks, detected during the performing of the facial landmark detection, into a representative icon.

The system 2600 can include one or more image data collection machines 2620 linked to an analysis server 2630 and a rendering machine 2640 via the Internet 2610 or another computer network. The network can be wired or wireless, a combination of wired and wireless networks, and so on. Cognitive state information 2652 can be transferred to the analysis server 2630 through the Internet 2610, for example. The example image data collection machine 2620 shown comprises one or more processors 2624 coupled to a memory 2626 which can store and retrieve instructions, a display 2622, and a camera 2628. The camera 2628 can include a webcam, a video camera, a still camera, a thermal imager, a CCD device, a phone camera, a three-dimensional camera, a depth camera, a light field camera, multiple webcams used to show different views of a person, or any other type of image capture technique that can allow captured data to be used in an electronic system. The memory 2626 can be used for storing instructions, image data on a plurality of people, one or more classifiers, and so on. The display 2622 can be any electronic display, including but not limited to, a computer display, a laptop screen, a netbook screen, a tablet computer screen, a smartphone display, a mobile device display, a remote with a display, a television, a projector, or the like. Cognitive state data 2650 can be transferred via the Internet 2610 for a variety of purposes including analysis, rendering, storage, sharing, and so on.

The analysis server 2630 can include one or more processors 2634 coupled to a memory 2636 which can store and retrieve instructions, and can also include a display 2632. The analysis server 2630 can receive the cognitive state information 2652 and analyze the image data using classifiers. The classifiers can be stored in the analysis server, loaded into the analysis server, provided by a user of the analysis server, and so on. The analysis server 2630 can use image data received from the image data collection machine 2620 to produce emoji selection information 2654. In some embodiments, the analysis server 2630 receives image data from a plurality of image data collection machines, aggregates the image data, processes the image data or the aggregated image data, and so on.

The rendering machine 2640 can include one or more processors 2644 coupled to a memory 2646 which can store and retrieve instructions and data, and can also include a display 2642. The display of an emoji based on the emoji selection information 2654 can occur on the rendering machine 2640 or on a different platform than the rendering machine 2640. In embodiments, the rendering of the emoji selection information rendering data occurs on the image data collection machine 2620 or on the analysis server 2630. As shown in the system 2600, the rendering machine 2640 can receive emoji selection information rendering data 2654 via the Internet 2610 or another network from the image data collection machine 2620, from the analysis server 2630, or from both. The rendering can include a visual display or any other appropriate display format.

The system 2600 can include a computer program product embodied in a non-transitory computer readable medium for image analysis, the computer program product comprising code which causes one or more processors to perform operations of: accessing a machine learning system; processing an image of an individual, using the machine learning system, wherein the processing includes: identifying a face of the individual; and classifying the face to determine facial content using a plurality of image classifiers, wherein the classifying includes generating confidence values for a plurality of action units for the face; and translating the facial content into a representative icon, wherein the translating the facial content includes summing the confidence values for the plurality of action units.

The system 2600 can include a computer system for image analysis comprising: a memory which stores instructions; one or more processors coupled to the memory wherein the one or more processors, when executing the instructions which are stored, are configured to: access a machine learning system; process an image of an individual, using the machine learning system, wherein the processing includes: identifying a face of the individual; and classifying the face to determine facial content using a plurality of image classifiers, wherein the classifying includes generating confidence values for a plurality of action units for the face; and translate the facial content into a representative icon, wherein the translating the facial content includes summing the confidence values for the plurality of action units.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more substeps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for emoji manipulation comprising:
   accessing a machine learning system comprising a convolutional neural network wherein the convolutional neural network includes an input layer, one or more hidden layers, and a classification layer;
   processing an image of an individual, using the machine learning system, wherein the processing includes:
      identifying a face of the individual; and
      classifying the face to determine facial content based on a facial expression from the face, wherein the classifying includes identifying the facial expression using a hidden layer from the one or more hidden layers, using a plurality of image classifiers, wherein the classifying includes generating confidence values for a plurality of action units for the face; and
   translating the facial content into a representative icon, wherein the translating the facial content includes:
      summing the confidence values for the plurality of action units, wherein the plurality of action units includes at least one positive action unit and at least one negative action unit; and
      computing a weight corresponding to the representative icon, wherein the weight is computed by a minimum function, and wherein the minimum function includes as input the at least one positive action unit and the at least one negative action unit.

2. The method of claim 1 wherein the representative icon comprises an emoji.

3. The method of claim 1 wherein the summing includes a weighted summation of the confidence values.

4. The method of claim 3 wherein the summing includes negative weights.

5. The method of claim 1 further comprising performing alignment on the face that was identified.

6. The method of claim 5 further comprising performing normalization on the face that was identified.

7. The method of claim 1 wherein the identifying further comprises identifying a second face within the image.

8. The method of claim 7 further comprising providing a second representative icon for the second face.

9. The method of claim 1 wherein the translating is further based on motion of regions within the face of the individual.

10. The method of claim 1 further comprising tracking the face in the image and a plurality of additional images.

11. The method of claim 10 further comprising tracking a second face within the plurality of additional images.

12. The method of claim 11 further comprising selecting the individual from a plurality of people.

13. The method of claim 10 further comprising selecting a most emoted image from the image and the plurality of additional images and performing the translating for the most emoted image.

14. The method of claim 1 wherein the representative icon comprises a static image emoji.

15. The method of claim 1 wherein the representative icon comprises an animated emoji image.

16. The method of claim 1 wherein the representative icon comprises a cartoon emoji representation.

17. The method of claim 1 wherein the representative icon comprises an emoji containing information on gender, age, or ethnicity.

18. The method of claim 17 wherein the gender, age, or ethnicity is detected by analyzing the image.

19. The method of claim 1 further comprising providing a plurality of emoji wherein the representative icon is included within the plurality of emoji.

20. The method of claim 19 wherein the plurality of emoji is presented to the individual for selection of an appropriate emoji.

21. The method of claim 20 wherein the plurality of emoji is presented with a probability score to aid the individual in the selection.

22. The method of claim 20 wherein a subset of the plurality of emoji is highlighted based on the facial expression.

23. The method of claim 1 further comprising calculating a facial expression metric for the individual based on the classifying.

24. The method of claim 23 further comprising generating a cognitive state metric that is a function of engagement level for the individual based on the facial expression metric.

25. The method of claim 24 further comprising including the cognitive state metric in the translating.

26. The method of claim 1 further comprising training the convolutional neural network wherein the training includes assigning weights to inputs for one or more layers within the convolutional neural network.

27. The method of claim 1 wherein the convolutional neural network further includes a bottleneck layer to accomplish determination of facial content.

28. The method of claim 1 wherein the convolutional neural network further comprises a convolutional layer and a fully connected layer.

29. The method of claim 28 wherein the fully connected layer is configured to process a plurality of data points from the convolutional layer.

30. The method of claim 1 wherein the at least one negative action unit indicates absence of the action unit.

31. A computer system for image analysis comprising:
   a memory which stores instructions;
   one or more processors coupled to the memory wherein the one or more processors, when executing the instructions which are stored, are configured to:
      access a machine learning system comprising a convolutional neural network wherein the convolutional neural network includes an input layer, one or more hidden layers, and a classification layer;
      process an image of an individual, using the machine learning system, wherein the processing includes:
         identifying a face of the individual; and
         classifying the face to determine facial content based on a facial expression from the face, wherein the classifying includes identifying the facial expression using a hidden layer from the one or more hidden layers, using a plurality of image classifiers, wherein the classifying includes generating confidence values for a plurality of action units for the face; and
      translate the facial content into a representative icon, wherein the translating the facial content includes:
         summing the confidence values for the plurality of action units, wherein the plurality of action units includes at least one positive action unit and at least one negative action unit; and
         computing a weight corresponding to the representative icon, wherein the weight is computed by a minimum function, and wherein the minimum function includes as input the at least one positive action unit and the at least one negative action unit.

32. A computer program product embodied in a non-transitory computer readable medium for image analysis, the computer program product comprising code which causes one or more processors to perform operations of:
- accessing a machine learning system comprising a convolutional neural network wherein the convolutional neural network includes an input layer, one or more hidden layers, and a classification layer;
- processing an image of an individual, using the machine learning system, wherein the processing includes:
  - identifying a face of the individual; and
  - classifying the face to determine facial content based on a facial expression from the face, wherein the classifying includes identifying the facial expression using a hidden layer from the one or more hidden layers, using a plurality of image classifiers, wherein the classifying includes generating confidence values for a plurality of action units for the face; and
- translating the facial content into a representative icon, wherein the translating the facial content includes:
- summing the confidence values for the plurality of action units, wherein the plurality of action units includes at least one positive action unit and at least one negative action unit; and
- computing a weight corresponding to the representative icon, wherein the weight is computed by a minimum function, and wherein the minimum function includes as input the at least one positive action unit and the at least one negative action unit.

* * * * *